United States Patent
Rosenbaum et al.

(10) Patent No.: US 12,527,783 B2
(45) Date of Patent: Jan. 20, 2026

(54) SALTS/COCRYSTALS OF (R)-N-(4-CHLOROPHENYL-2-((1S,4S)-4-(6-FLUOROQUINOLIN-4-YL)CYCLOHEXYL)PROPANAMIDE

(71) Applicant: BRISTOL-MYERS SQUIBB COMPANY, Princeton, NJ (US)

(72) Inventors: Tamar I. Rosenbaum, Princeton, NJ (US); Melanie Janelle Bevill, Albany, NY (US)

(73) Assignee: BRISTOL-MYERS SQUIBB COMPANY, Princeton, NJ (US)

( * ) Notice: Subject to any disclaimer, the term of this patent is extended or adjusted under 35 U.S.C. 154(b) by 907 days.

(21) Appl. No.: 17/779,635

(22) PCT Filed: Nov. 23, 2020

(86) PCT No.: PCT/US2020/061743
§ 371 (c)(1),
(2) Date: May 25, 2022

(87) PCT Pub. No.: WO2021/108288
PCT Pub. Date: Jun. 3, 2021

(65) Prior Publication Data
US 2023/0052523 A1 Feb. 16, 2023

Related U.S. Application Data

(60) Provisional application No. 62/940,642, filed on Nov. 26, 2019.

(51) Int. Cl.
*A61K 31/47* (2006.01)
*A61K 39/395* (2006.01)
*C07D 215/14* (2006.01)

(52) U.S. Cl.
CPC .......... *A61K 31/47* (2013.01); *A61K 39/3955* (2013.01); *C07D 215/14* (2013.01); *C07B 2200/13* (2013.01)

(58) Field of Classification Search
CPC ..................... A61K 31/47; C07B 2200/13
See application file for complete search history.

(56) References Cited

U.S. PATENT DOCUMENTS

| 2010/0166740 A1 | 7/2010 | Endl et al. |
| 2019/0002472 A1 | 1/2019 | Beck et al. |

FOREIGN PATENT DOCUMENTS

| JP | 2017-537080 A | 12/2017 |
| WO | 2006/029879 A2 | 3/2006 |
| WO | 2006/105021 A2 | 10/2006 |
| WO | 2006/122150 A1 | 11/2006 |
| WO | 2007/005874 A2 | 1/2007 |
| WO | 2007/075598 A2 | 7/2007 |
| WO | 2008/036642 A2 | 3/2008 |
| WO | 2008/036653 A2 | 3/2008 |
| WO | 2008/132601 A1 | 11/2008 |
| WO | 2009/009116 | 1/2009 |
| WO | 2009/044273 A2 | 4/2009 |
| WO | 2009/073620 A2 | 6/2009 |
| WO | 2009/115665 A1 | 9/2009 |
| WO | 2010/019570 A2 | 2/2010 |
| WO | 2010/077634 A1 | 7/2010 |
| WO | 2011/009400 A1 | 1/2011 |
| WO | 2011/028683 | 3/2011 |
| WO | 2011/056652 A1 | 5/2011 |
| WO | 2011/070024 A1 | 6/2011 |
| WO | 2011/107553 A1 | 9/2011 |
| WO | 2011/109400 A2 | 9/2011 |
| WO | 2011/131407 A1 | 10/2011 |
| WO | 2011/140249 A2 | 11/2011 |
| WO | 2012/032433 A1 | 3/2012 |
| WO | 2012/142237 A1 | 10/2012 |
| WO | 2012/145493 A1 | 10/2012 |
| WO | 2013/079174 A1 | 6/2013 |
| WO | 2013/087699 A1 | 6/2013 |
| WO | 2013/119716 A1 | 8/2013 |
| WO | 2013/132044 A1 | 9/2013 |
| WO | 2013/169264 A1 | 11/2013 |
| WO | 2014/008218 A1 | 1/2014 |
| WO | 2014/036357 A1 | 3/2014 |
| WO | 2016/073770 A1 | 5/2016 |
| WO | 2019/006283 A1 | 1/2019 |
| WO | 2019/006292 A1 | 1/2019 |

OTHER PUBLICATIONS

Pham, K.N. & Yeh, S.R., JACS, Oct. 2018, 140, 14538-14541 (Year: 2018).*
Bastin et al.; "Salt Selection and Optimisation Procedures for Pharmaceutical New Chemical Entities"; Organic Process Research & Development; vol. 4; 2000; p. 427-435.
Caira et al.; "Crystalline Polymorphism of Organic Compounds"; Topics in Current Chemistry; vol. 198; 1998; p. 163-208.
Goldstein et al.; "Biological efficacy of a chimeric antibody to the epidermal growth factor receptor in a human tumor xenograft model"; Clinical Cancer Research; vol. 1; Nov. 1995; p. 1311-1318.
Grothe E. et al.: "Solvates, Salts, and Cocrystals: A Proposal for a Feasible Classification System", Crystal Growth & Design, vol. 16, No. 6, May 6, 2016 (May 6, 2016), pp. 3237-3243, XP055774647, USISSN: 1528-7483, DOI: 10.1021/acs.cgd.6b00200 Retrieved from the Internet: URL:https://pubs.acs.org/doi/pdf/10.1021/acs.cgd.6b00200.
Healy et al: "Pharmaceutical Solvates, hydrates and amorphous forms: A special emphasis on cocrystals", Advanced Drug Delivery Reviews,, vol. 117, Mar. 22, 2017 (Mar. 22, 2017), pp. 25-46, XP002775918, DOI: 10.1016/J.ADDR.2017.03.002.
Kohl et al.; "Inhibition of farnesyltransferase induces regression of mammary and salivary carcinomas in Ras transgenic mice"; Nature Medicine; vol. 1; Aug. 1995; p. 792-797.

(Continued)

*Primary Examiner* — John S Kenyon
*Assistant Examiner* — Sara Elizabeth Bell
(74) *Attorney, Agent, or Firm* — BakerHostetler

(57) ABSTRACT

The present disclosure relates to amorphous and crystalline forms of (R)—N-(4-chlorophenyl)-2-((1S,4S)-4-(6-fluoroquinolin-4-yl)cyclohexyl)propanamide and its salts/cocrystals, solvates, and/or hydrates, processes for their production, pharmaceutical compositions comprising them, and methods of treatment using them.

19 Claims, 41 Drawing Sheets

(56) References Cited

OTHER PUBLICATIONS

Saal C et al: "Pharmaceutical salts: A summary on doses of salt formers from the Orange Book", European Journal of Pharmaceutical Sciences, Elsevier Amsterdam, NL, vol. 49, No. 4, Jun. 5, 2013 (Jun. 5, 2013), pp. 614-623, XP028676562, ISSN: 0928-0987, DOI: 10.1016/J.EJPS.2013.05.026.
Sausville E.A.; "Cyclin-Dependent Kinase Modulators Studied at the NCI: Pre-Clinical and Clinical Studies"; Current Medicinal Chemistry—Anti-Cancer Agents; vol. 3; 2003; p. 47-56.
Scheller et al.; "Paclitaxel Balloon Coating, a Novel Method for Prevention and Therapy of Restenosis"; Circulation; vol. 110; Aug. 2004; p. 810-814.
Sekulic et al.; "A Direct Linkage between the Phosphoinositide 3-Kinase-AKT Signaling Pathway and the Mammalian Target of Rapamycin in Mitogen-stimulated and Transformed Cells"; Cancer Research; vol. 60; Jul. 2000; p. 3504-3513.
Stahly, Crystal Growth & Design, 2007, 7(6), 1007-1026.
Vlahos et al., J. Biol. Chem., 1994, 269, 5241-5248.
Journal of Pharmaceutical Sciences, 1977, vol. 66, No. 1, p. 1-19.
Noriyuki Takada, Pharm Tech Japan, 2009, vol. 25, No. 12, pp. 155-166 (English Abstract).
Reimei Hirayama, Handbook of preparing crystals of organic compounds, 2008, p. 17-23, 37-40, 45-51, 57-65.

\* cited by examiner

SALTS/COCRYSTALS OF (R)-N-(4-CHLOROPHENYL-2-((1S,4S)-4-(6-FLUOROQUINOLIN-4-YL)CYCLOHEXYL)PROPANAMIDE

CROSS-REFERENCE TO RELATED APPLICATIONS

This application is the National Stage Application of International Patent Application No. PCT/US2020/061743, filed Nov. 23, 2020, which claims the benefit of priority to U.S. Provisional Application No. 62/940,642, filed on Nov. 26, 2019, the entire contents of which are incorporated herein by reference.

TECHNICAL FIELD

The present disclosure relates to salts and/or cocrystals of (R)—N-(4-chlorophenyl)-2-((1S,4S)-4-(6-fluoroquinolin-4-yl)cyclohexyl)propanamide and their hydrates and solvates, processes for their production, pharmaceutical compositions comprising them, and methods of treatment using them.

BACKGROUND (R)—N-(4-chlorophenyl)-2-((1S,4S)-4-(6-fluoroquinolin-4-yl)cyclohexyl)propanamide, also referred to herein as Compound 1, has the below structure:

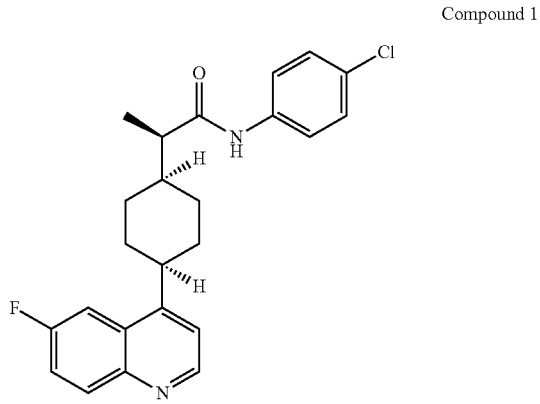 [SMILES: C[C@@H](C(=O)Nc1ccc(Cl)cc1)[C@H]1CC[C@@H](c2ccnc3ccc(F)cc32)CC1]

Compound 1

Compound 1 is a potent inhibitor of indoleamine 2,3-dioxygenase (IDO; also known as IDO1), which is an IFN-γ target gene that plays a role in immunomodulation. Compound 1 is being investigated as a treatment for cancer and other diseases. Compound 1 has been previously described in WO2016/073770.

A compound, as a free base, hydrate, solvate, cocrystal and/or salt, can exist in amorphous form and/or one or more crystalline forms, each having different physical properties, for example, different X-ray diffraction patterns (XRPD or PXRD) and different thermal behavior. The free base, hydrate, solvate, cocrystals and/or salt forms of a compound can also differ with respect to their individual stabilities, processing, formulation, dissolution profile, bioavailability, and the like.

New forms of (R)—N-(4-chlorophenyl)-2-((1S,4S)-4-(6-fluoroquinolin-4-yl)cyclohexyl)propanamide, having desirable and beneficial chemical and physical properties, are needed. There is also a need for reliable and reproducible methods for the manufacture, purification, and formulation of Compound 1 (and its hydrates, solvates, cocrystals and/or salt forms) to facilitate commercialization. The present disclosure is directed to these, as well as other important aspects.

SUMMARY

The present disclosure is directed to salts and/or cocrystals of (R)—N-(4-chlorophenyl)-2-((1S,4S)-4-(6-fluoroquinolin-4-yl)cyclohexyl)propanamide (Compound 1) including, inter alia, solid forms of (R)—N-(4-chlorophenyl)-2-((1S,4S)-4-(6-fluoroquinolin-4-yl)cyclohexyl)propanamide ethane sulfonate (esylate) salt, solid forms of (R)—N-(4-chlorophenyl)-2-((1S,4S)-4-(6-fluoroquinolin-4-yl)cyclohexyl)propanamide hydrochloride salts, and solid forms of (R)—N-(4-chlorophenyl)-2-((1S,4S)-4-(6-fluoroquinolin-4-yl)cyclohexyl)propanamide hydrosulfate salt. Compositions comprising the described solid forms, as well as methods of preparing and using them in therapy, are also described.

DETAILED DESCRIPTION OF ILLUSTRATIVE EMBODIMENTS

The present disclosure is directed to solid forms of Compound 1, for example, Compound 1 ethane sulfonate salt (esylate salt), Compound 1 hydrochloride salts, and various salts/cocrystals, hydrates, and/or solvates of Compound 1, as well as the production of such solid forms, pharmaceutical compositions comprising such solid forms, and methods of treating diseases mediated by IDO using such solid forms. Designations of the disclosed solid forms should not be construed as limiting with respect to any other substance possessing similar or identical physical and chemical characteristics, but rather, it should be understood that these designations are identifiers that should be interpreted according to the characterization information disclosed herein.

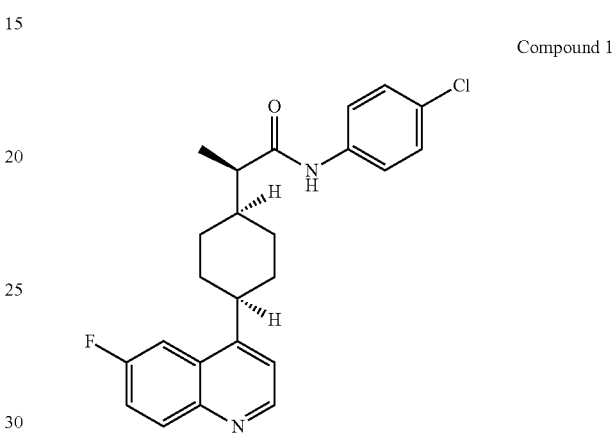

Compound 1

Compound 1 Hydrochloride Salt Forms

In certain aspects, the present disclosure is directed solid forms of a hydrochloride salt of Compound 1. In one embodiment, the disclosure is directed a solid form of Compound 1 hydrochloride salt that is a monohydrate. For example, the solid form of Compound 1 hydrochloride monohydrate comprises about 1 molecule of water per molecule of Compound 1 hydrochloride.

In a preferred aspects, the solid form of Compound 1 (hydrochloride salt) hydrate is a crystalline form of Compound 1 (hydrochloride salt) monohydrate, referred to herein as Form A. Compound 1 hydrochloride salt monohydrate Form A has a desirable stability profile.

Figure 1:
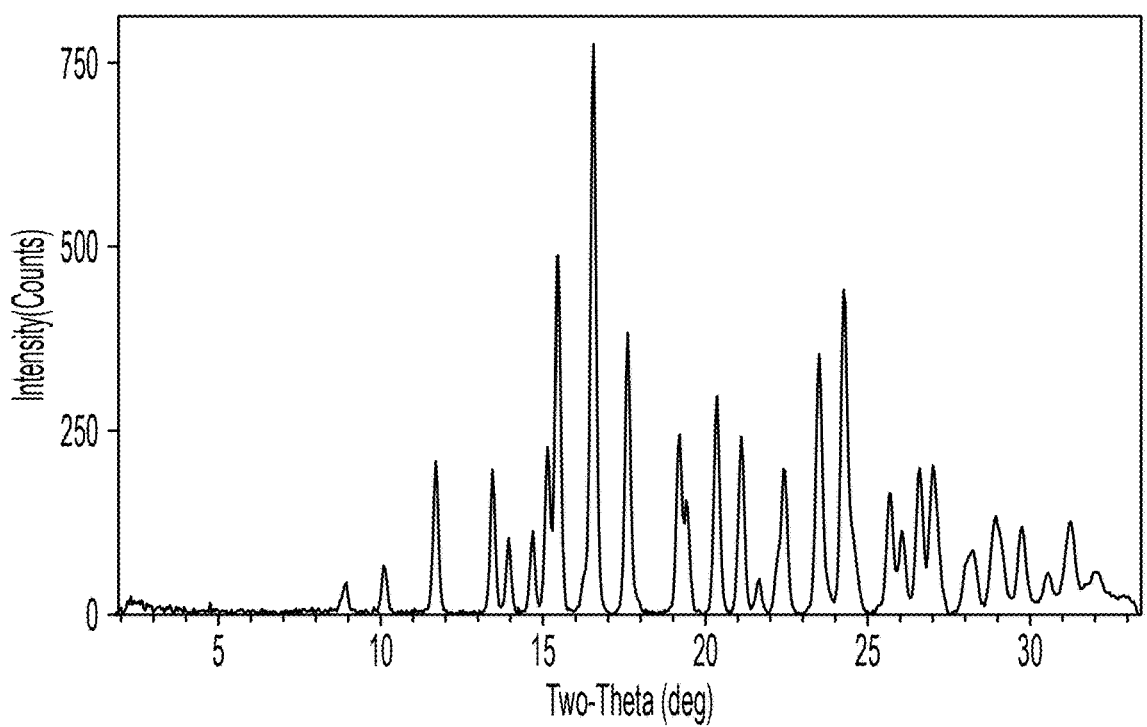
FIG. 1 depicts powder X-ray diffraction pattern of Compound 1 hydrochloride salt monohydrate Form A.

Form A can be characterized by an X-ray diffraction pattern substantially as shown in FIG. 1. Single crystal data and diffraction peak positions for Form A that were obtained using the equipment and conditions specified in Example 1, infra, are shown below in Table 1A-1C. Single crystal X-Ray data for Form A at 23° C. is provided in Table 1A, below.

TABLE 1A

| Crystal system, space group | Orthorhombic, $P2_12_12_1$ | |
|---|---|---|
| Unit cell dimensions | a = 11.69 ± 0.10 Å | alpha = 90° |
| | b = 13.14 ± 0.10 Å | beta = 90° |
| | c = 15.12 ± 0.10 Å | gamma = 90° |
| Volume | 2321 ± 20 Å$^3$ | |
| Formula units per unit cell | 4 | |

TABLE 1B

Observed X-ray Powder Diffraction Peaks for Form A
degrees
2θ ± 0.2

| |
|---|
| 8.9 |
| 10.1 |
| 11.7 |
| 13.5 |
| 13.9 |
| 14.7 |
| 15.2 |
| 15.4 |
| 16.5 |
| 17.6 |
| 19.2 |
| 19.4 |
| 20.3 |
| 21.1 |
| 21.6 |
| 22.4 |
| 23.5 |
| 24.3 |
| 25.7 |
| 26.1 |
| 26.6 |
| 27.0 |
| 28.2 |
| 29.0 |
| 29.8 |
| 30.6 |
| 31.2 |
| 32.0 |

TABLE 1C

Characteristic X-ray Powder Diffraction Peaks for Form A
degrees
2θ ± 0.2

| |
|---|
| 14.7 |
| 16.5 |
| 17.6 |
| 23.5 |
| 24.3 |

Form A can be characterized by an X-ray diffraction pattern having at least one peak selected from Table 1B.

Figure 2:
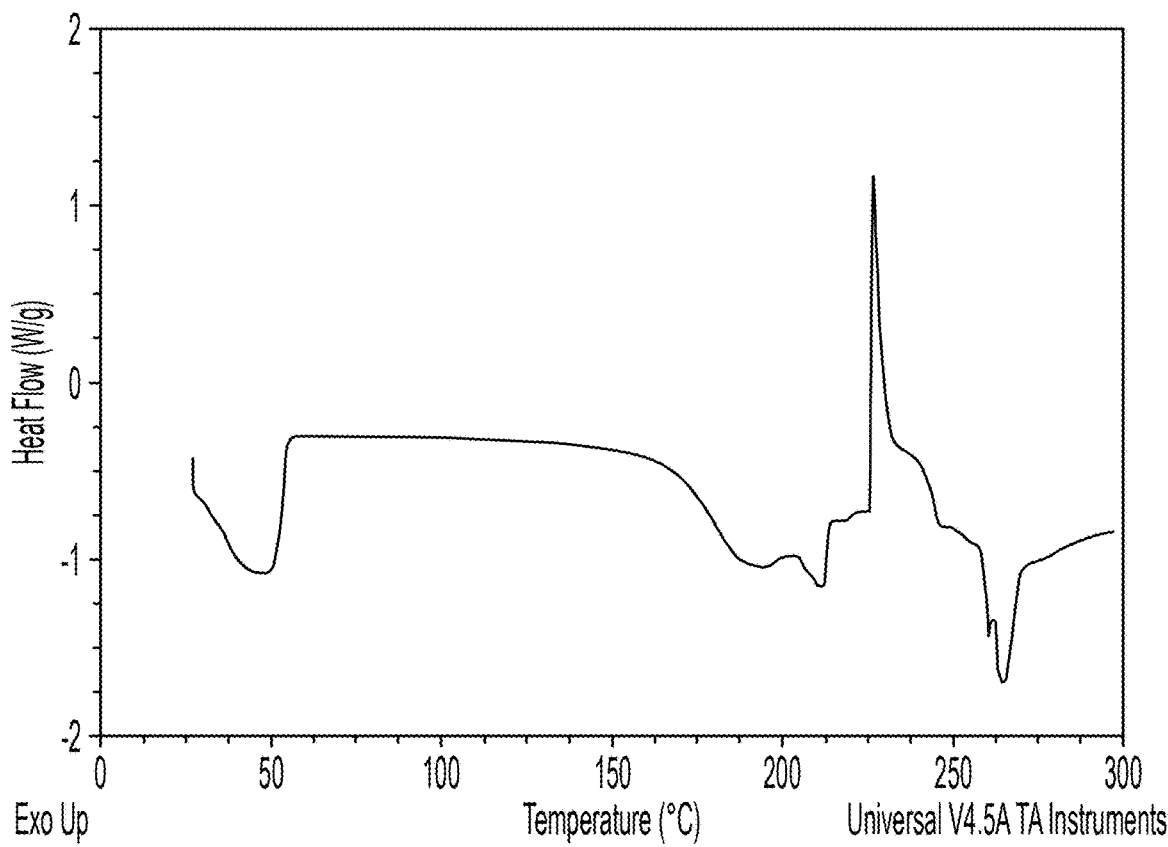
FIG. 2 provides a DSC (differential scanning calorimetry) profile of Compound 1 hydrochloride salt monohydrate Form A.
Figure 3:
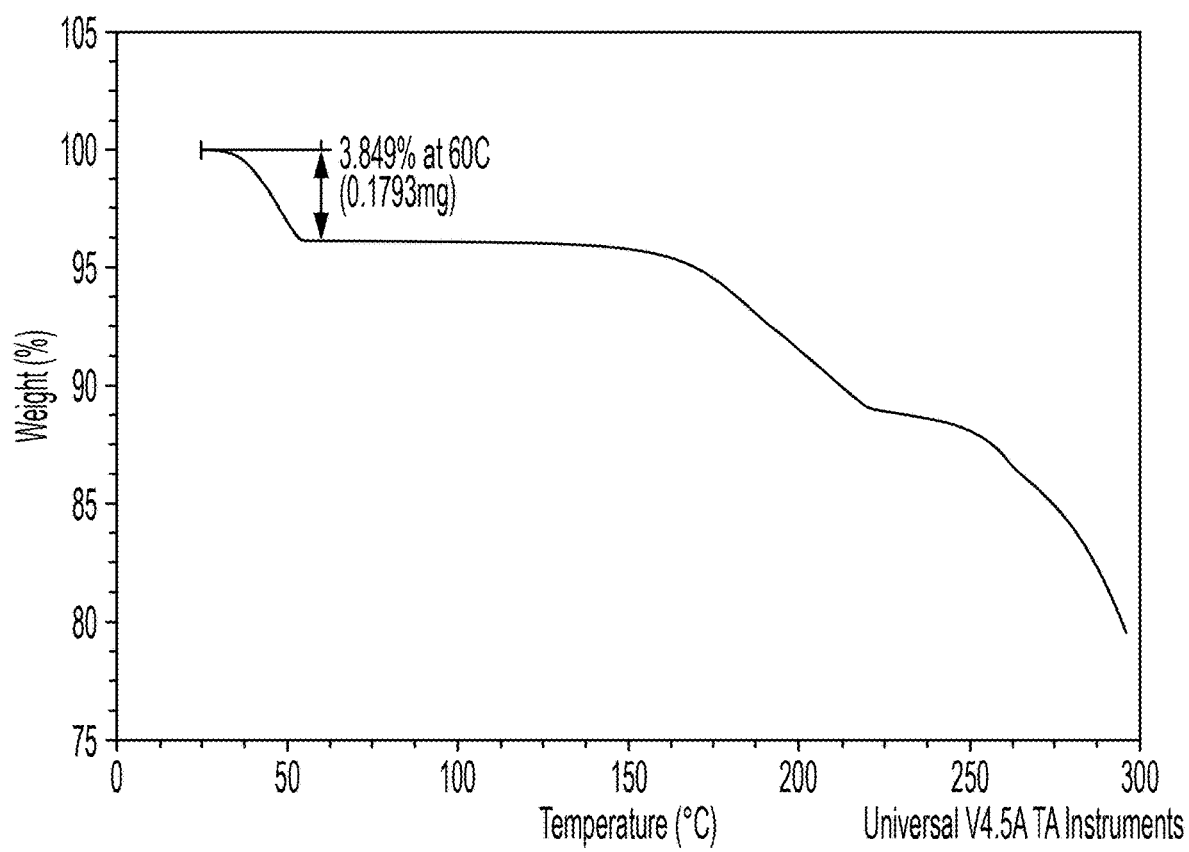
FIG. 3 provides a TGA (thermal gravimetric analysis) profile of Compound 1 hydrochloride salt monohydrate Form A.

In further aspects, the hydrochloride salt monohydrate Form A can be characterized by a DSC thermogram substantially as shown in FIG. 2. In yet other aspects, the hydrochloride salt monohydrate Form A can be characterized by a TGA thermogram substantially as shown in FIG. 3.

In another embodiment, the disclosure is directed to a solid form of Compound 1 hydrochloride salt that is an anhydrous neat form, referred to herein as Form B. Single crystal data and diffraction peak positions for Form B that were obtained using the equipment and conditions specified in Example 2, infra, are shown below in Table 2A-2C:

Single crystal X-Ray data for Form B at 25° C. is provided in Table 2A, below.

TABLE 2A

| | | |
|---|---|---|
| Crystal system, space group | Orthorhombic, P2$_1$2$_1$2$_1$ | |
| Unit cell dimensions | a = 10.88 ± 0.10 Å | alpha = 90° |
| | b = 13.63 ± 0.10 Å | beta = 90° |
| | c = 15.30 ± 0.10 Å | gamma = 90° |
| Volume | 2267 ± 20 Å$^3$ | |
| Formula units per unit cell | 4 | |

TABLE 2B

Observed X-ray Powder Diffraction Peaks for Form B
degrees
2θ ± 0.2

| |
|---|
| 8.7 |
| 10.0 |
| 11.6 |
| 11.9 |
| 13.0 |
| 14.2 |
| 15.5 |
| 16.3 |
| 17.4 |
| 18.5 |
| 19.2 |
| 20.0 |
| 20.3 |
| 21.0 |
| 21.7 |
| 21.9 |
| 22.7 |
| 23.2 |
| 23.9 |
| 24.7 |
| 25.4 |
| 26.1 |
| 26.8 |
| 27.2 |
| 28.0 |
| 28.4 |
| 29.2 |
| 29.8 |
| 30.2 |
| 30.9 |

TABLE 2C

Characteristic X-ray Powder Diffraction Peaks for Form B
degrees
2θ ± 0.2

| |
|---|
| 13.0 |
| 14.2 |
| 16.3 |
| 18.5 |
| 21.0 |
| 23.9 |
| 24.7 |

In certain aspects, Form B can be characterized by an X-ray diffraction pattern having at least one peak selected from Table 2B.

Figure 4:
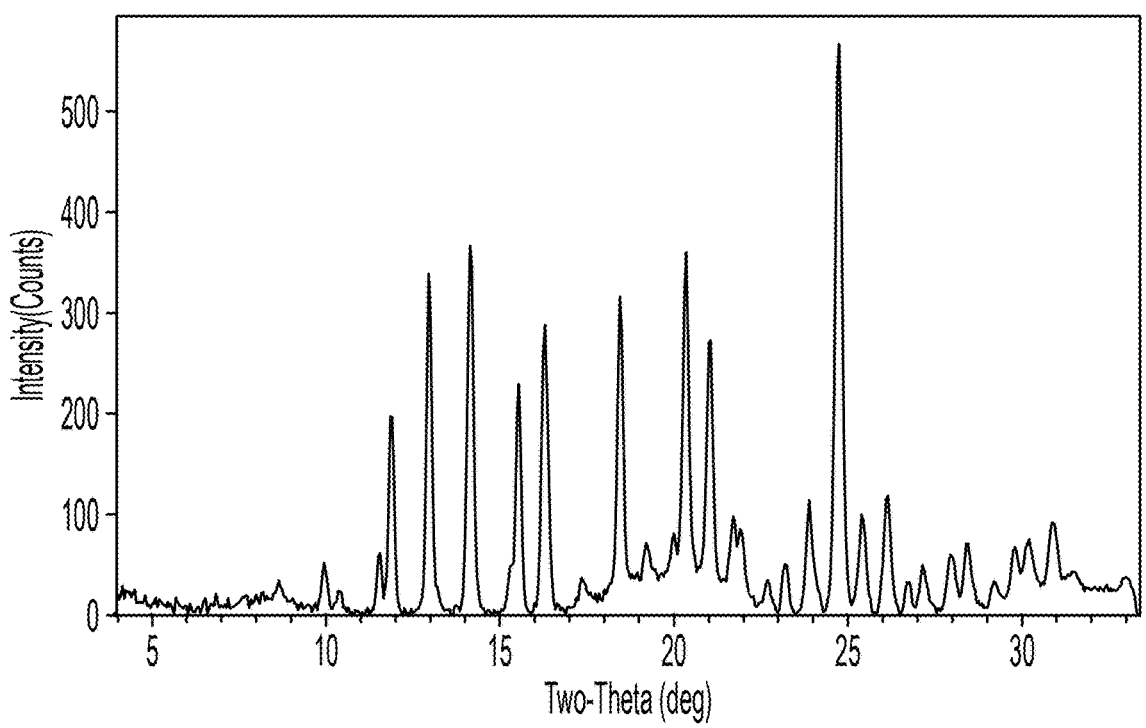
FIG. 4 depicts powder X-ray diffraction pattern of Compound 1 hydrochloride salt that is an anhydrous neat form, designated Form B.

In other aspects, Form B can be characterized by an X-ray diffraction pattern substantially as shown in FIG. 4.

The above-described Compound 1 hydrochloride acid salt forms can respectively be in substantially pure form, that is, having a purity of about 90% or greater, based on the weight of the compound, as determined by HPLC (High Performance Liquid Chromatography). For example, a given Compound 1 hydrochloride acid salt form can have a purity of about 90, 91, 92, 93, 94, 95, 96, 97, 98, 99, or 100%. The remaining material can comprise other solid forms of Compound 1 and/or reaction impurities and/or processing impurities arising from its preparation.

Mixtures of Compound 1 hydrochloride acid salt forms with other solid forms of Compound 1 are also within the scope of the disclosure. In these embodiments, such mixtures can comprise less than 90%, based on the weight of the mixture, of a Compound 1 hydrochloride acid salt form. For example, mixtures can comprise 85, 80, 75, 70, 65, 60, 55, 50, 45, 40, 35, 30, 25, 20, 15, 10, or about 5%, by weight of the mixture, of a Compound 1 hydrochloride acid salt form.

Other aspects of Compound 1 hydrochloride salt solid forms are provided in the Examples below.

Compound 1 Esylate (Ethane Sulfonate) Salt Form

In other embodiments, the disclosure is directed to a solid form of Compound 1 esylate salt. One embodiment of a Compound 1 esylate salt is referred to herein as Form C. Single crystal data and diffraction peak positions for Form C that were obtained using the equipment and conditions specified in Example 3, infra, are shown below in Table 3A-3C.

Single crystal X-Ray data for Form C at −73° C. is provided in Table 3A, below.

TABLE 1

| Crystal system, space group | Orthorhombic, P2$_1$2$_1$2$_1$ | |
|---|---|---|
| Unit cell dimensions | a = 10.13 ± 0.10 Å | alpha = 90° |
| | b = 14.22 ± 0.10 Å | beta = 90° |
| | c = 17.39 ± 0.10 Å | gamma = 90° |
| Volume | 2505 ± 20 Å$^3$ | |
| Formula units per unit cell | 4 | |

TABLE 3B

Observed X-ray Powder
Diffraction Peaks for Form C
degrees
2θ ± 0.2

8.0
10.1
10.6
11.8
12.4
13.3
14.7
15.1
16.0
17.3
18.2
19.1
19.2
19.6
20.1
20.5
21.1
21.9
23.0
23.6
23.9
25.5
26.3
26.8
27.5
28.0
28.4
28.7
28.9
29.7
30.9
31.3
32.2

TABLE 3C

Characteristic X-ray Powder
Diffraction Peaks for Form C
degrees
2θ ± 0.2

8.0
10.6

TABLE 3C-continued

Characteristic X-ray Powder
Diffraction Peaks for Form C
degrees
2θ ± 0.2

12.4
13.3
16.0
17.3
18.2
20.5
21.9

In certain aspects, Form C can be characterized by an X-ray diffraction pattern having at least one peak selected from Table 3B.

Figure 5:
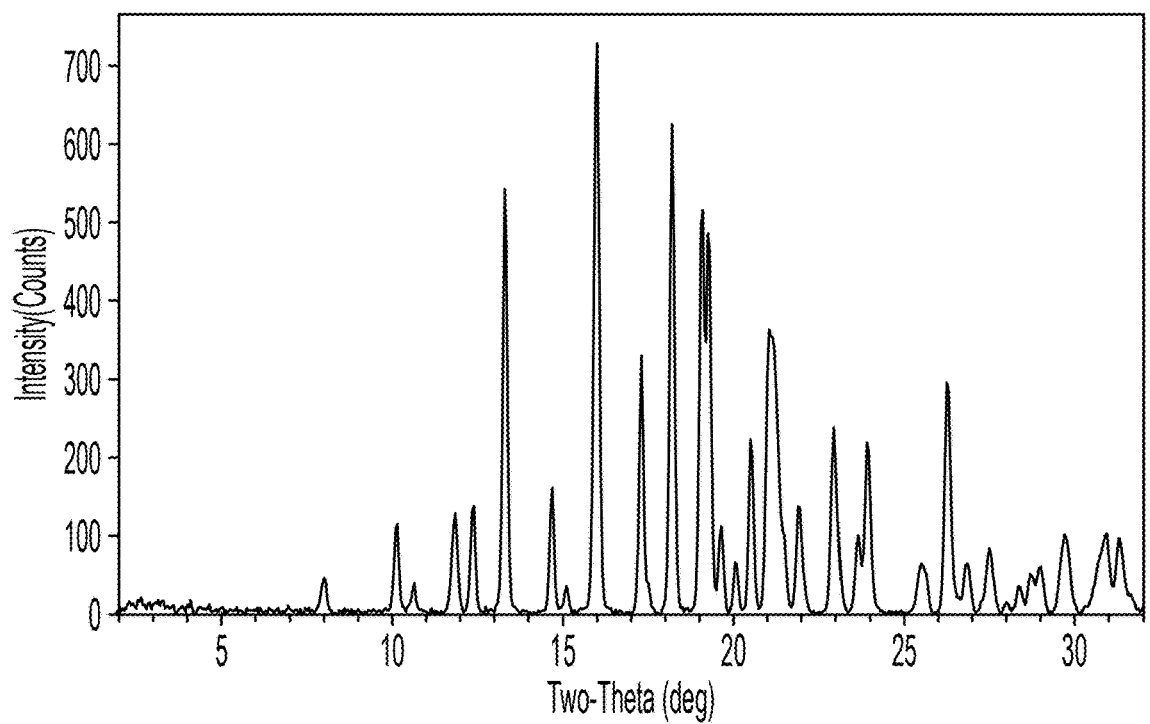
FIG. 5 depicts a powder X-ray diffractogram of Compound 1 esylate salt crystalline Form C.

In some aspects, compound Form C can be characterized by an X-ray diffraction pattern substantially as shown in FIG. 5.

Additional Salts/Cocrystals of Compound 1

Figure 6:
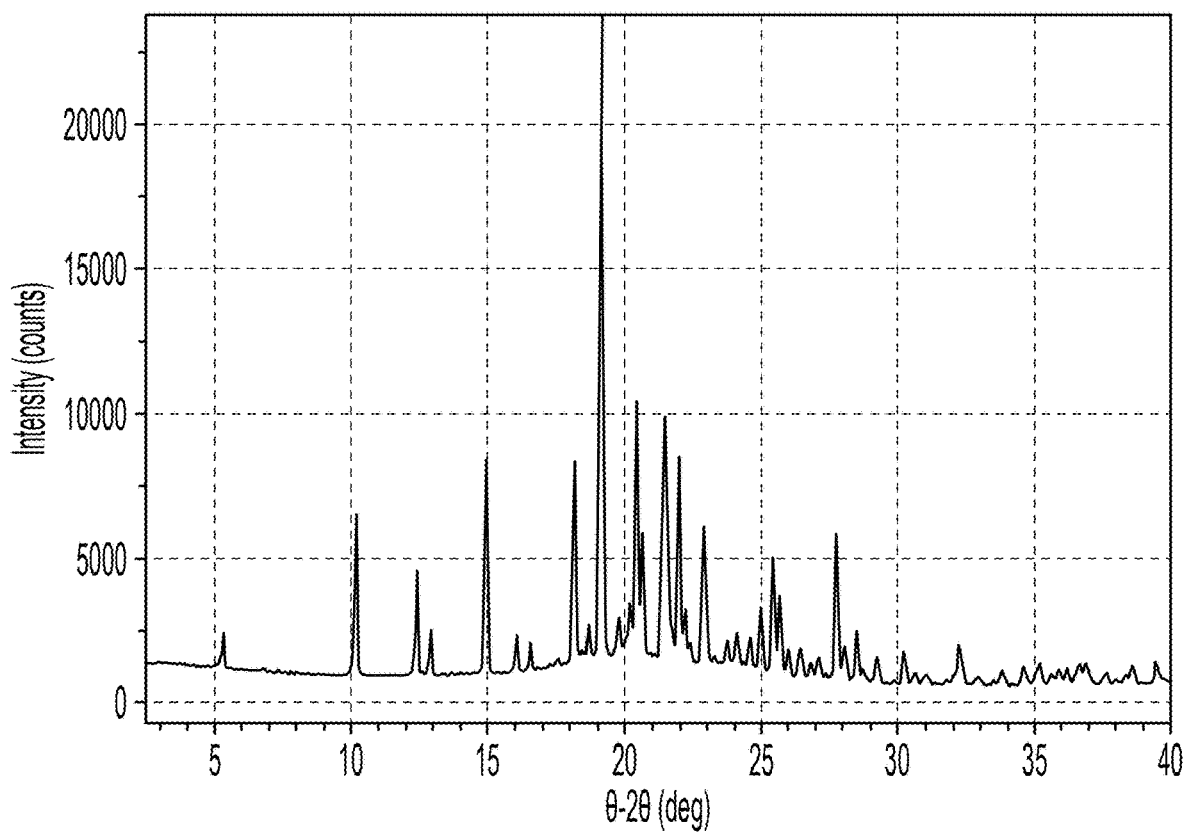
FIG. 6 depicts an X-ray diffraction pattern of an acetic acid solvate/salt of Compound 1 (Form D).

Also provided herein is an acetic acid solvate/salt of Compound 1, referred to herein as Form D. In some aspects, Form D can be characterized by an X-ray diffraction pattern substantially as shown in FIG. 6. Diffraction peak positions for Form D that were obtained using the equipment and conditions specified in Example 3, infra, are shown below in Table 4 and 4A:

TABLE 4

Observed X-ray Powder
Diffraction Peaks for Form D
°2θ

5.3 ± 0.2
10.2 ± 0.2
12.4 ± 0.2
12.9 ± 0.2
15.0 ± 0.2
16.1 ± 0.2
16.6 ± 0.2
17.6 ± 0.2
18.2 ± 0.2
18.7 ± 0.2
19.2 ± 0.2
19.8 ± 0.2
20.2 ± 0.2
20.5 ± 0.2
20.6 ± 0.2
21.5 ±0.2
21.7 ± 0.2
22.0 ± 0.2
22.2 ± 0.2
22.4 ± 0.2
22.9 ± 0.2
23.3 ± 0.2
23.8 ± 0.2
24.1 ± 0.2
24.6 ± 0.2
25.0 ± 0.2
25.5 ± 0.2
25.7 ± 0.2
26.0 ± 0.2
26.4 ± 0.2
26.8 ± 0.2
27.1 ± 0.2
27.8 ± 0.2
28.1 ± 0.2
28.5 ± 0.2
28.8 ± 0.2
29.2 ± 0.2
30.2 ± 0.2

TABLE 4A

Characteristic X-ray Powder
Diffraction Peaks for Form D
°2θ

| |
|---|
| 10.2 ± 0.2 |
| 15.0 ± 0.2 |
| 18.2 ± 0.2 |
| 19.2 ± 0.2 |
| 20.5 ± 0.2 |
| 21.5 ± 0.2 |
| 22.0 ± 0.2 |
| 22.9 ± 0.2 |

Form D can be characterized by an X-ray diffraction pattern having at least one peak selected from Table 4A.

Figure 7:
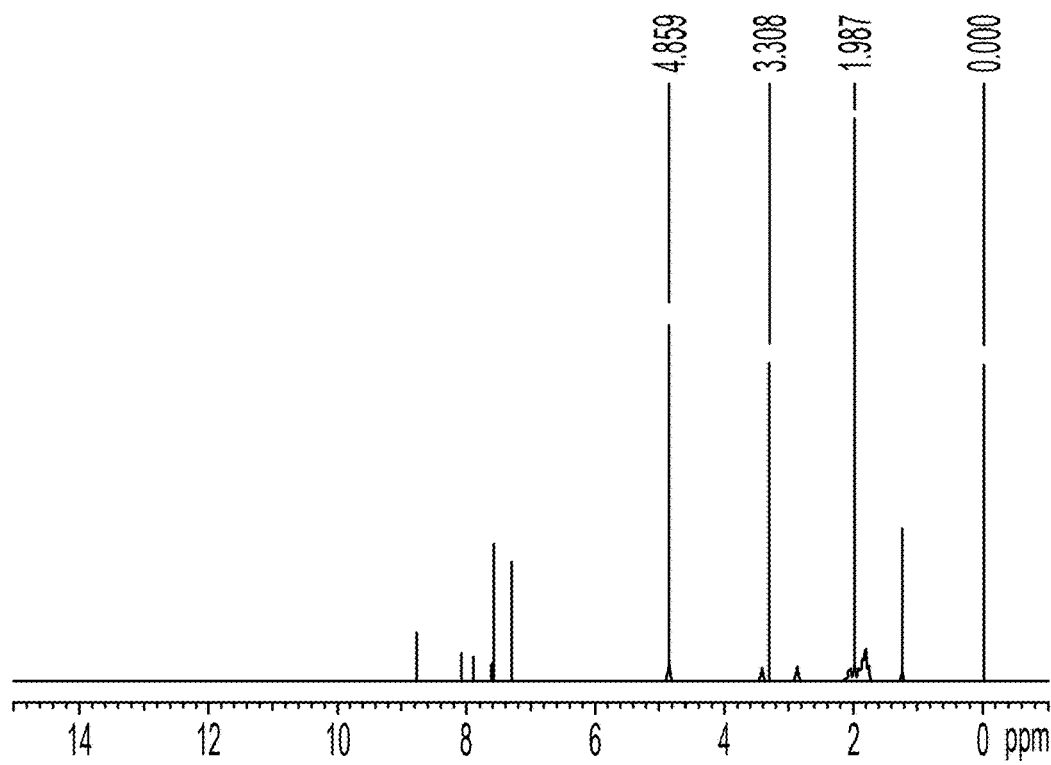
FIG. 7 depicts a $^1$H NMR profile of Form D.
Figure 8:
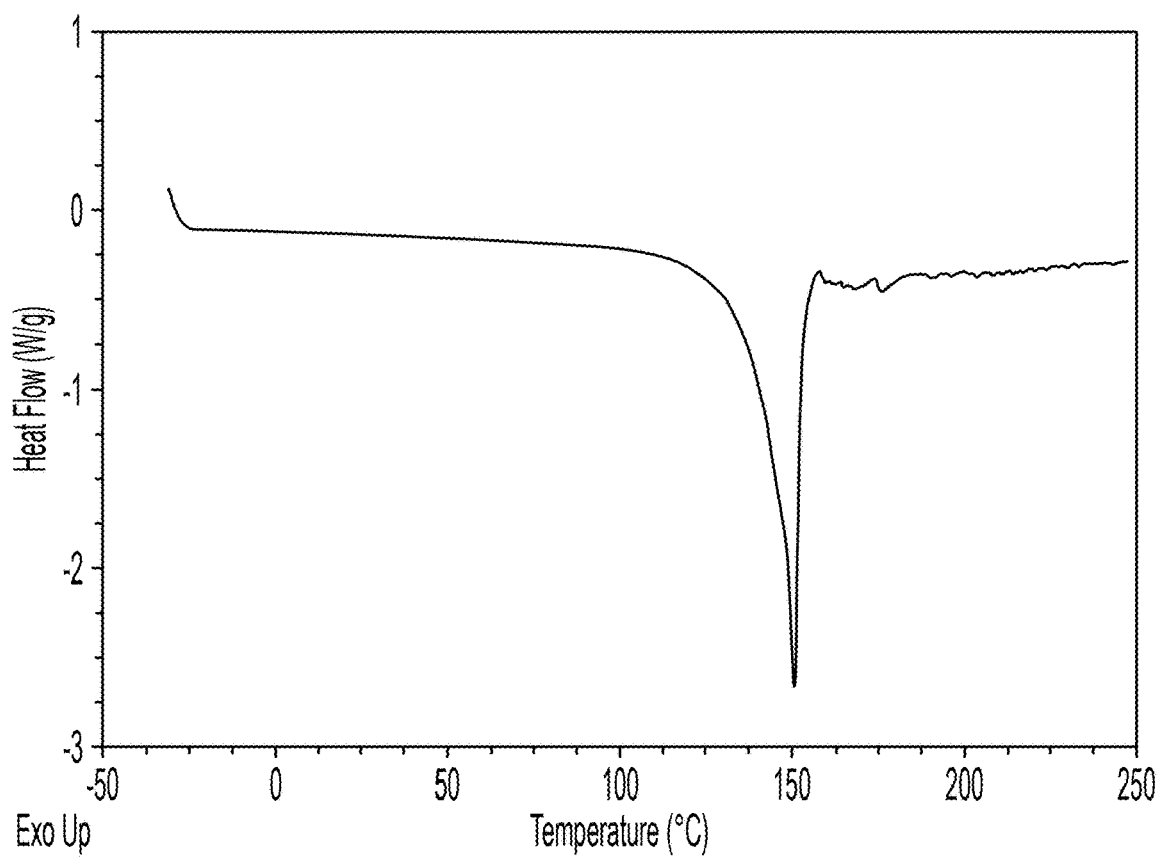
FIG. 8 depicts a DSC thermogram of Form D.
Figure 9:
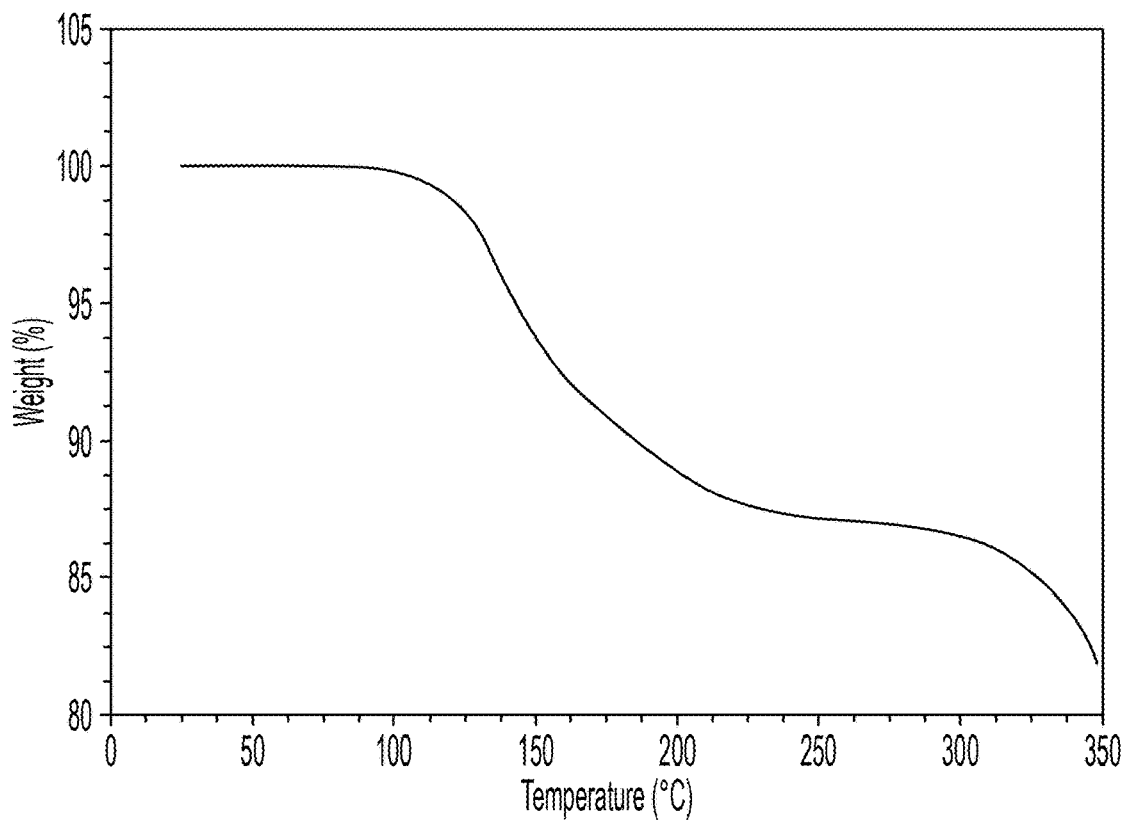
FIG. 9 depicts a TGA thermogram of Form D.

In other aspects, Form D can be characterized by a $^1$H NMR profile substantially as shown in FIG. 7. In other aspects, Form D can be characterized by a DSC thermogram substantially as shown in FIG. 8. In other aspects, Form D can be characterized by a TGA thermogram substantially as shown in FIG. 9.

Figure 10:
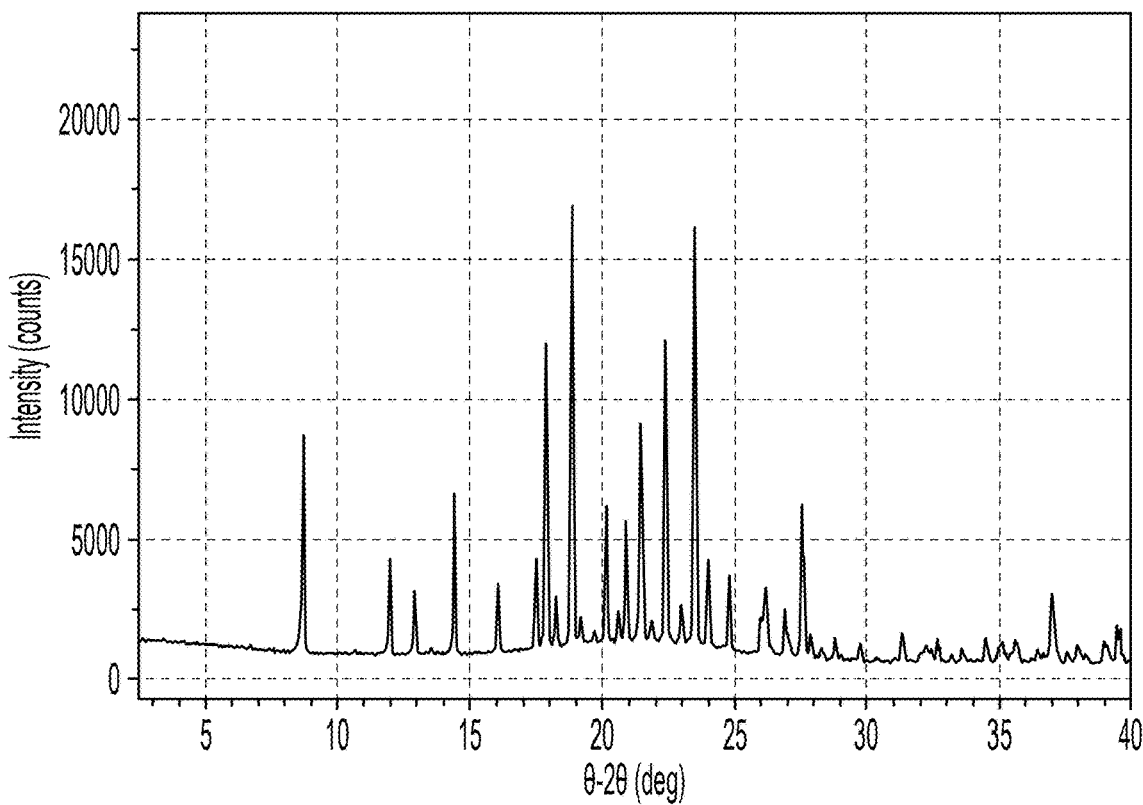
FIG. 10 depicts an X-ray diffraction pattern of a different acetic acid solvate/salt of Compound 1 (Form E).

Also provided herein is a different acetic acid solvate/salt of Compound 1, referred to herein as Form E. In some aspects, Form E can be characterized by an X-ray diffraction pattern substantially as shown in FIG. 10. Diffraction peak positions for Form E that were obtained using the equipment and conditions specified in Example 3, infra, are shown below in Table 5 and 5A:

TABLE 5

Observed X-ray Powder
Diffraction Peaks for Form E
°2θ

| |
|---|
| 8.7 ± 0.2 |
| 12.0 ± 0.2 |
| 12.9 ± 0.2 |
| 13.5 ± 0.2 |
| 14.4 ± 0.2 |
| 16.1 ± 0.2 |
| 17.5 ± 0.2 |
| 17.9 ± 0.2 |
| 18.3 ± 0.2 |
| 18.9 ± 0.2 |
| 19.2 ± 0.2 |
| 19.7 ± 0.2 |
| 20.2 ± 0.2 |
| 20.6 ± 0.2 |
| 20.9 ± 0.2 |
| 21.5 ± 0.2 |
| 21.9 ± 0.2 |
| 22.4 ± 0.2 |
| 23.0 ± 0.2 |
| 23.5 ± 0.2 |
| 24.0 ± 0.2 |
| 24.8 ± 0.2 |
| 26.0 ± 0.2 |
| 26.1 ± 0.2 |
| 26.2 ± 0.2 |
| 26.4 ± 0.2 |
| 26.9 ± 0.2 |
| 27.0 ± 0.2 |
| 27.6 ± 0.2 |
| 27.9 ± 0.2 |
| 28.3 ± 0.2 |
| 28.8 ± 0.2 |
| 29.8 ± 0.2 |

TABLE 5A

Characteristic X-ray Powder
Diffraction Peaks for Form E
°2θ

| |
|---|
| 8.7 ± 0.2 |
| 14.4 ± 0.2 |
| 17.9 ± 0.2 |
| 18.9 ± 0.2 |
| 20.2 ± 0.2 |
| 20.9 ± 0.2 |
| 21.5 ± 0.2 |
| 22.4 ± 0.2 |
| 23.5 ± 0.2 |
| 27.6 ± 0.2 |

Form E can be characterized by an X-ray diffraction pattern having at least one peak selected from Table 5A.

Figure 11:
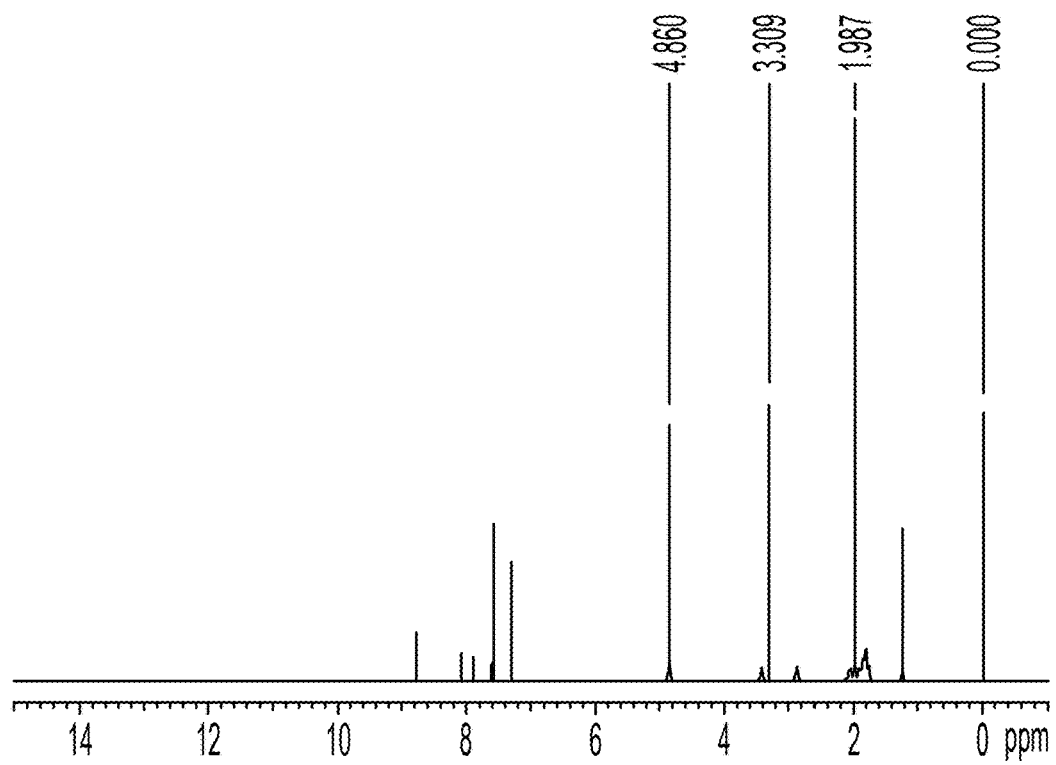
FIG. 11 depicts a $^1$H NMR profile of Form E.
Figure 12:
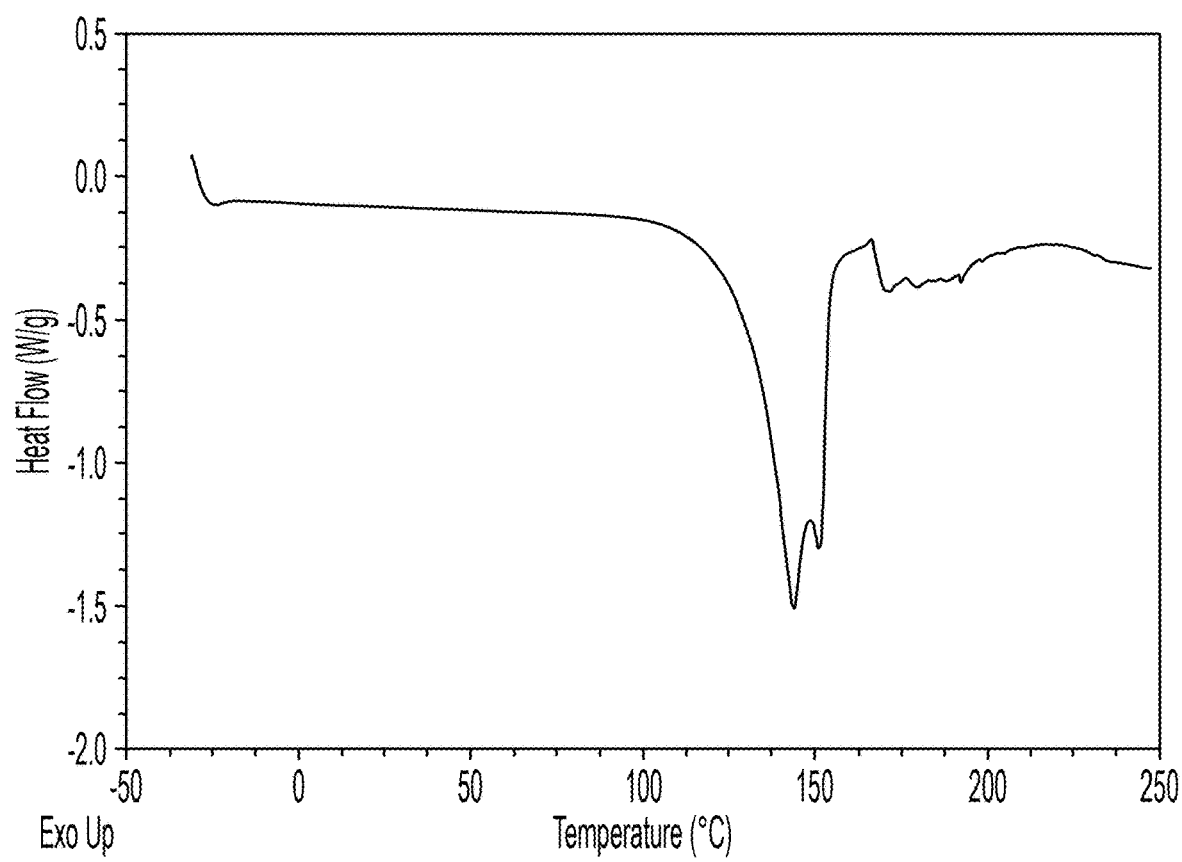
FIG. 12 depicts a DSC thermogram of Form E.
Figure 13:
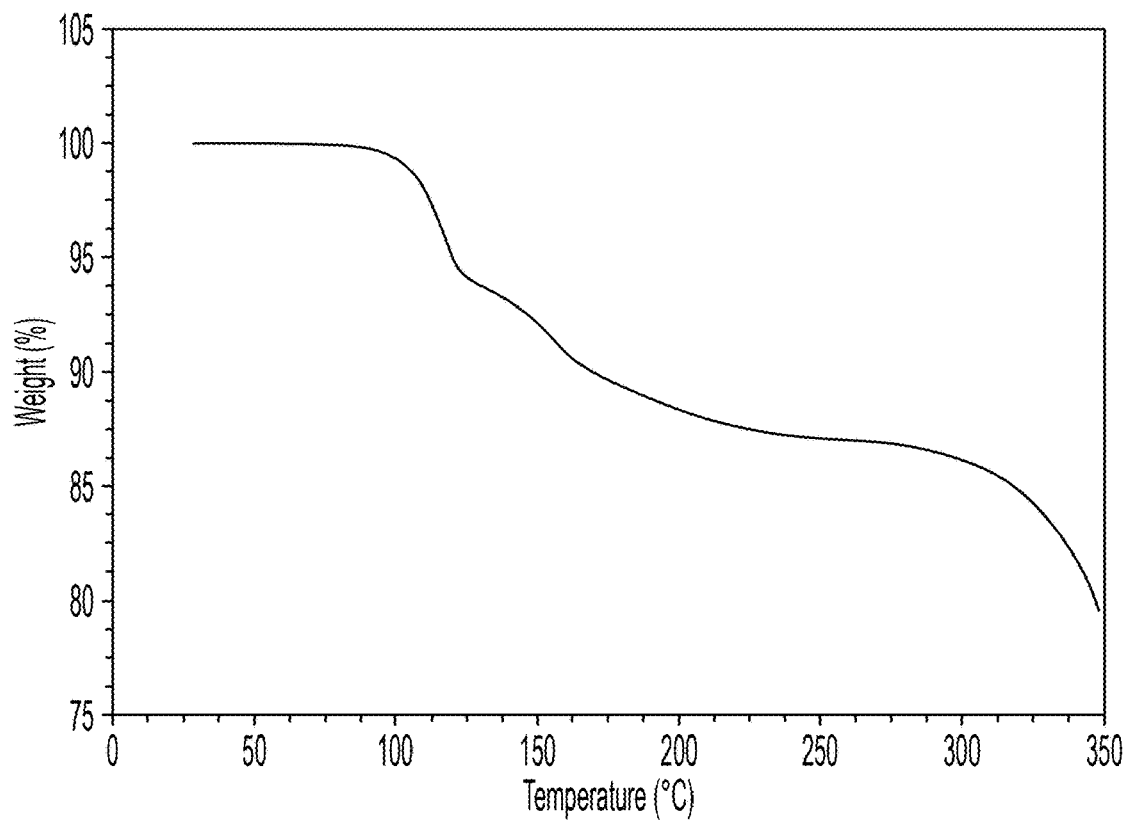
FIG. 13 depicts a TGA thermogram of Form E.

In other aspects, Form E can be characterized by a $^1$H NMR profile substantially as shown in FIG. 11. In other aspects, Form E can be characterized by a DSC thermogram substantially as shown in FIG. 12. In other aspects, Form E can be characterized by a TGA thermogram substantially as shown in FIG. 13.

Figure 14:
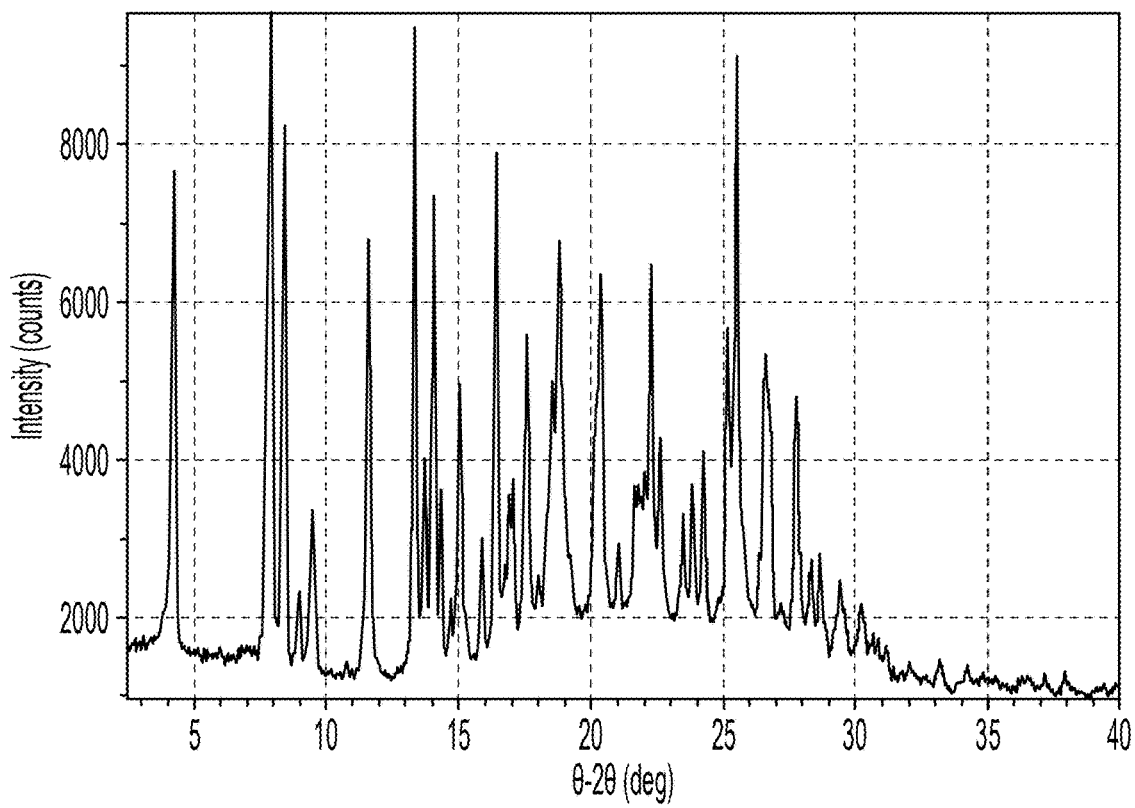
FIG. 14 depicts an X-ray diffraction pattern of a Compound 1 phosphate salt/cocrystal (Form F).

Also provided herein is a Compound 1 phosphate salt/cocrystal, referred to herein as Form F. In some aspects, Form F can be characterized by an X-ray diffraction pattern substantially as shown in FIG. 14. Diffraction peak positions for Form F that were obtained using the equipment and conditions specified in Example 3, infra, are shown below in Table 6 and 6A:

TABLE 6

Observed X-ray Powder
Diffraction Peaks for Form F
°2θ

| |
|---|
| 4.2 ± 0.2 |
| 7.9 ± 0.2 |
| 8.4 ± 0.2 |
| 9.0 ± 0.2 |
| 9.5 ± 0.2 |
| 10.8 ± 0.2 |
| 11.6 ± 0.2 |
| 13.4 ± 0.2 |
| 13.7 ± 0.2 |
| 14.0 ± 0.2 |
| 14.3 ± 0.2 |
| 14.7 ± 0.2 |
| 15.0 ± 0.2 |
| 15.9 ± 0.2 |
| 16.4 ± 0.2 |
| 16.9 ± 0.2 |
| 17.0 ± 0.2 |
| 17.6 ± 0.2 |
| 18.0 ± 0.2 |
| 18.6 ± 0.2 |
| 18.8 ± 0.2 |
| 20.4 ± 0.2 |
| 21.0 ± 0.2 |
| 22.3 ± 0.2 |
| 22.6 ± 0.2 |
| 23.5 ± 0.2 |
| 23.9 ± 0.2 |
| 24.3 ± 0.2 |
| 25.2 ± 0.2 |
| 25.5 ± 0.2 |
| 26.6 ± 0.2 |
| 27.8 ± 0.2 |
| 28.3 ± 0.2 |
| 28.7 ± 0.2 |

TABLE 6A

Characteristic X-ray Powder
Diffraction Peaks for Form F
°2θ

| |
|---|
| 4.2 ± 0.2 |
| 7.9 ± 0.2 |
| 8.4 ± 0.2 |
| 11.6 ± 0.2 |
| 13.4 ± 0.2 |
| 14.0 ± 0.2 |
| 16.4 ± 0.2 |
| 18.8 ± 0.2 |
| 20.4 ± 0.2 |
| 22.3 ± 0.2 |
| 25.5 ± 0.2 |

Form F can be characterized by an X-ray diffraction pattern having at least one peak selected from Table 6A.

Figure 15:
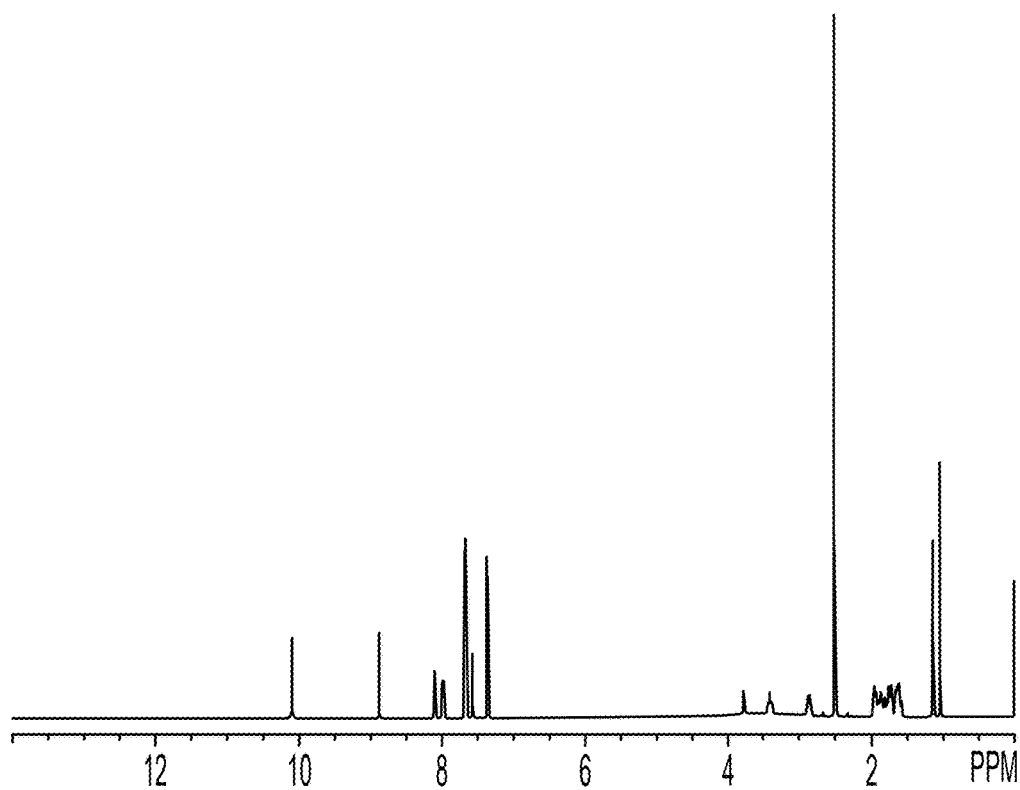
FIG. 15 depicts a $^1$H NMR profile of Form F.
Figure 16:
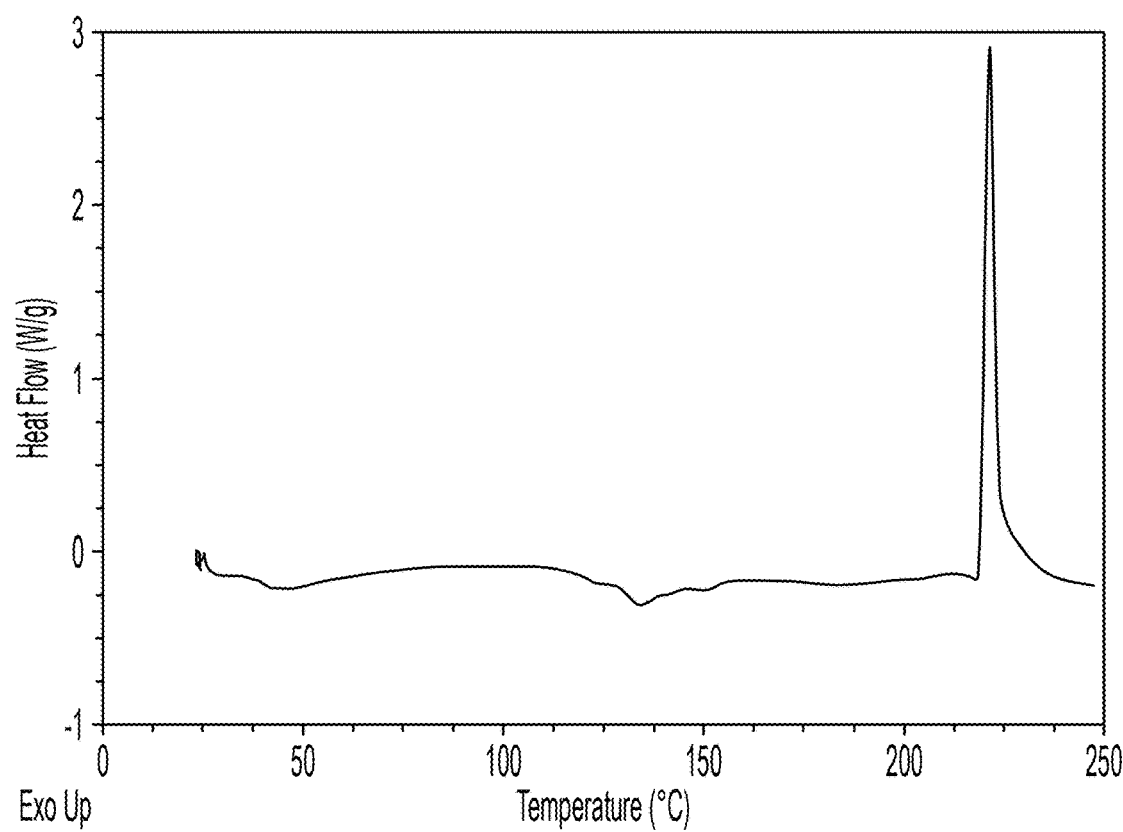
FIG. 16 depicts a DSC thermogram of Form F.
Figure 17:
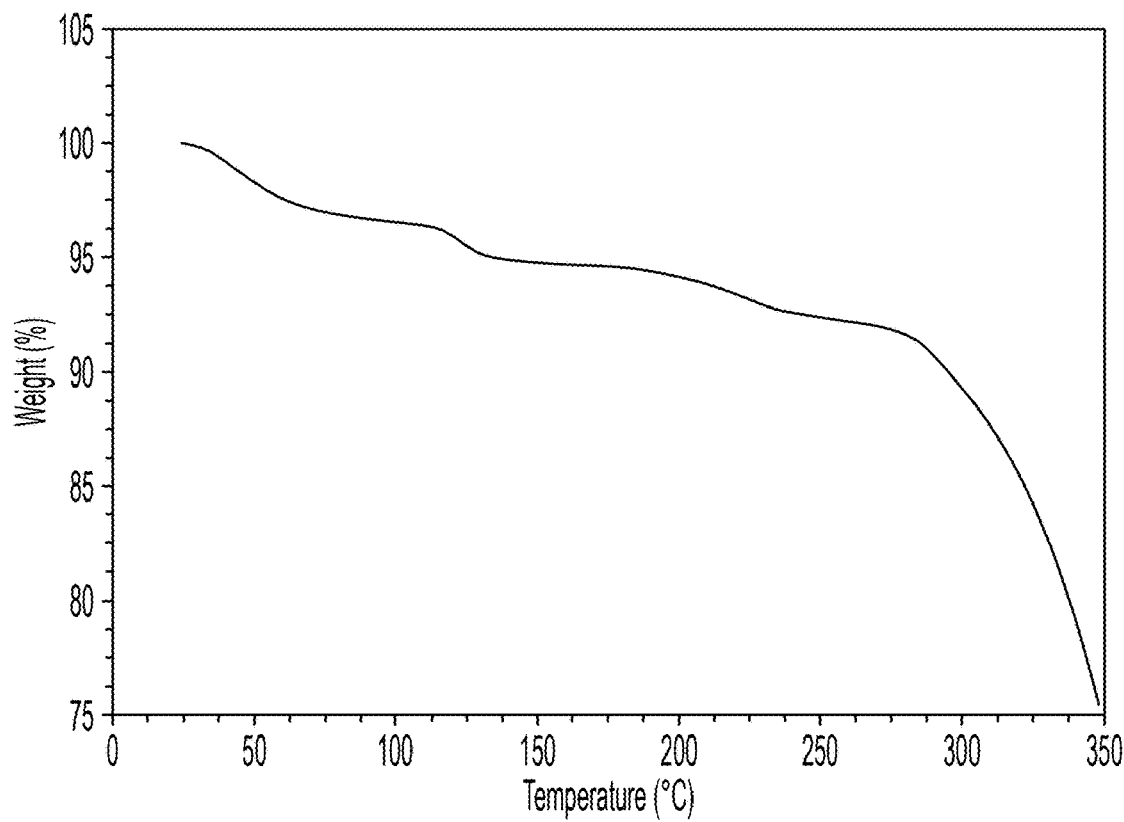
FIG. 17 depicts a TGA thermogram of Form F.

In other aspects, Form F can be characterized by a $^1$H NMR profile substantially as shown in FIG. 15. In other aspects, Form F can be characterized by a DSC thermogram substantially as shown in FIG. 16. In other aspects, Form F can be characterized by a TGA thermogram substantially as shown in FIG. 17.

Figure 18:
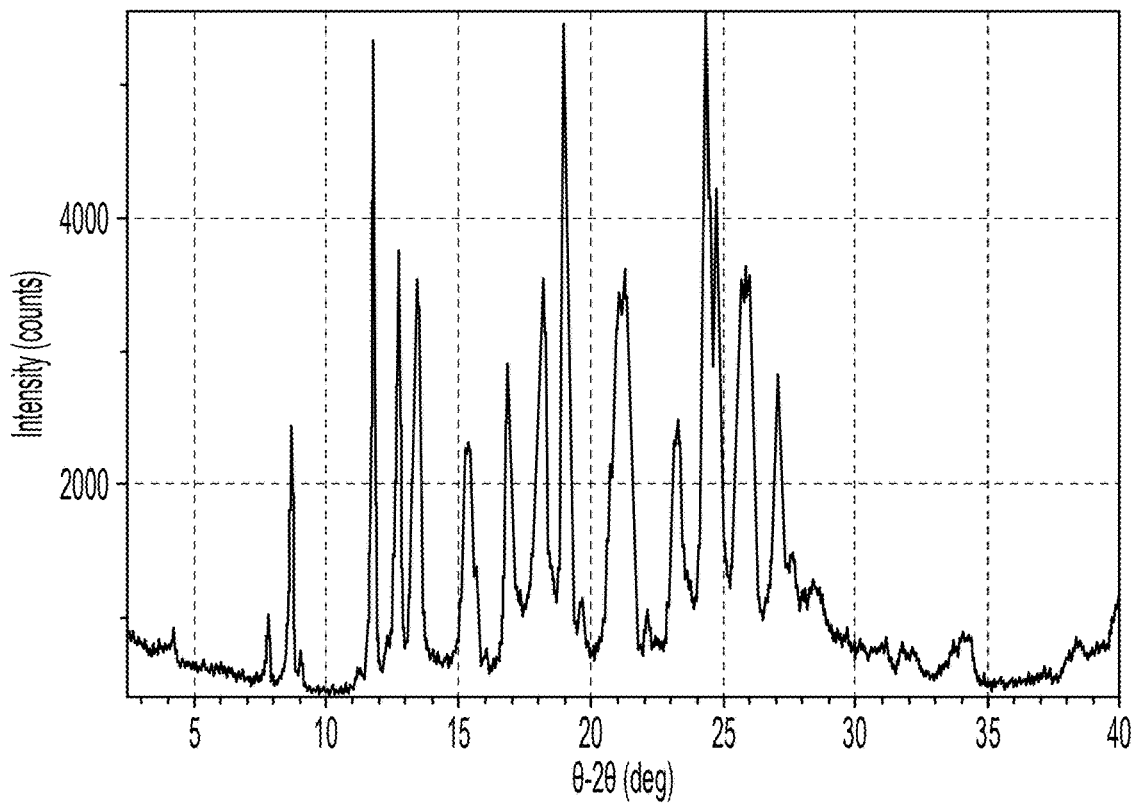
FIG. 18 depicts an X-ray diffraction pattern of a Compound 1 napadisylate salt/cocrystal (Form G).

Also provided herein is a Compound 1 napadisylate salt/cocrystal, referred to herein as Form G. In some aspects, Form G can be characterized by an X-ray diffraction pattern substantially as shown in FIG. 18. Diffraction peak positions for Form G that were obtained using the equipment and conditions specified in Example 3, infra, are shown below in Table 7 and 7A:

TABLE 7

Observed X-ray Powder Diffraction Peaks for Form G
°2θ

| |
|---|
| 4.2 ± 0.2 |
| 7.8 ± 0.2 |
| 8.7 ± 0.2 |
| 9.1 ± 0.2 |
| 11.8 ± 0.2 |
| 12.8 ± 0.2 |
| 13.5 ± 0.2 |
| 15.3 ± 0.2 |
| 15.7 ± 0.2 |
| 16.9 ± 0.2 |
| 18.2 ± 0.2 |
| 19.0 ± 0.2 |
| 19.7 ± 0.2 |
| 20.8 ± 0.2 |
| 21.1 ± 0.2 |
| 21.3 ± 0.2 |
| 22.2 ± 0.2 |
| 23.3 ± 0.2 |
| 24.4 ± 0.2 |
| 24.8 ± 0.2 |
| 25.9 ± 0.2 |
| 27.1 ± 0.2 |

TABLE 7A

Characteristic X-ray Powder Diffraction Peaks for Form G
°2θ

| |
|---|
| 11.8 ± 0.2 |
| 12.8 ± 0.2 |
| 13.5 ± 0.2 |
| 16.9 ± 0.2 |
| 18.2 ± 0.2 |
| 19.0 ± 0.2 |
| 21.3 ± 0.2 |

TABLE 7A-continued

Characteristic X-ray Powder Diffraction Peaks for Form G
°2θ

| |
|---|
| 24.4 ± 0.2 |
| 25.9 ± 0.2 |

Form G can be characterized by an X-ray diffraction pattern having at least one peak selected from Table 7A.

Figure 19:
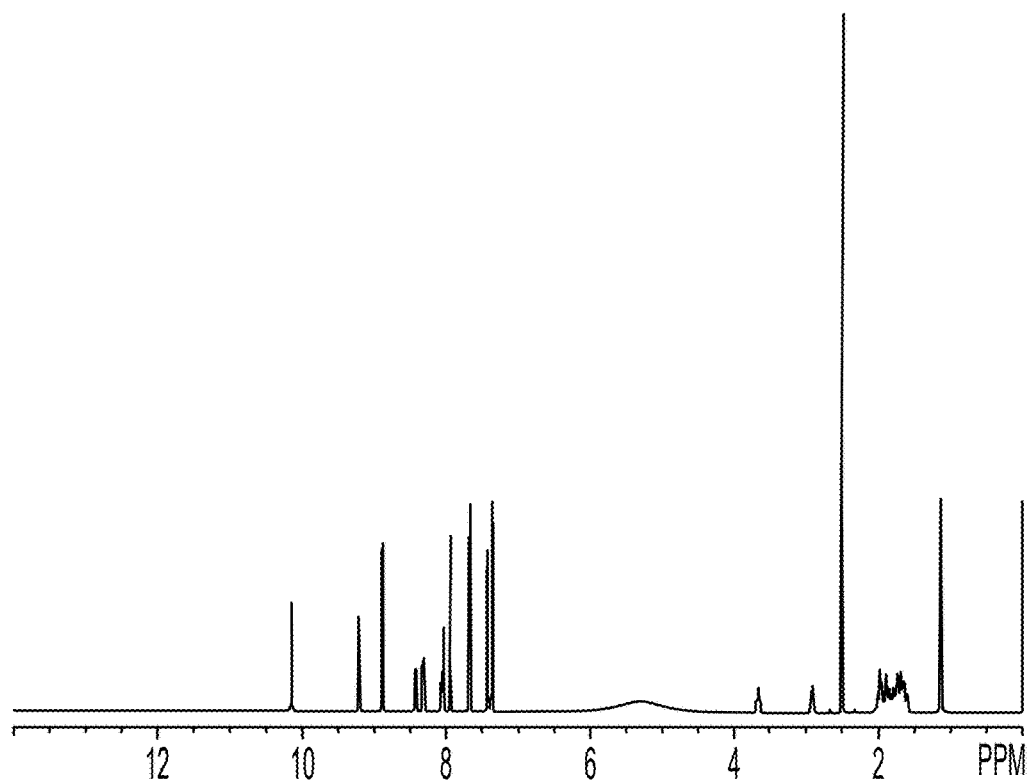
FIG. 19 depicts a $^1$H NMR profile of Form G.
Figure 20:
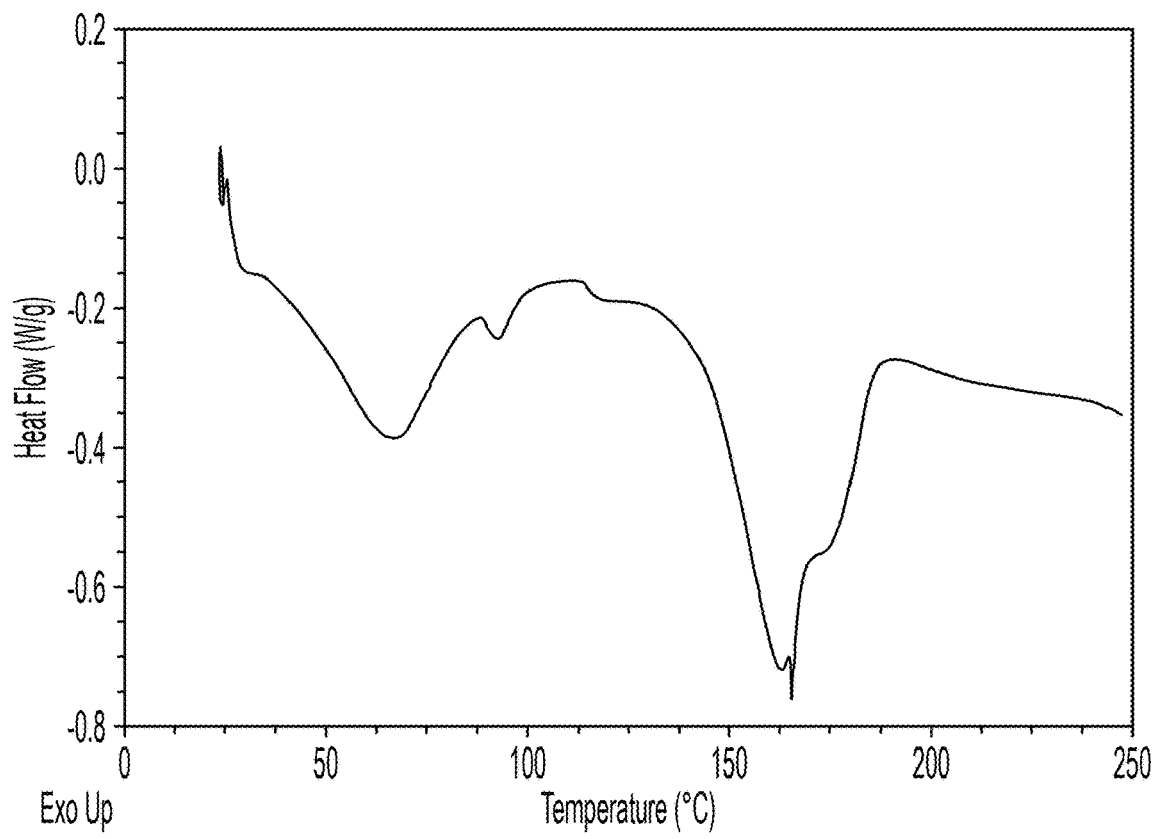
FIG. 20 depicts a DSC thermogram of Form G.
Figure 21:
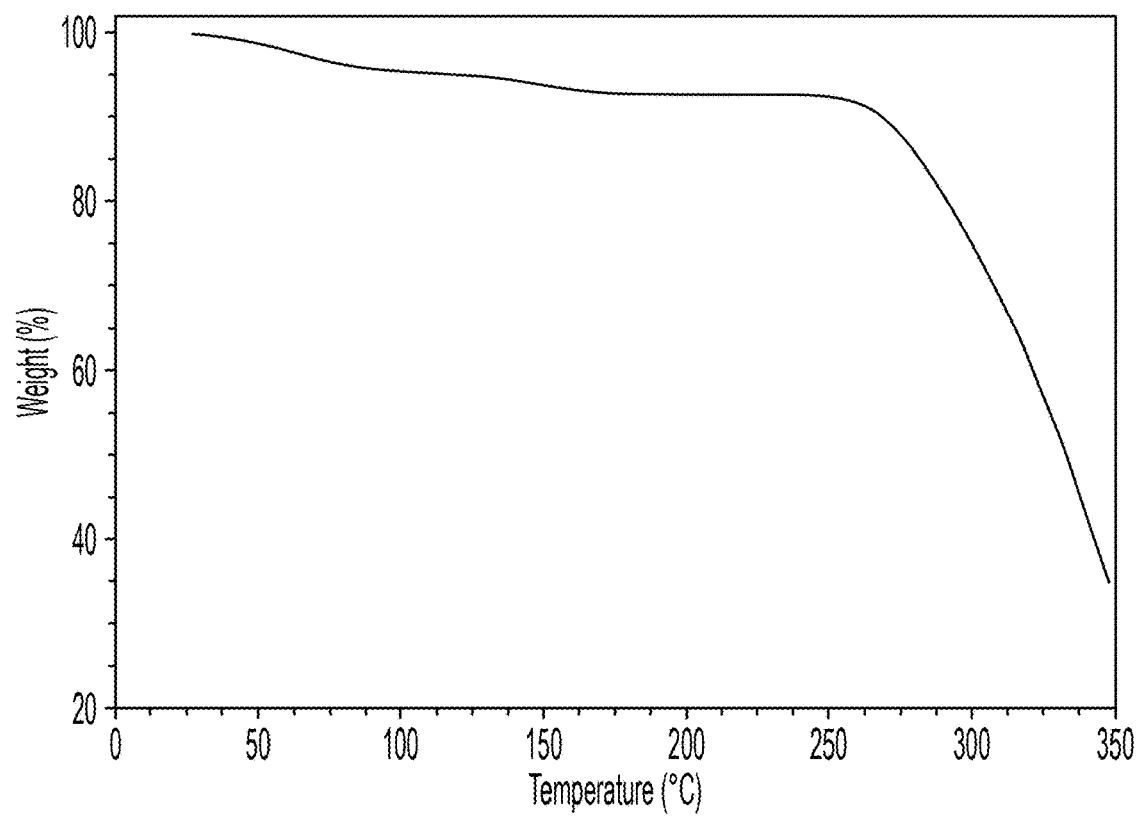
FIG. 21 depicts a TGA thermogram of Form G.

In other aspects, Form G can be characterized by a $^1$H NMR profile substantially as shown in FIG. 19. In other aspects, Form G can be characterized by a DSC thermogram substantially as shown in FIG. 20. In other aspects, Form G can be characterized by a TGA thermogram substantially as shown in FIG. 21.

Figure 22:
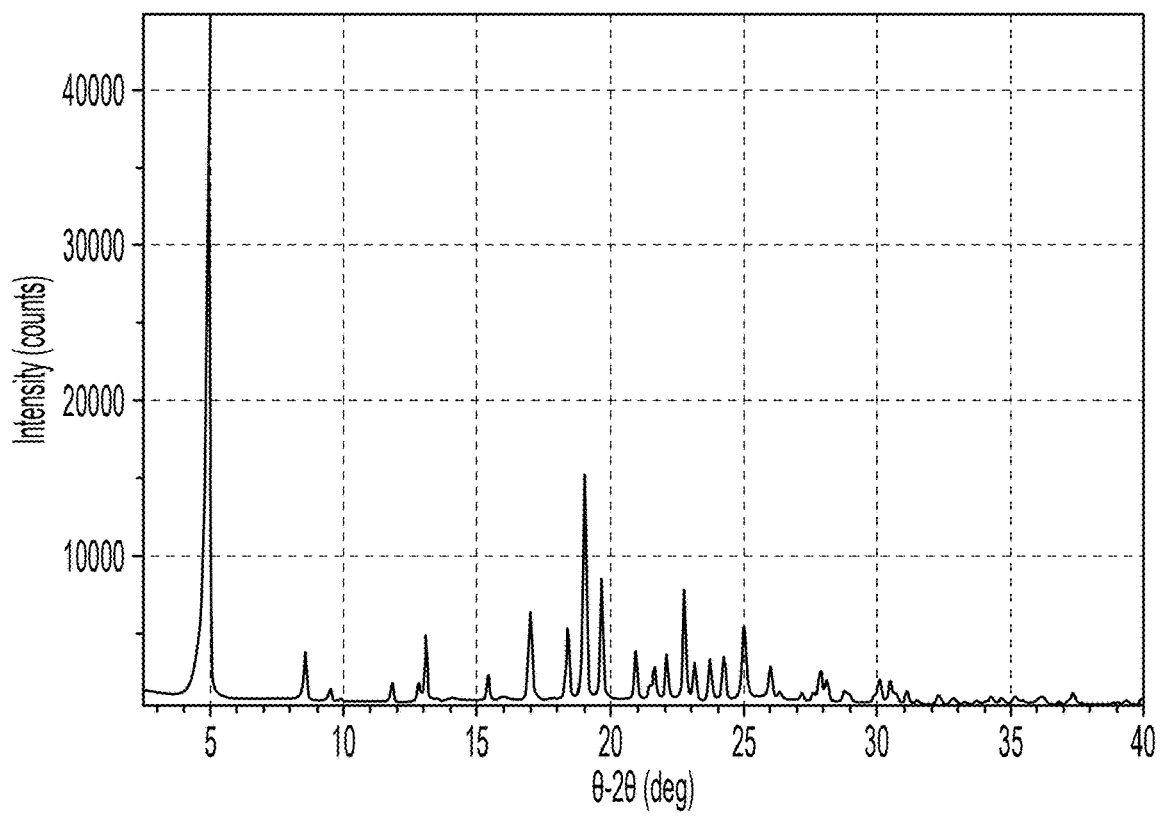
FIG. 22 depicts an X-ray diffraction pattern of a Compound 1 sulfate salt/cocrystal (Form H).
Figure 23:
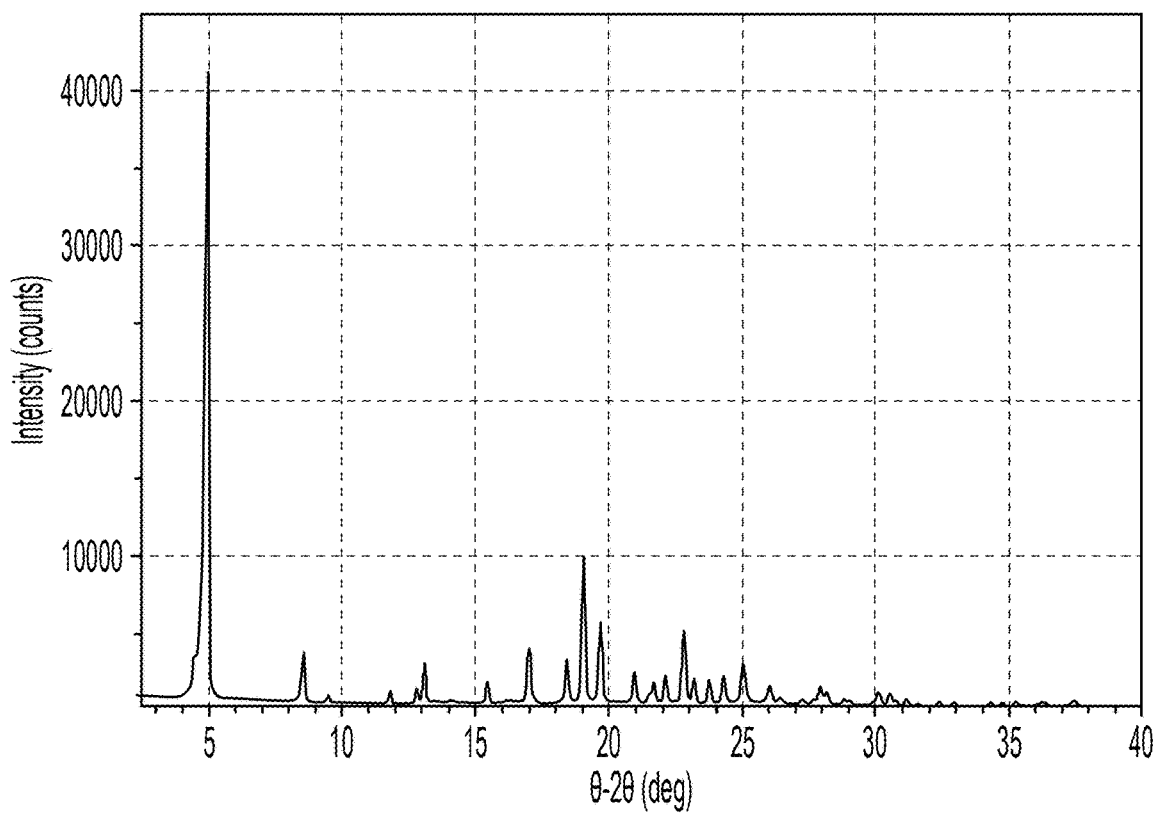
FIG. 23 depicts a further X-ray diffraction pattern of Compound 1 sulfate salt/cocrystal Form H.

Also provided herein is a Compound 1 sulfate salt/cocrystal, referred to herein as Form H. In some aspects, Form H can be characterized by an X-ray diffraction pattern substantially as shown in FIG. 22, or by an X-ray diffraction pattern substantially as shown in FIG. 23. Diffraction peak positions for Form H that were obtained using the equipment and conditions specified in Example 3, infra, are shown below in Table 8 and 8A:

TABLE 8

Observed X-ray Powder Diffraction Peaks for Form H
°2θ

| |
|---|
| 4.9 ± 0.2 |
| 8.6 ± 0.2 |
| 9.5 ± 0.2 |
| 9.9 ± 0.2 |
| 11.8 ± 0.2 |
| 12.8 ± 0.2 |
| 13.1 ± 0.2 |
| 15.4 ± 0.2 |
| 16.0 ± 0.2 |
| 17.0 ± 0.2 |
| 18.4 ± 0.2 |
| 19.0 ± 0.2 |
| 19.7 ± 0.2 |
| 21.0 ± 0.2 |
| 21.5 ± 0.2 |
| 21.7 ± 0.2 |
| 22.1 ± 0.2 |
| 22.8 ± 0.2 |
| 23.2 ± 0.2 |
| 23.8 ± 0.2 |
| 24.3 ± 0.2 |
| 25.0 ± 0.2 |
| 26.0 ± 0.2 |
| 26.4 ± 0.2 |
| 27.2 ± 0.2 |
| 27.7 ± 0.2 |
| 27.9 ± 0.2 |
| 28.1 ± 0.2 |

TABLE 8A

Characteristic X-ray Powder Diffraction Peaks for Form H
°2θ

| |
|---|
| 4.9 ± 0.2 |
| 13.1 ± 0.2 |
| 17.0 ± 0.2 |
| 18.4 ± 0.2 |
| 19.0 ± 0.2 |
| 19.7 ± 0.2 |
| 22.8 ± 0.2 |
| 25.0 ± 0.2 |

Form H can be characterized by an X-ray diffraction pattern having at least one peak selected from Table 8A.

Figure 24:
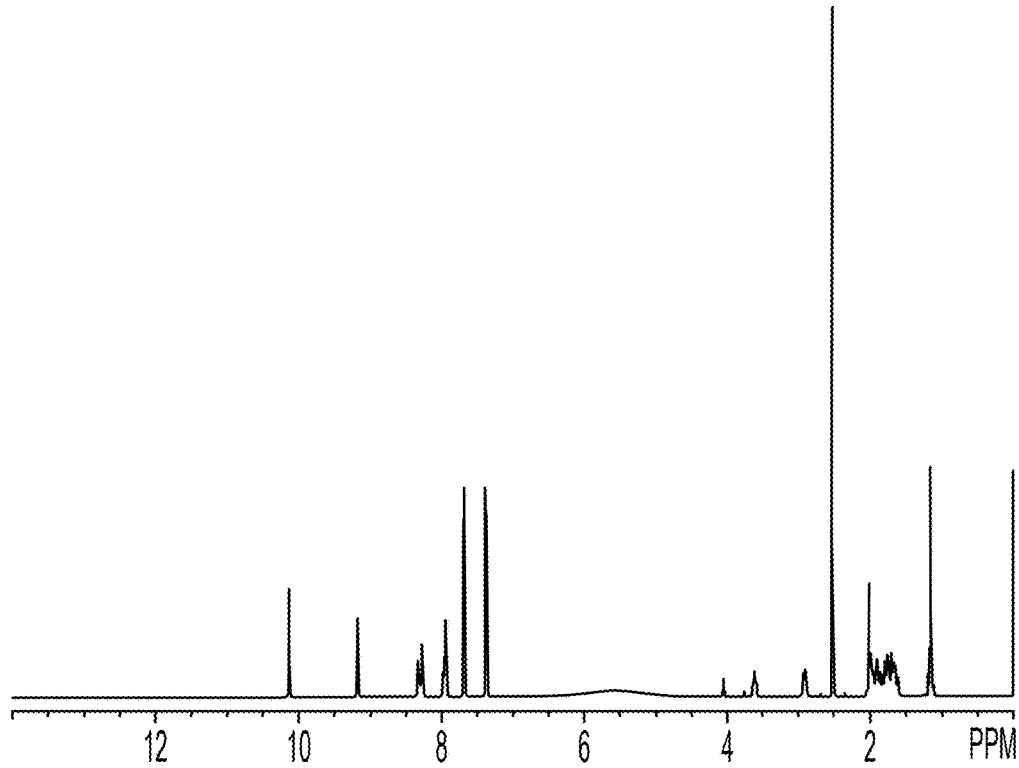
FIG. 24 depicts a $^1$H NMR profile of Form H.
Figure 25:
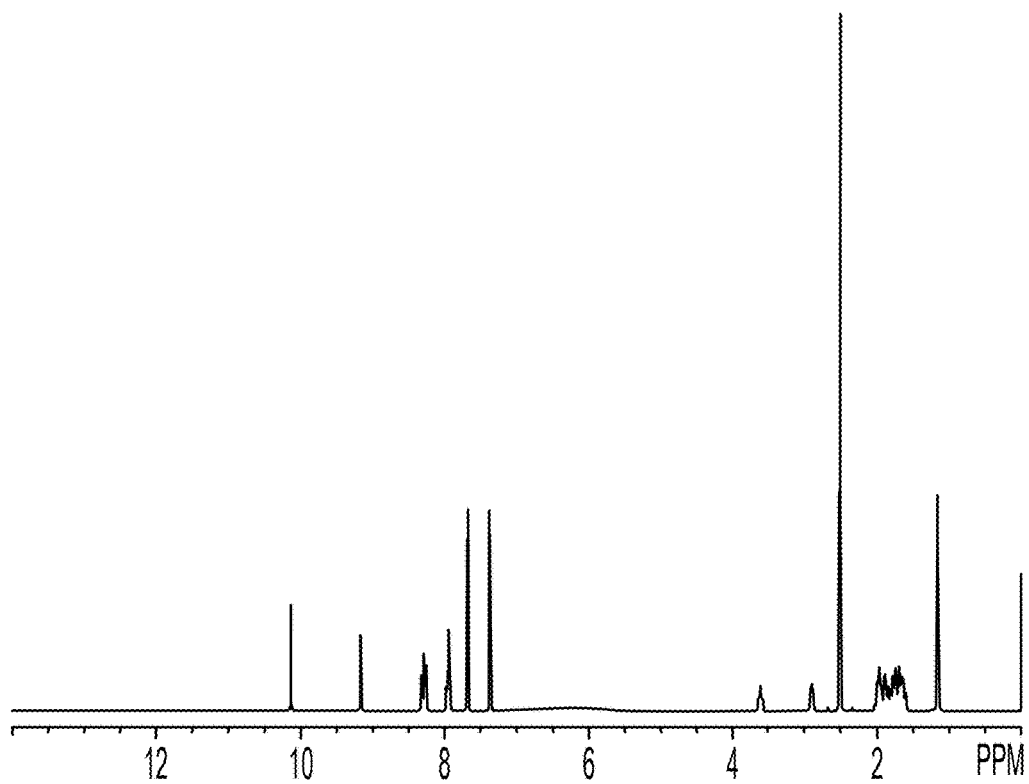
FIG. 25 depicts a further $^1$H NMR profile of Form H.
Figure 26:
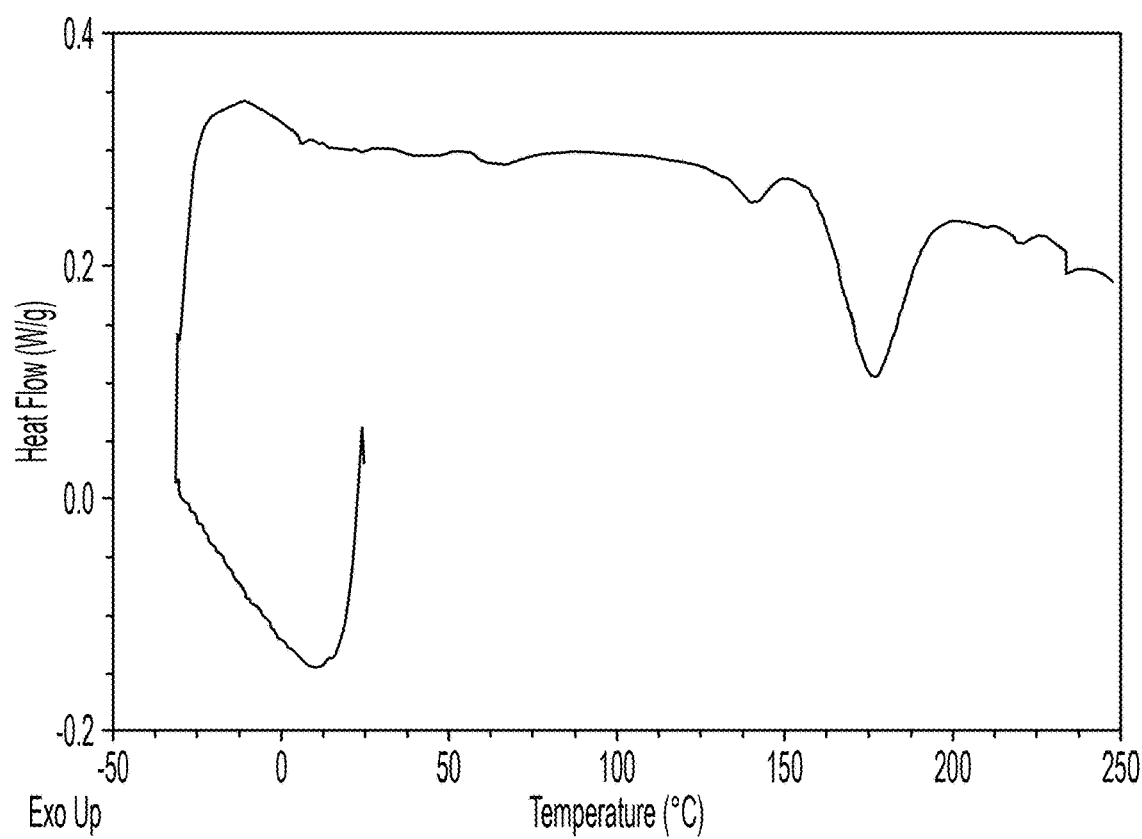
FIG. 26 depicts a DSC thermogram of Form H.
Figure 27:
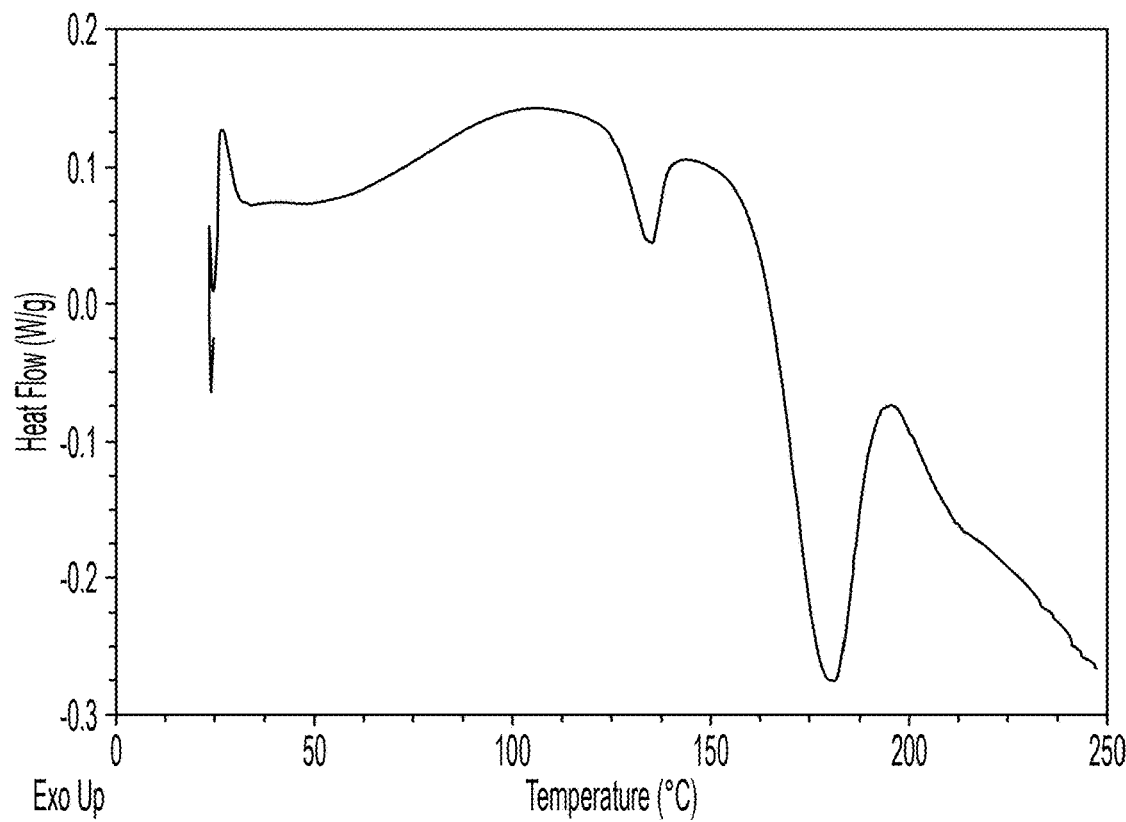
FIG. 27 depicts a further DSC thermogram of Form H.
Figure 28:
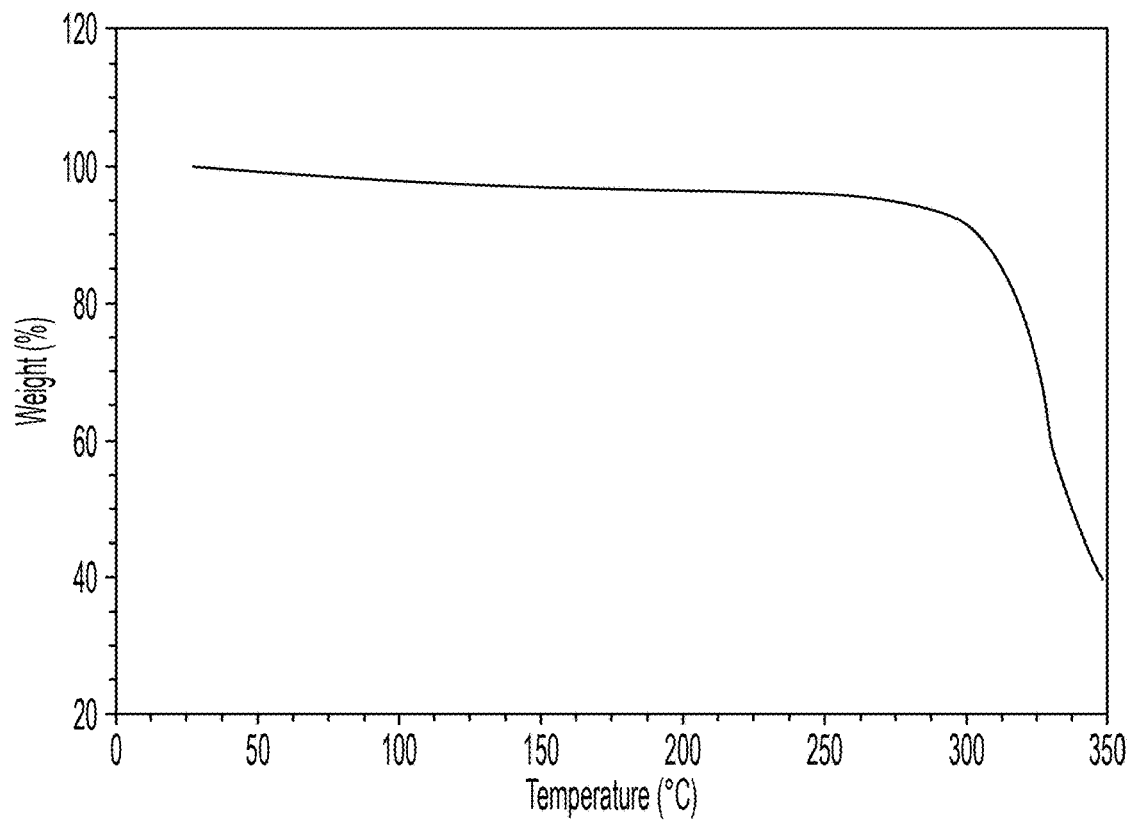
FIG. 28 depicts a TGA thermogram of Form H.
Figure 29:
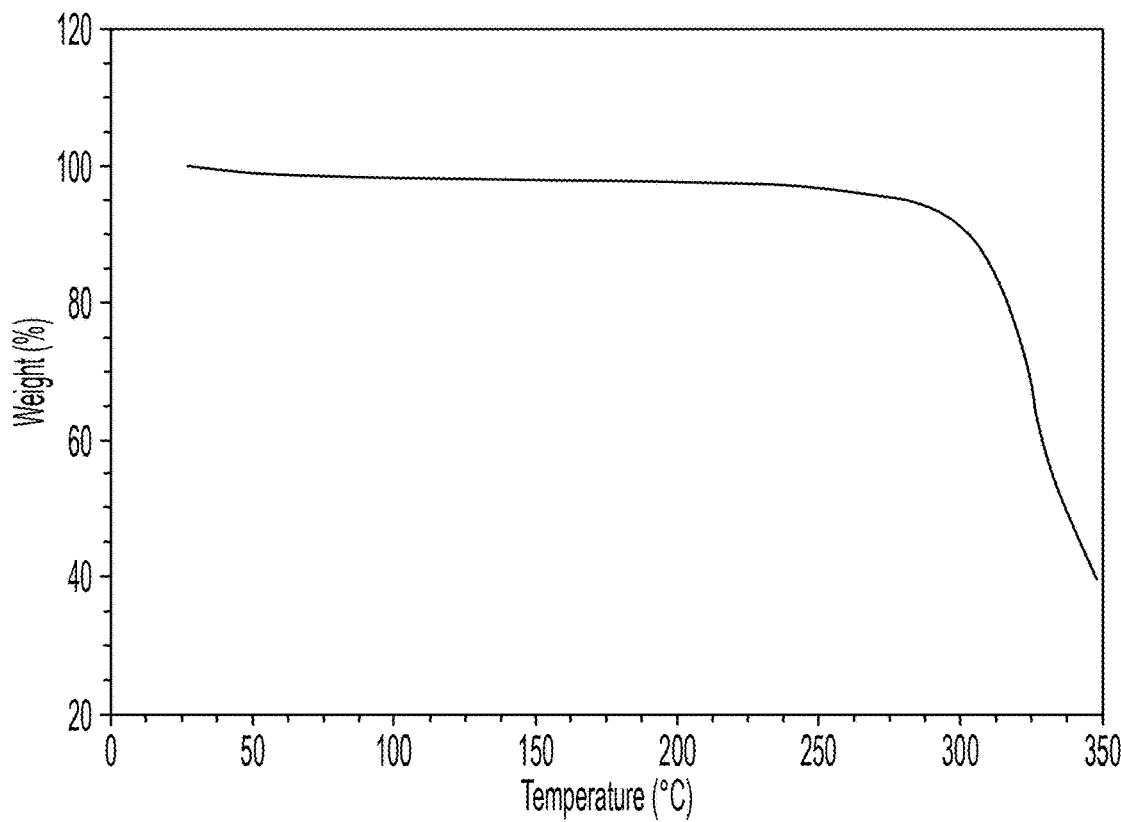
FIG. 29 depicts a further TGA thermogram of Form H.

In other aspects, Form H can be characterized by a $^1$H NMR profile substantially as shown in FIG. 24 (material prepared from ethyl acetate), or by a $^1$H NMR profile substantially as shown in FIG. 25 (material prepared from isopropanol). In other aspects, Form H can be characterized by a DSC thermogram substantially as shown in FIG. 26 (material prepared from ethyl acetate), or by a DSC thermogram substantially as shown in FIG. 27 (material prepared from isopropanol). In other aspects, Form H can be characterized by a TGA thermogram substantially as shown in FIG. 28 (material prepared from ethyl acetate), or by a TGA thermogram substantially as shown in FIG. 29 (material prepared from isopropanol).

Figure 30:
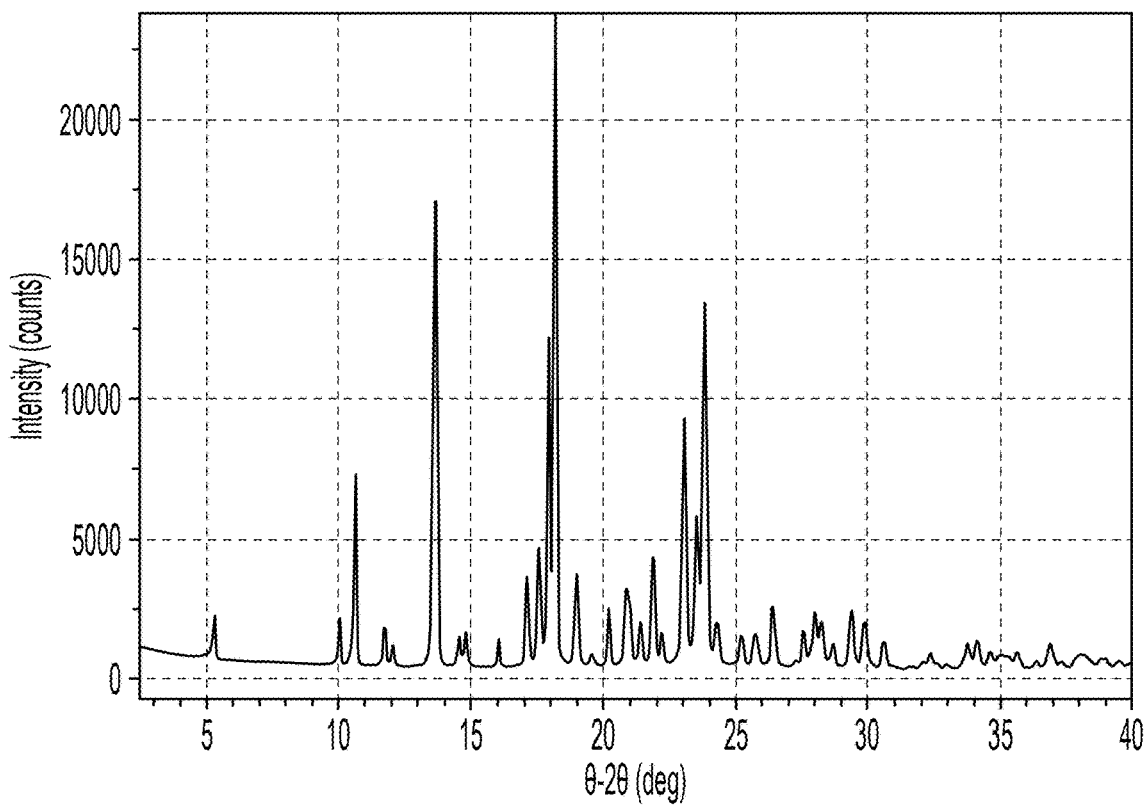
FIG. 30 depicts an X-ray diffraction pattern of a Compound 1 besylate salt/cocrystal (Form I).

Also provided herein is a Compound 1 besylate salt/cocrystal, referred to herein as Form I. In some aspects, Form I can be characterized by an X-ray diffraction pattern substantially as shown in FIG. 30. Diffraction peak positions for Form I that were obtained using the equipment and conditions specified in Example 3, infra, are shown below in Table 9 and 9A:

TABLE 9

| Observed X-ray Powder Diffraction Peaks for Form I °2θ |
|---|
| 5.3 ± 0.2 |
| 10.1 ± 0.2 |
| 10.7 ± 0.2 |
| 11.8 ± 0.2 |
| 12.1 ± 0.2 |
| 13.7 ± 0.2 |
| 14.6 ± 0.2 |
| 14.8 ± 0.2 |
| 16.1 ± 0.2 |
| 17.1 ± 0.2 |
| 17.6 ± 0.2 |
| 18.0 ± 0.2 |
| 18.2 ± 0.2 |
| 19.0 ± 0.2 |
| 19.6 ± 0.2 |
| 20.2 ± 0.2 |
| 20.9 ± 0.2 |
| 21.4 ± 0.2 |
| 21.9 ± 0.2 |
| 22.2 ± 0.2 |
| 23.1 ± 0.2 |
| 23.6 ± 0.2 |
| 23.9 ± 0.2 |
| 24.3 ± 0.2 |
| 25.2 ± 0.2 |
| 25.8 ± 0.2 |
| 26.4 ± 0.2 |
| 27.6 ± 0.2 |
| 28.0 ± 0.2 |
| 28.3 ± 0.2 |
| 28.7 ± 0.2 |
| 29.4 ± 0.2 |
| 29.9 ± 0.2 |
| 30.6 ± 0.2 |

TABLE 9A

| Characteristic X-ray Powder Diffraction Peaks for Form I °2θ |
|---|
| 10.7 ± 0.2 |
| 13.7 ± 0.2 |
| 18.2 ± 0.2 |
| 23.1 ± 0.2 |
| 23.9 ± 0.2 |

Form I can be characterized by an X-ray diffraction pattern having at least one peak selected from Table 9A.

Figure 31:
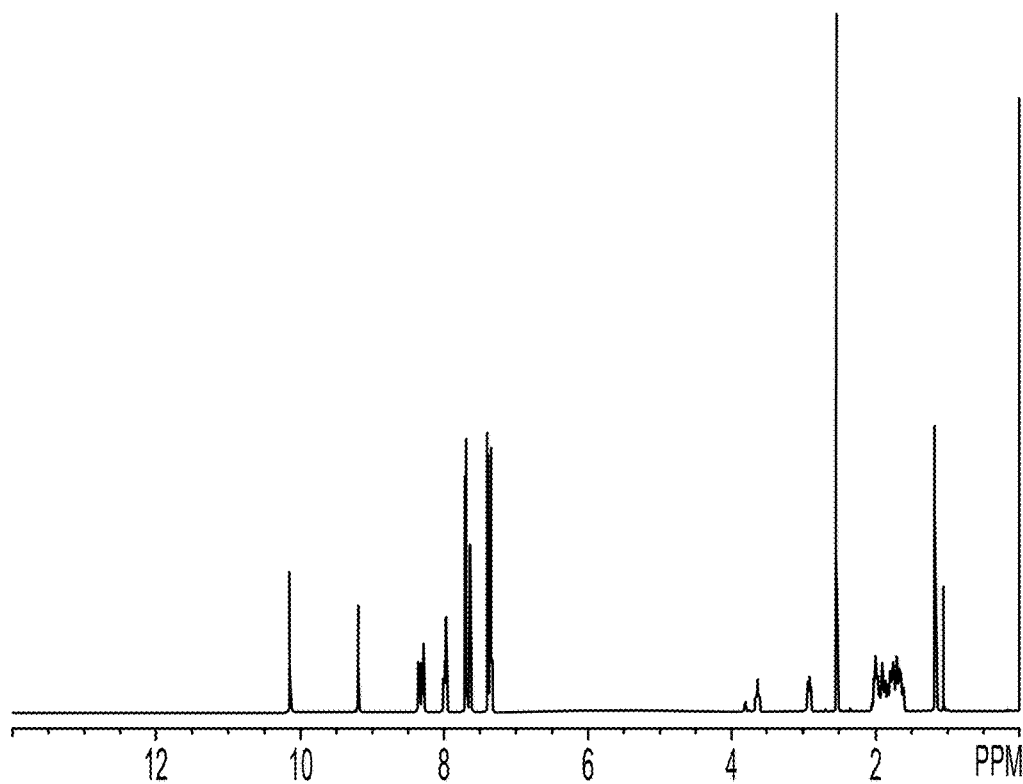
FIG. 31 depicts a $^1$H NMR profile of Form I.
Figure 32:
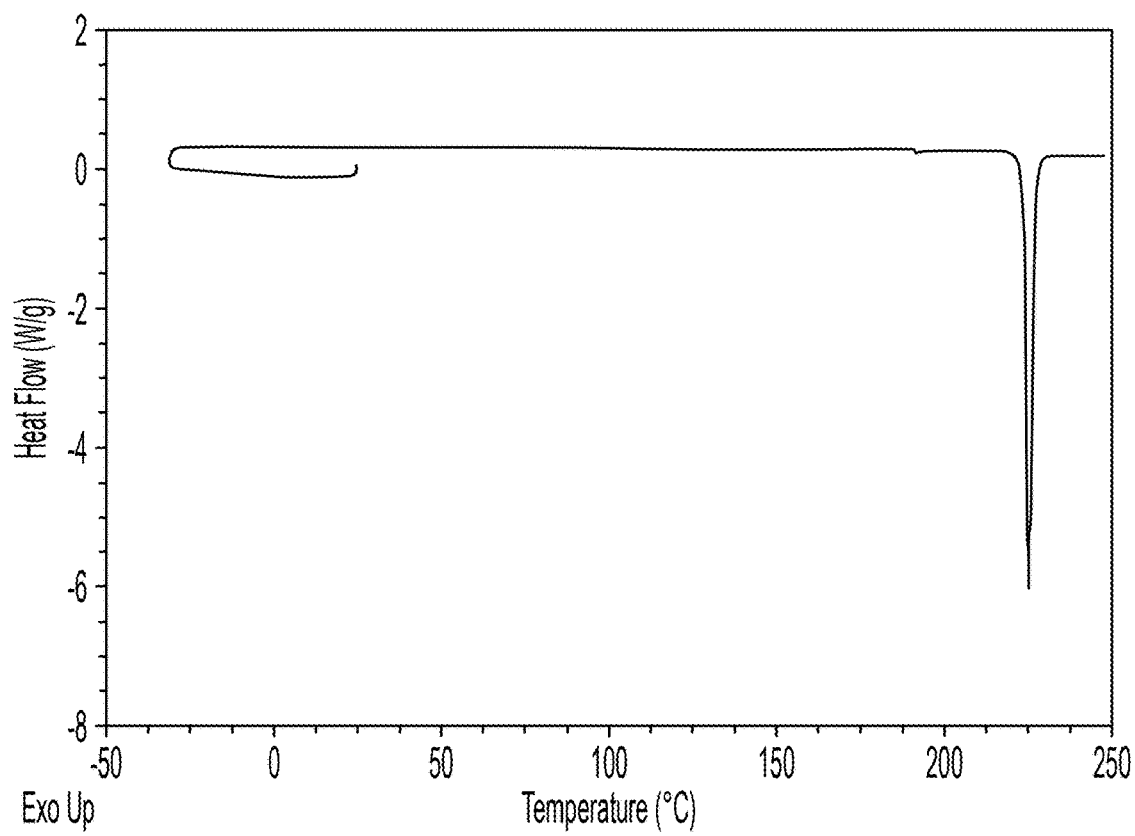
FIG. 32 depicts a DSC thermogram of Form I.
Figure 33:
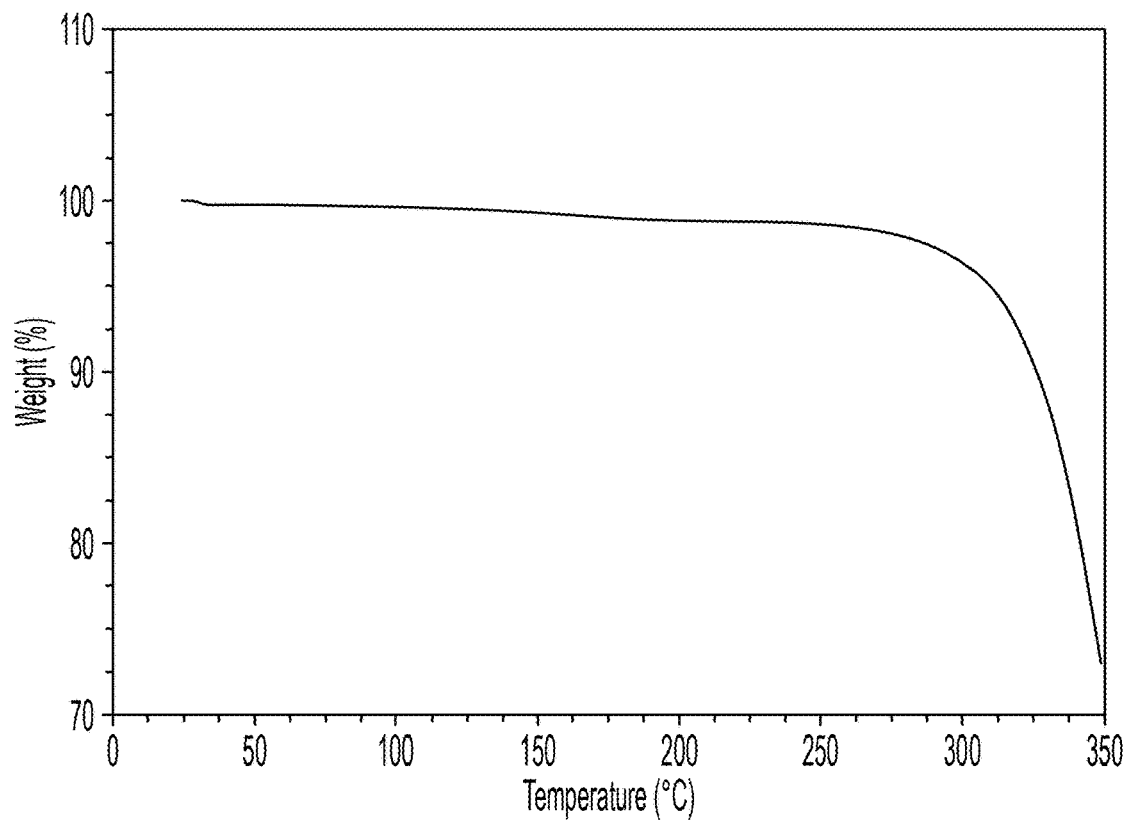
FIG. 33 depicts a TGA thermogram of Form I.

In other aspects, Form I can be characterized by a $^1$H NMR profile substantially as shown in FIG. 31. In other aspects, Form I can be characterized by a DSC thermogram substantially as shown in FIG. 32. In other aspects, Form I can be characterized by a TGA thermogram substantially as shown in FIG. 33.

Figure 34:
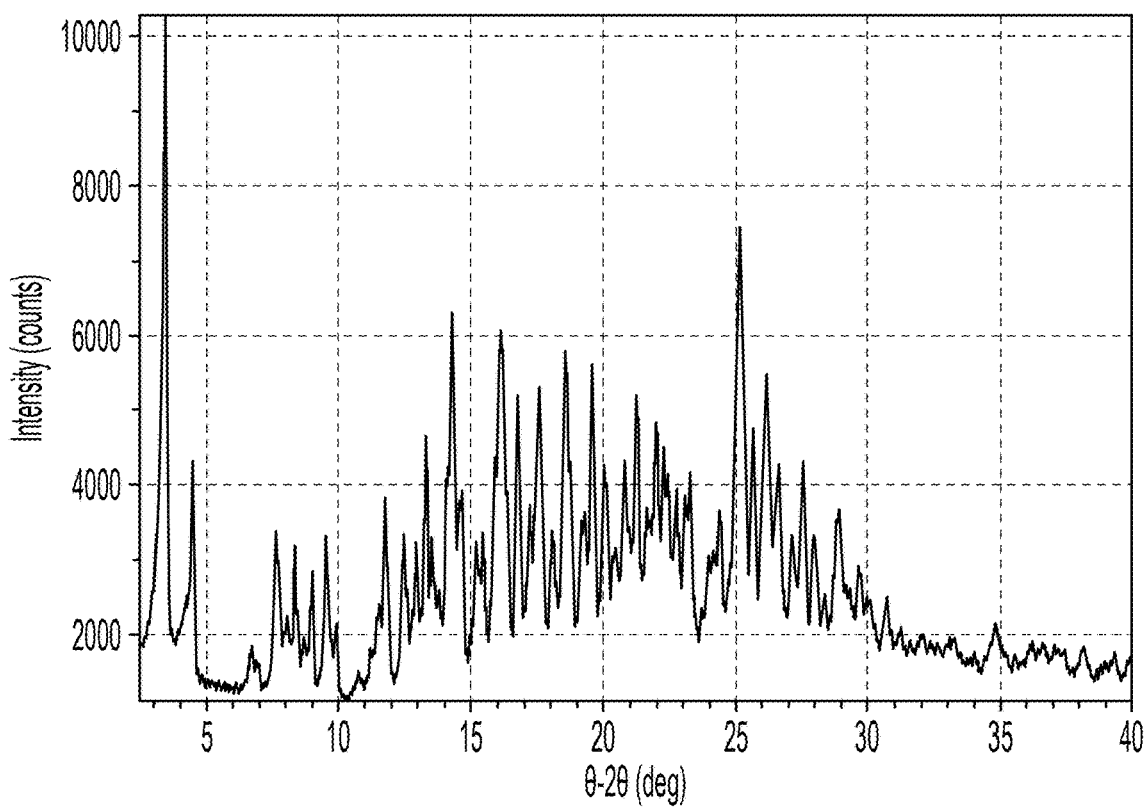
FIG. 34 depicts an X-ray diffraction pattern of a Compound 1 citric acid salt/cocrystal (Form J).

Also provided herein is a Compound 1 citric acid salt/cocrystal, referred to herein as Form J. In some aspects, Form J can be characterized by an X-ray diffraction pattern substantially as shown in FIG. 34. Diffraction peak positions for Form J that were obtained using the equipment and conditions specified in Example 3, infra, are shown below in Table 10 and 10A:

TABLE 10

| Observed X-ray Powder Diffraction Peaks for Form J °2θ |
|---|
| 3.4 ± 0.2 |
| 4.5 ± 0.2 |
| 6.7 ± 0.2 |
| 6.9 ± 0.2 |
| 7.7 ± 0.2 |
| 8.1 ± 0.2 |
| 8.3 ± 0.2 |
| 8.7 ± 0.2 |
| 9.0 ± 0.2 |
| 9.5 ± 0.2 |
| 9.9 ± 0.2 |
| 10.8 ± 0.2 |
| 11.2 ± 0.2 |
| 11.5 ± 0.2 |
| 11.8 ± 0.2 |
| 12.5 ± 0.2 |
| 12.6 ± 0.2 |
| 12.8 ± 0.2 |
| 13.0 ± 0.2 |
| 13.3 ± 0.2 |
| 13.6 ± 0.2 |
| 13.8 ± 0.2 |
| 14.1 ± 0.2 |
| 14.3 ± 0.2 |
| 14.6 ± 0.2 |
| 14.7 ± 0.2 |
| 15.2 ± 0.2 |
| 15.5 ± 0.2 |
| 15.9 ± 0.2 |
| 16.1 ± 0.2 |
| 16.8 ± 0.2 |
| 17.2 ± 0.2 |
| 17.6 ± 0.2 |
| 18.1 ± 0.2 |
| 18.6 ± 0.2 |
| 18.8 ± 0.2 |
| 19.3 ± 0.2 |
| 19.6 ± 0.2 |
| 20.1 ± 0.2 |
| 20.8 ± 0.2 |
| 21.3 ± 0.2 |
| 21.7 ± 0.2 |
| 22.0 ± 0.2 |
| 22.3 ± 0.2 |
| 22.5 ± 0.2 |
| 22.8 ± 0.2 |
| 23.1 ± 0.2 |
| 23.3 ± 0.2 |
| 24.4 ± 0.2 |
| 25.2 ± 0.2 |
| 25.7 ± 0.2 |
| 26.2 ± 0.2 |
| 26.6 ± 0.2 |
| 27.2 ± 0.2 |
| 27.5 ± 0.2 |
| 28.0 ± 0.2 |
| 28.4 ± 0.2 |

TABLE 10-continued

Observed X-ray Powder Diffraction Peaks for Form J
°2θ

28.9 ± 0.2
29.7 ± 0.2

TABLE 10A

Characteristic X-ray Powder Diffraction Peaks for Form J
°2θ

3.4 ± 0.2
4.5 ± 0.2
14.3 ± 0.2
16.1 ± 0.2
16.8 ± 0.2
17.6 ± 0.2
18.6 ± 0.2
19.6 ± 0.2
25.2 ± 0.2

Form J can be characterized by an X-ray diffraction pattern having at least one peak selected from Table 10A.

Figure 35:
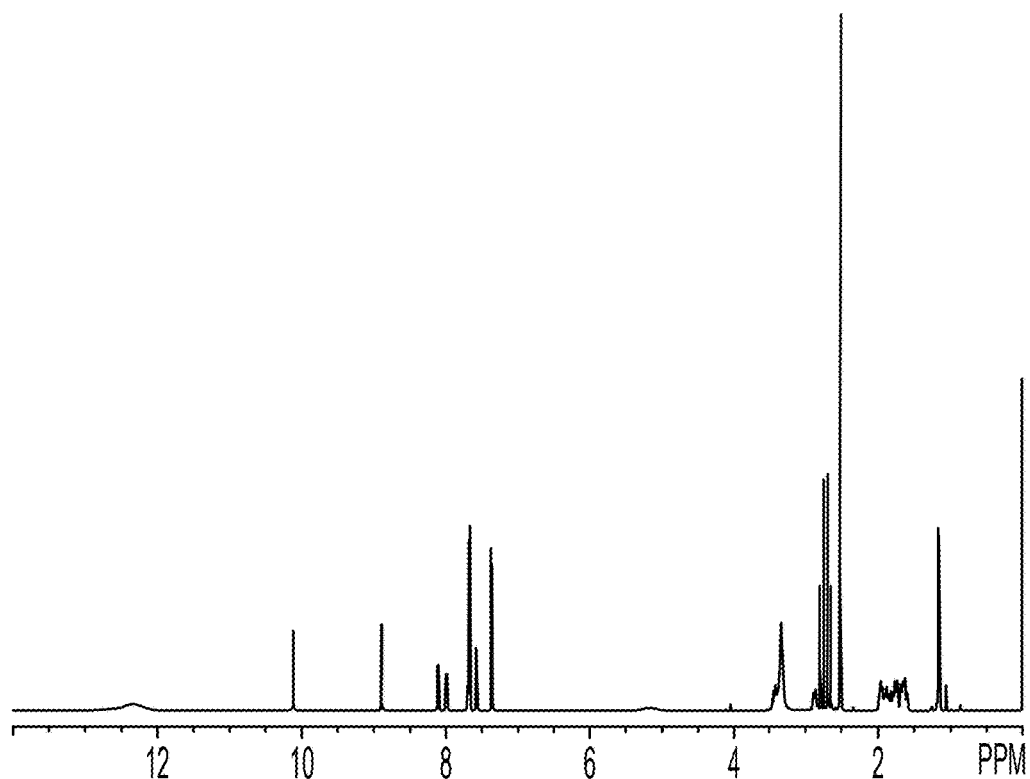
FIG. 35 depicts a $^1$H NMR profile of Form J.
Figure 36:
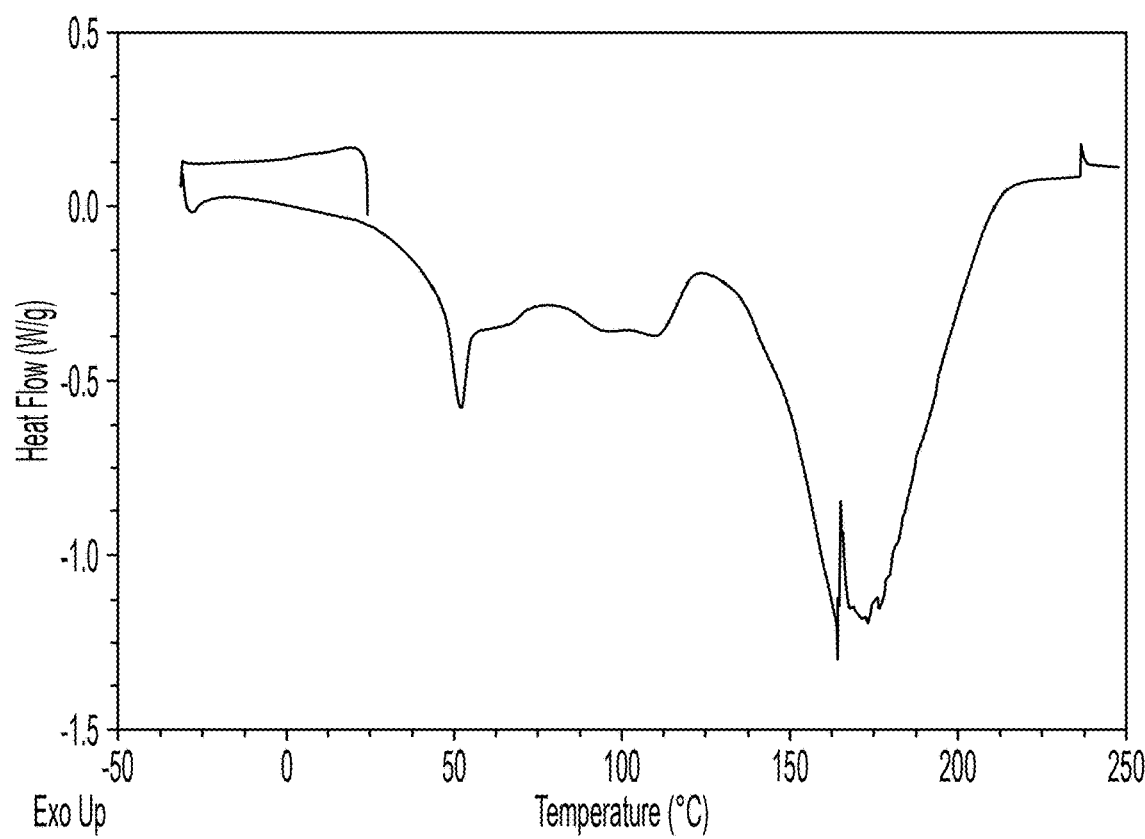
FIG. 36 depicts a DSC thermogram of Form J.
Figure 37:
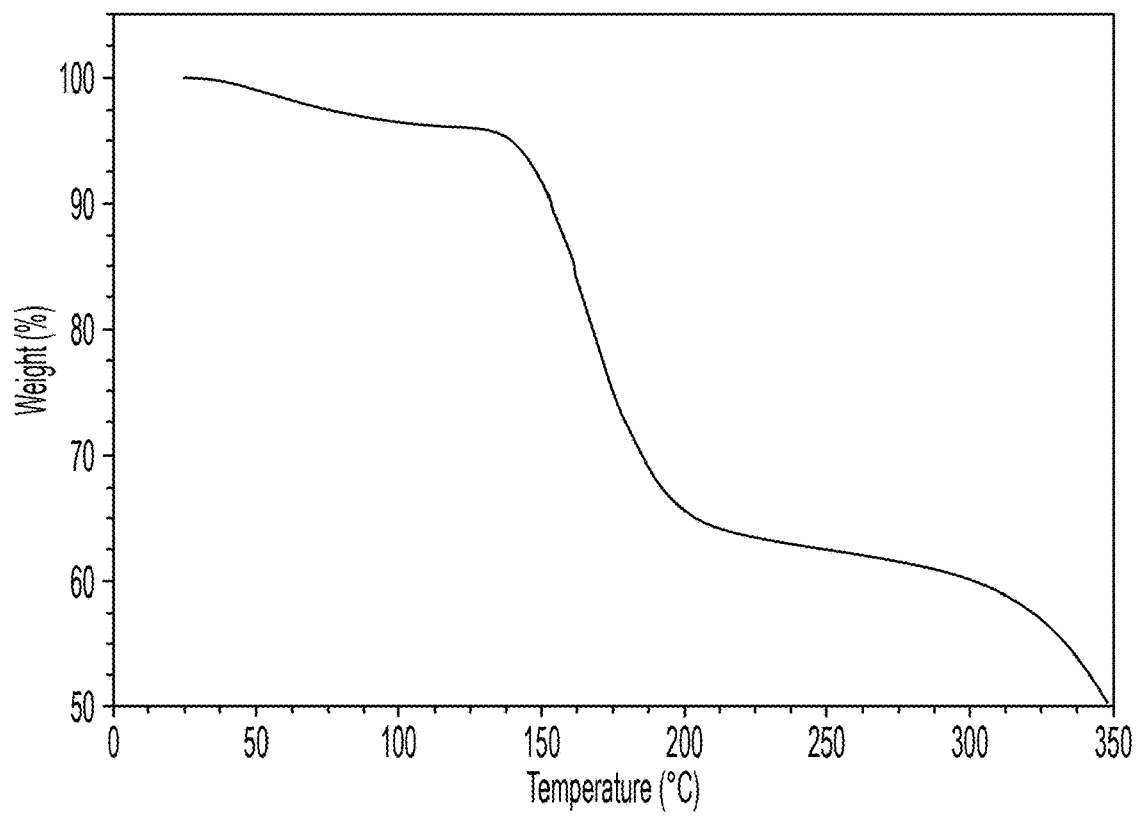
FIG. 37 depicts a TGA thermogram of Form J.

In other aspects, Form J can be characterized by a $^1$H NMR profile substantially as shown in FIG. 35. In other aspects, Form J can be characterized by a DSC thermogram substantially as shown in FIG. 36. In other aspects, Form J can be characterized by a TGA thermogram substantially as shown in FIG. 37.

Figure 38:
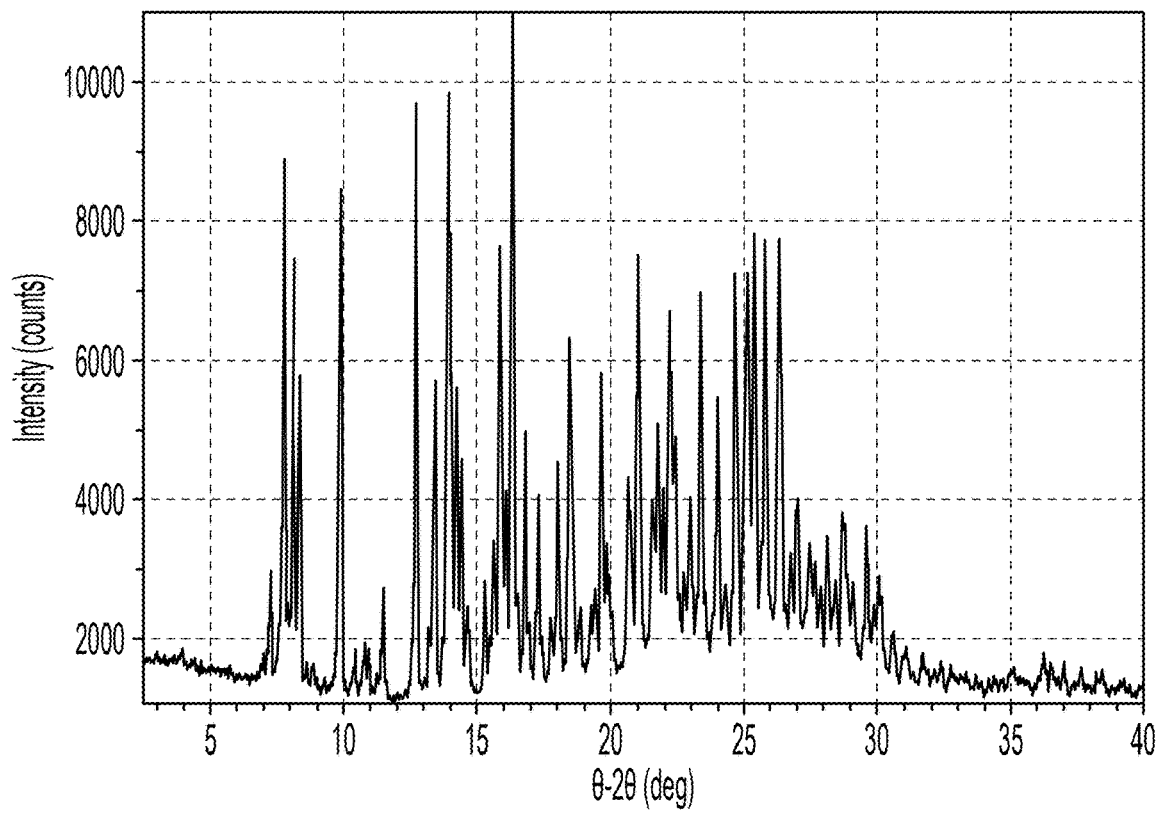
FIG. 38 depicts an X-ray diffraction pattern of a Compound 1 L-malic acid salt/cocrystal (Form K).

Also provided herein is a Compound 1 L-malic acid salt/cocrystal, referred to herein as Form K. In some aspects, Form K can be characterized by an X-ray diffraction pattern substantially as shown in FIG. 38. Diffraction peak positions for Form K that were obtained using the equipment and conditions specified in Example 3, infra, are shown below in Table 11 and 11A:

TABLE 11

Observed X-ray Powder Diffraction Peaks for Form K
°2θ

4.0 ± 0.2
7.0 ± 0.2
7.3 ± 0.2
7.8 ± 0.2
8.2 ± 0.2
8.4 ± 0.2
8.6 ± 0.2
8.9 ± 0.2
9.3 ± 0.2
9.9 ± 0.2
10.4 ± 0.2
10.8 ± 0.2
10.9 ± 0.2
11.3 ± 0.2
11.5 ± 0.2
12.8 ± 0.2
13.2 ± 0.2
13.5 ± 0.2
14.0 ± 0.2
14.1 ± 0.2
14.3 ± 0.2
14.4 ± 0.2
14.7 ± 0.2
15.3 ± 0.2
15.5 ± 0.2
15.7 ± 0.2
15.9 ± 0.2
16.1 ± 0.2
16.4 ± 0.2
16.5 ± 0.2

TABLE 11-continued

Observed X-ray Powder Diffraction Peaks for Form K
°2θ

16.8 ± 0.2
17.0 ± 0.2
17.3 ± 0.2
17.8 ± 0.2
18.1 ± 0.2
18.5 ± 0.2
18.9 ± 0.2
19.3 ± 0.2
19.5 ± 0.2
19.7 ± 0.2
19.9 ± 0.2
20.7 ± 0.2
21.1 ± 0.2
21.6 ± 0.2
21.8 ± 0.2
22.0 + 0.2
22.3 ± 0.2
22.5 ± 0.2
22.8 ± 0.2
23.0 ± 0.2
23.4 ± 0.2
24.0 ± 0.2
24.3 ± 0.2
24.7 ± 0.2
25.1 ± 0.2
25.2 ± 0.2
25.4 ± 0.2
25.8 ± 0.2
26.4 ± 0.2
26.8 ± 0.2
27.0 ± 0.2
27.1 ± 0.2
27.5 ± 0.2
27.7 ± 0.2
27.9 ± 0.2
28.2 ± 0.2
28.3 ± 0.2
28.5 ± 0.2
28.8 ± 0.2
28.8 ± 0.2
29.1 ± 0.2
29.6 ± 0.2

TABLE 11A

Characteristic X-ray Powder Diffraction Peaks for Form K
°2θ

7.8 ± 0.2
9.9 ± 0.2
12.8 ± 0.2
14.0 ± 0.2
15.9 ± 0.2
16.4 ± 0.2

Form K can be characterized by an X-ray diffraction pattern having at least one peak selected from Table 11A.

Figure 39:
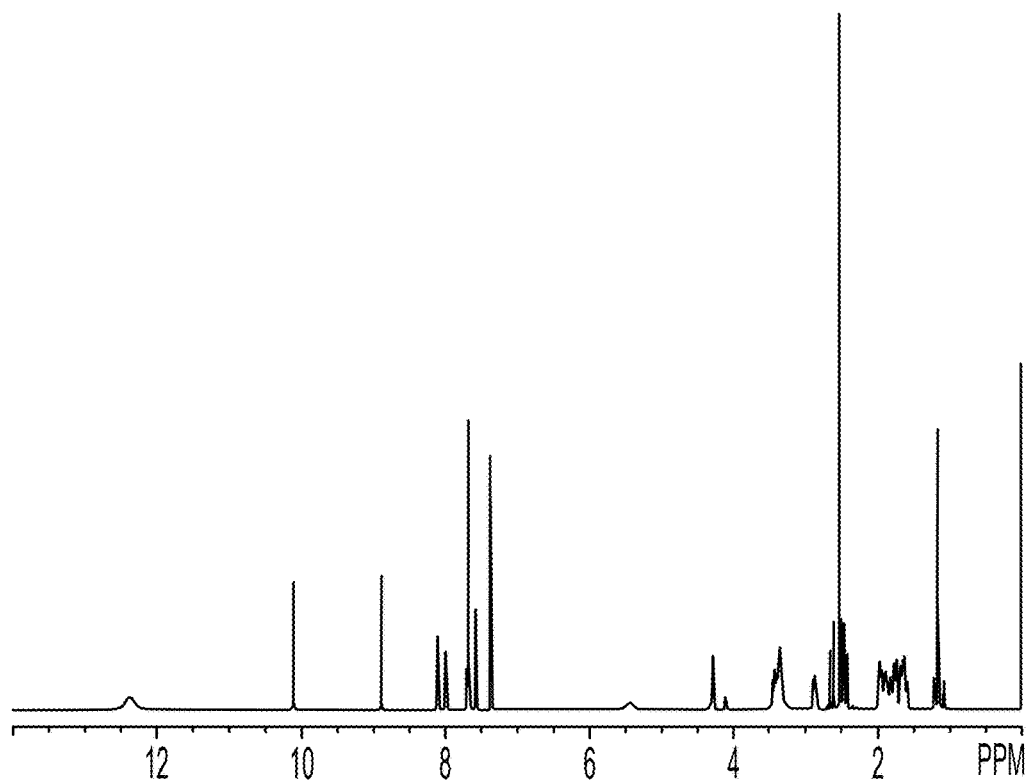
FIG. 39 depicts a $^1$H NMR profile of Form K.
Figure 40:
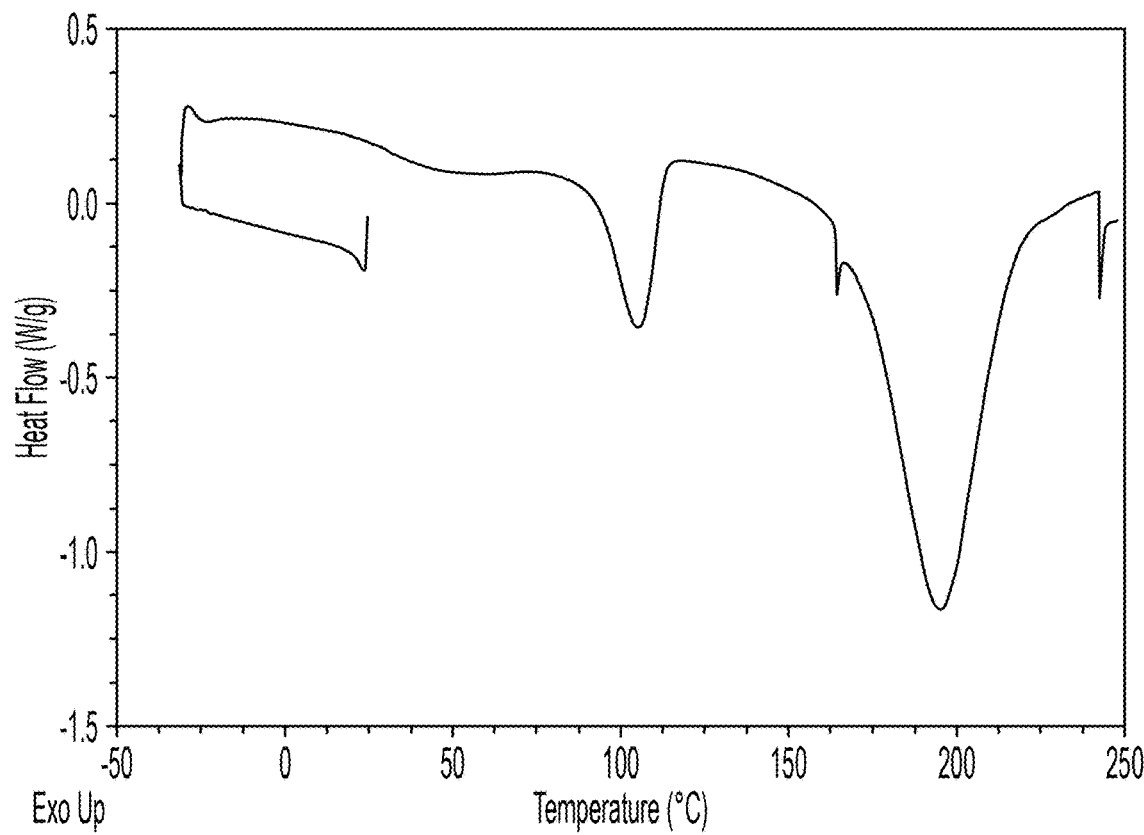
FIG. 40 depicts a DSC thermogram of Form K.
Figure 41:
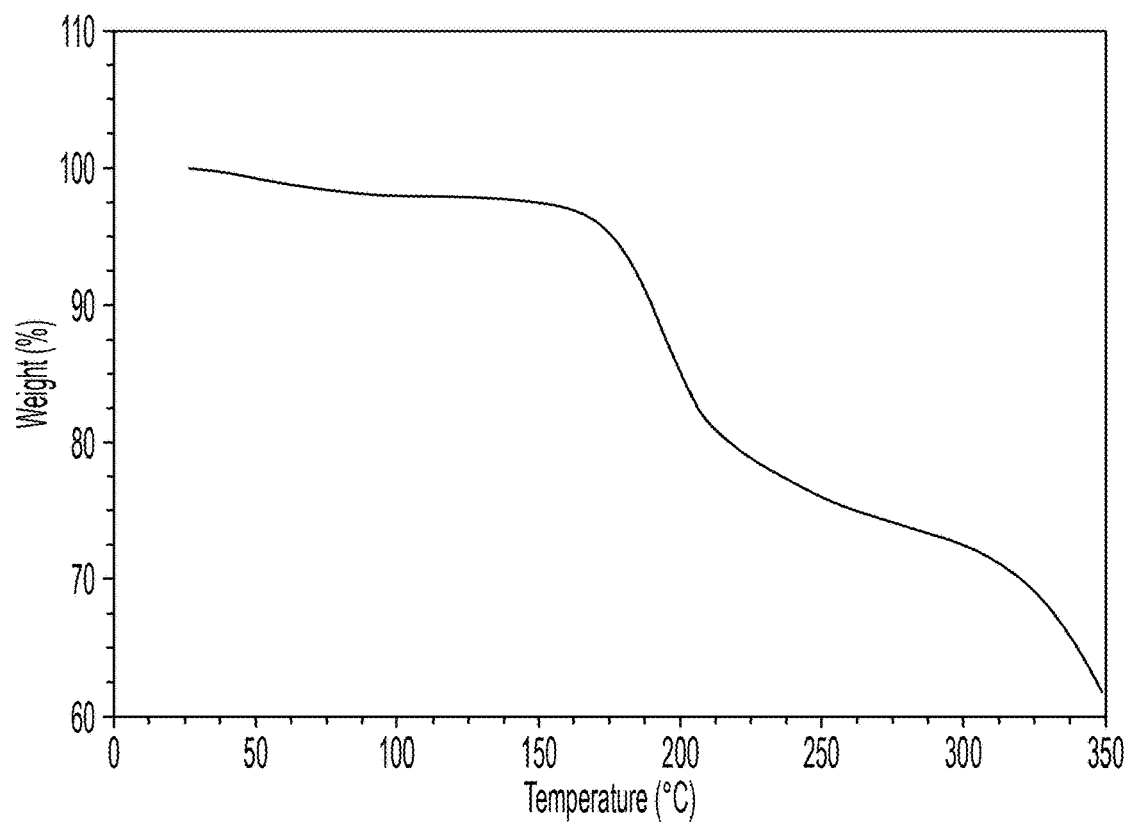
FIG. 41 depicts a TGA thermogram of Form K.

In other aspects, Form K can be characterized by a $^1$H NMR profile substantially as shown in FIG. 39. In other aspects, Form K can be characterized by a DSC thermogram substantially as shown in FIG. 40. In other aspects, Form K can be characterized by a TGA thermogram substantially as shown in FIG. 41.

Figure 42:
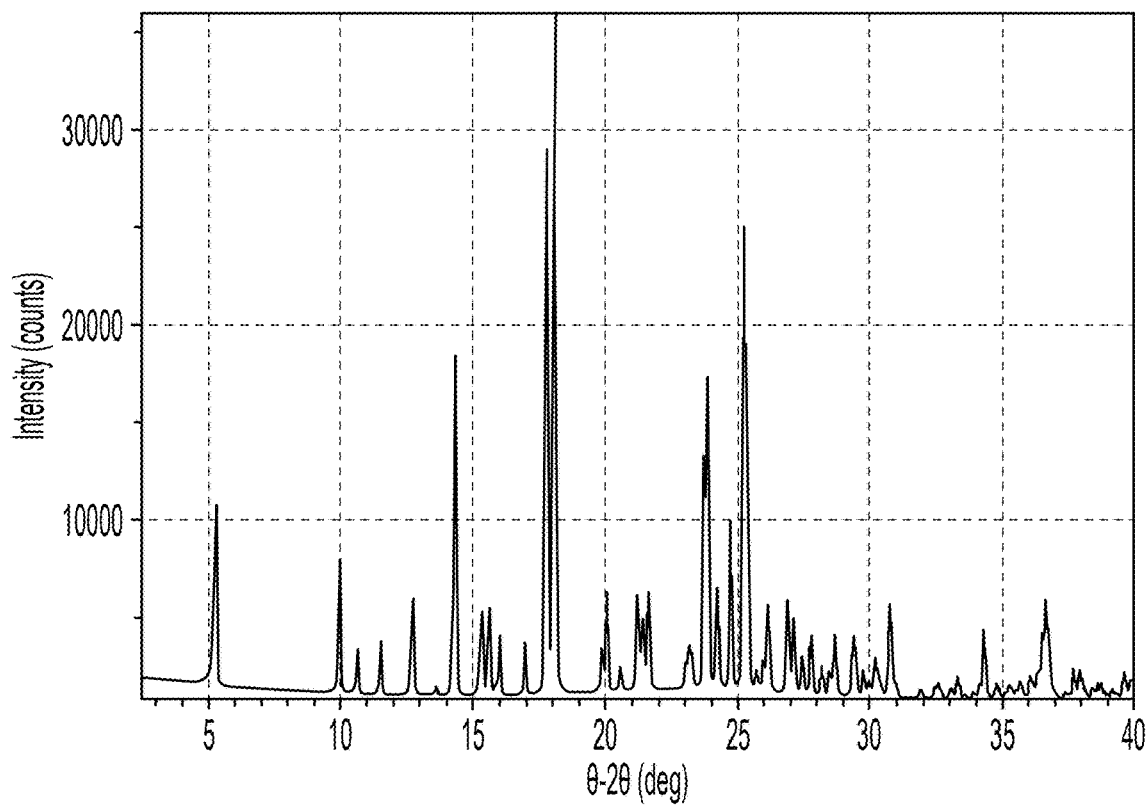
FIG. 42 depicts an X-ray diffraction pattern of Compound 1 L-tartaric acid salt/cocrystal (Form L).

Also provided herein is a Compound 1 L-tartaric acid salt/cocrystal, referred to herein as Form L. In some aspects, Form L can be characterized by an X-ray diffraction pattern substantially as shown in FIG. 42. Diffraction peak positions for Form L that were obtained using the equipment and conditions specified in Example 3, infra, are shown below in Table 12 and 12A:

TABLE 12

Observed X-ray Powder Diffraction Peaks for Form L
°2θ

5.3 ± 0.2
10.0 ± 0.2
10.6 ± 0.2
11.5 ± 0.2
12.8 ± 0.2
13.6 ± 0.2
14.3 ± 0.2
15.3 ± 0.2
15.6 ± 0.2
16.0 ± 0.2
17.0 ± 0.2
17.8 ± 0.2
18.1 ± 0.2
19.9 ± 0.2
20.1 ± 0.2
20.6 ± 0.2
21.3 ± 0.2
21.4 ± 0.2
21.7 ± 0.2
23.1 ± 0.2
23.2 ± 0.2
23.8 ± 0.2
23.9 ± 0.2
24.3 ± 0.2
24.8 ± 0.2
25.3 ± 0.2
25.7 ± 0.2
26.0 ± 0.2
26.2 ± 0.2
26.9 ± 0.2
27.1 ± 0.2
27.4 ± 0.2
27.8 ± 0.2
28.2 ± 0.2
28.5 ± 0.2
28.7 ± 0.2
29.4 ± 0.2

TABLE 12A

Characteristic X-ray Powder Diffraction Peaks for Form L
°2θ

5.3 ± 0.2
10.0 ± 0.2
14.3 ± 0.2
17.8 ± 0.2
18.1 ± 0.2
23.9 ± 0.2
24.8 ± 0.2
25.3 ± 0.2

Form L can be characterized by an X-ray diffraction pattern having at least one peak selected from Table 12A.

Figure 43:
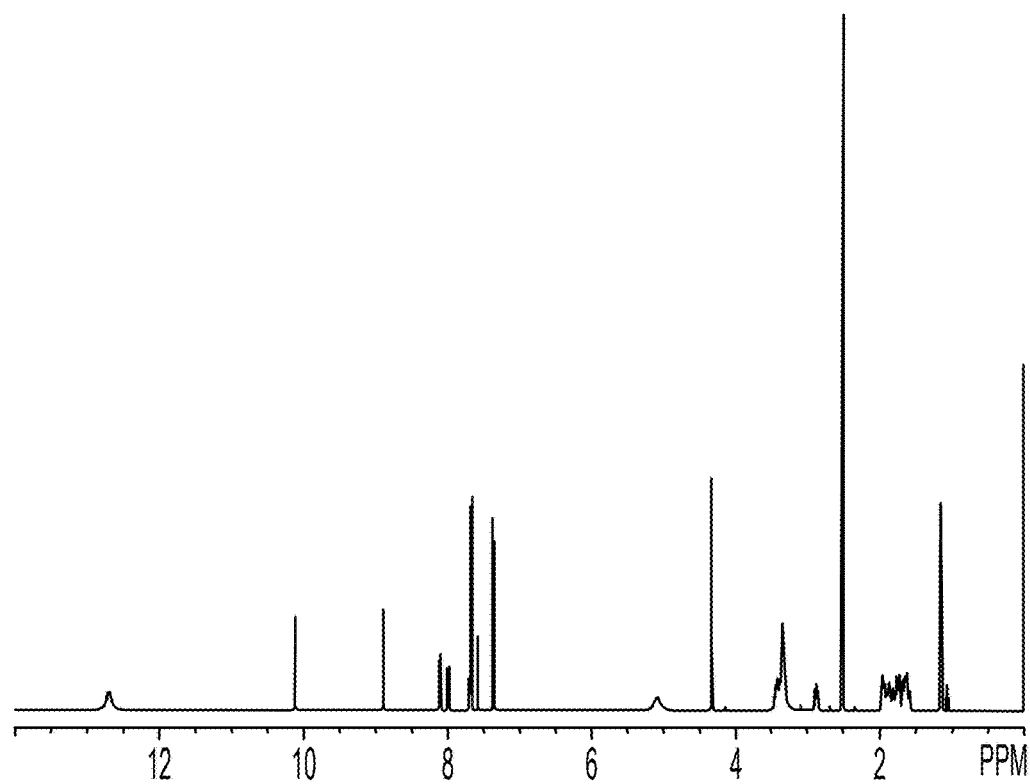
FIG. 43 depicts a $^1$H NMR profile of Form L.
Figure 44:
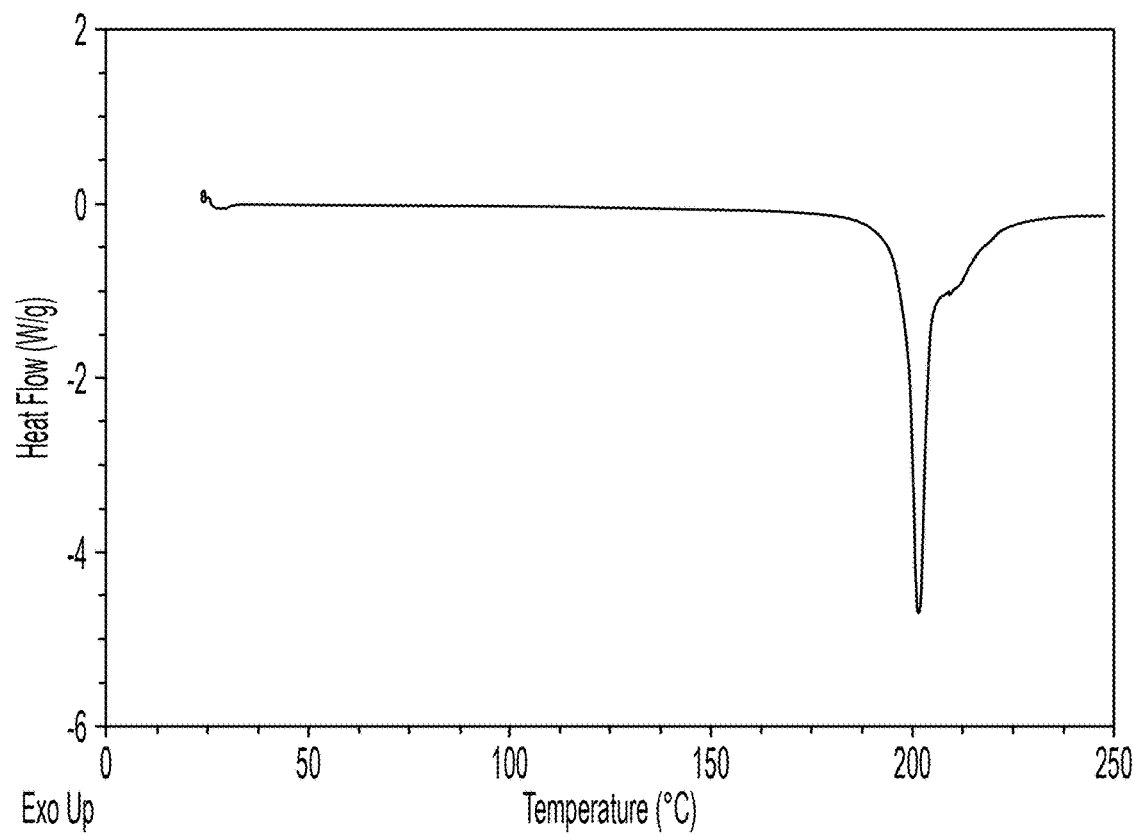
FIG. 44 depicts a DSC thermogram of Form L.
Figure 45:
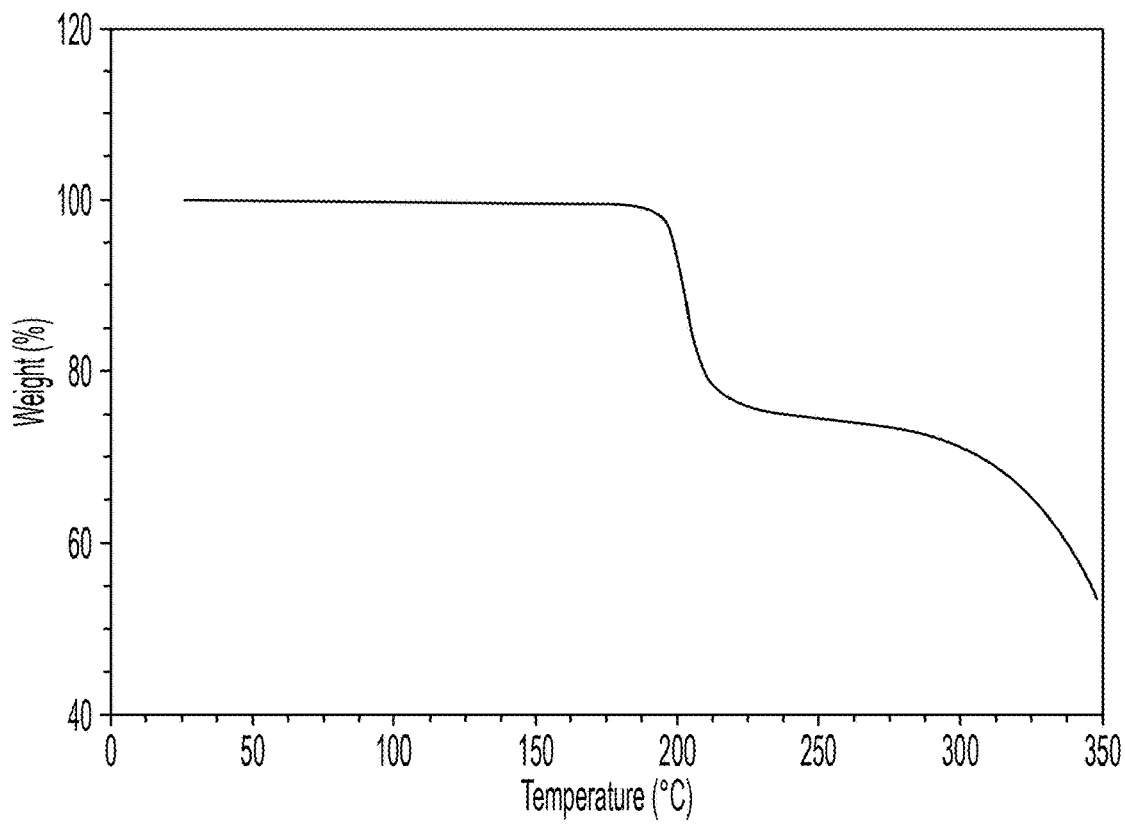
FIG. 45 depicts a TGA thermogram of Form L.

In other aspects, Form L can be characterized by a $^1$H NMR profile substantially as shown in FIG. 43. In other aspects, Form L can be characterized by a DSC thermogram substantially as shown in FIG. 44. In other aspects, Form L can be characterized by a TGA thermogram substantially as shown in FIG. 45.

Figure 46:
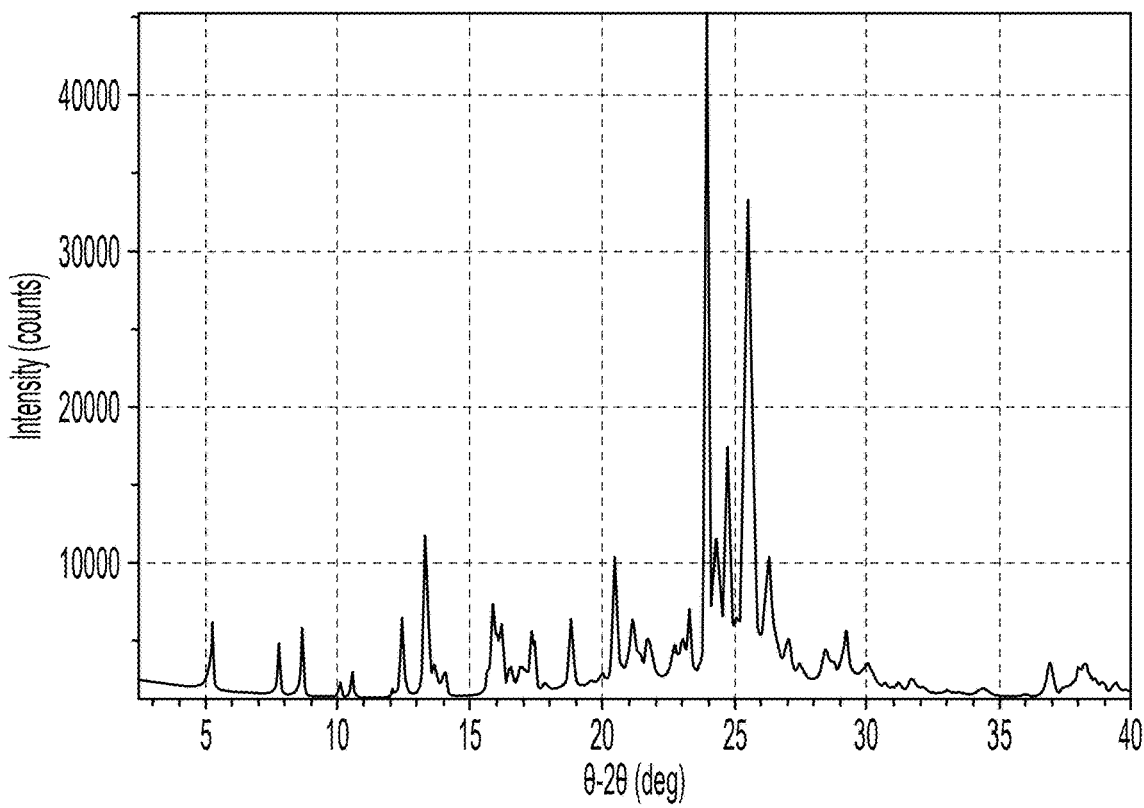
FIG. 46 depicts an X-ray diffraction pattern of a Compound 1 fumaric acid salt/cocrystal (Form M).

Also provided herein is a Compound 1 fumaric acid salt/cocrystal, referred to herein as Form M. In some aspects, Form M can be characterized by an X-ray diffraction pattern substantially as shown in FIG. 46. Diffraction peak positions for Form M that were obtained using the equipment and conditions specified in Example 3, infra, are shown below in Table 13 and 13A:

TABLE 13

Observed X-ray Powder Diffraction Peaks for Form M
°2θ

5.3 ± 0.2
7.8 ± 0.2
8.7 ± 0.2
10.1 ± 0.2
10.6 ± 0.2
12.1 ± 0.2
12.5 ± 0.2
13.4 ± 0.2
13.7 ± 0.2
14.1 ± 0.2
15.9 ± 0.2
16.2 ± 0.2
16.5 ± 0.2
16.9 ± 0.2
17.3 ± 0.2
17.5 ± 0.2
17.9 ± 0.2
18.8 ± 0.2
20.0 ± 0.2
20.5 ± 0.2
21.2 ± 0.2
21.4 ± 0.2
21.7 ± 0.2
22.8 ± 0.2
23.1 ± 0.2
23.3 ± 0.2
24.0 ± 0.2
24.4 ± 0.2
24.8 ± 0.2
25.1 ± 0.2
25.5 ± 0.2
26.3 + 0.2
27.1 ± 0.2
27.5 ± 0.2
28.5 ± 0.2
29.2 ± 0.2

TABLE 13A

Characteristic X-ray Powder Diffraction Peaks for Form M
°2θ

13.4 ± 0.2
20.5 ± 0.2
24.0 ± 0.2
24.8 ± 0.2
25.5 ± 0.2

Form M can be characterized by an X-ray diffraction pattern having at least one peak selected from Table 13A.

Figure 47:
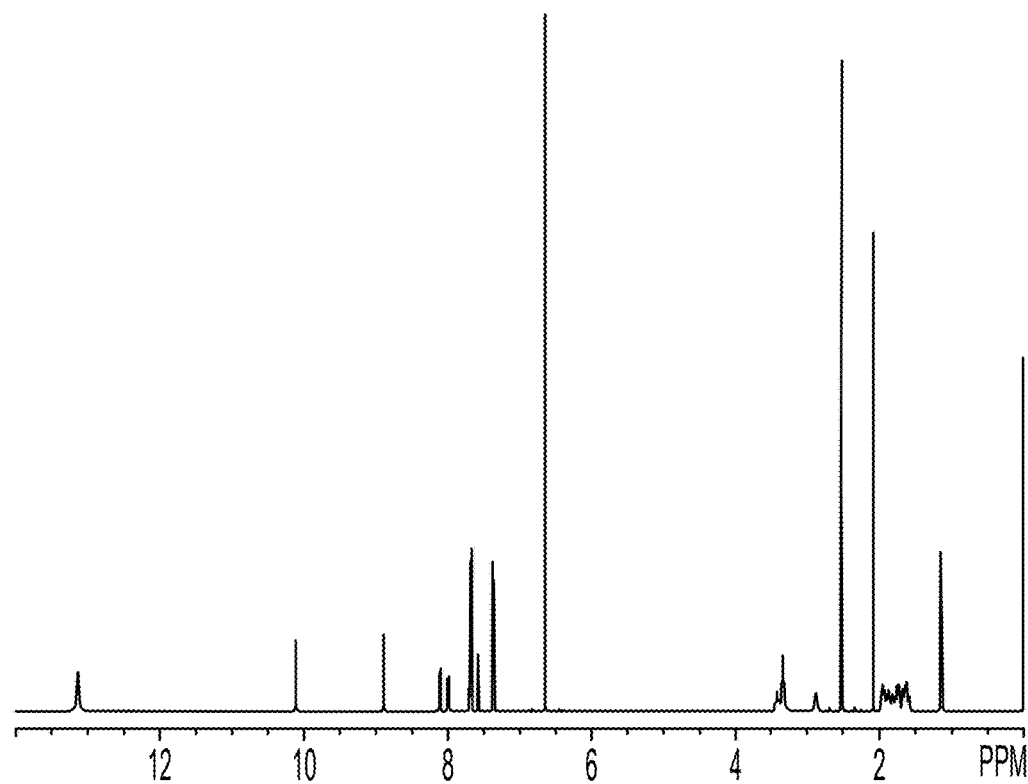
FIG. 47 depicts a $^1$H NMR profile of Form M.
Figure 48:
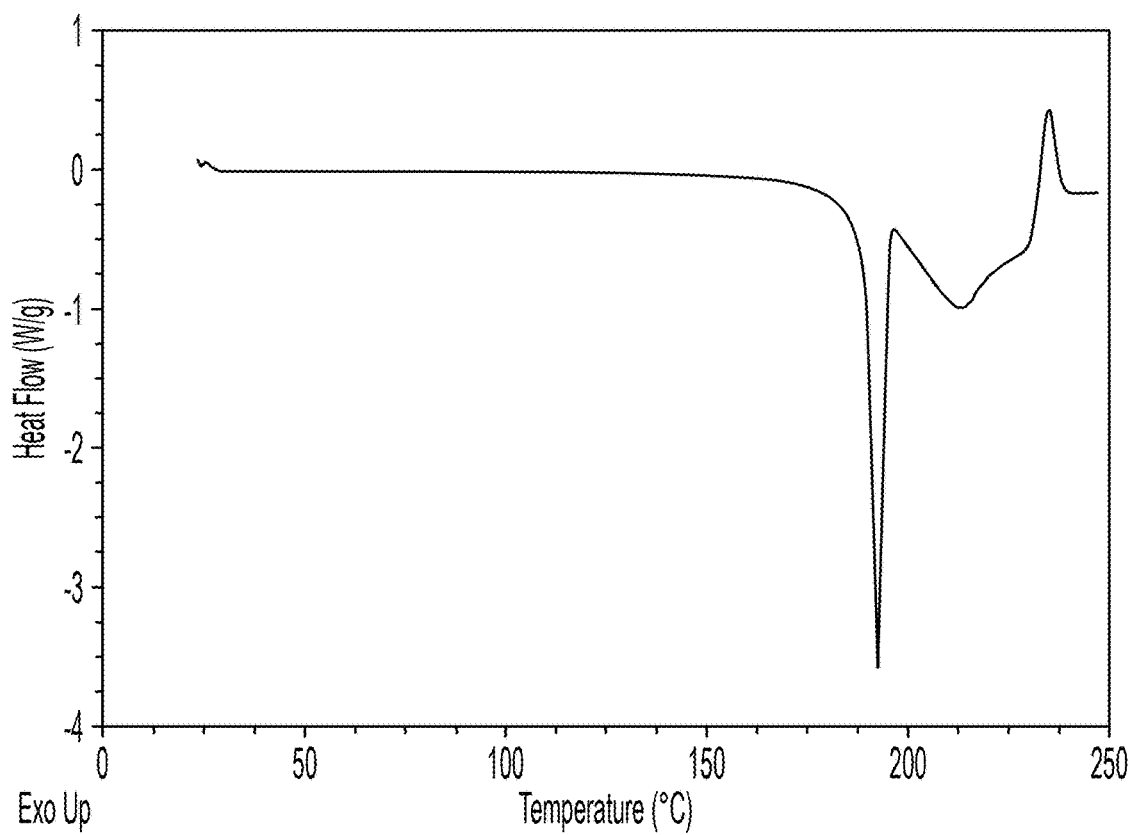
FIG. 48 depicts a DSC thermogram of Form M.
Figure 49:
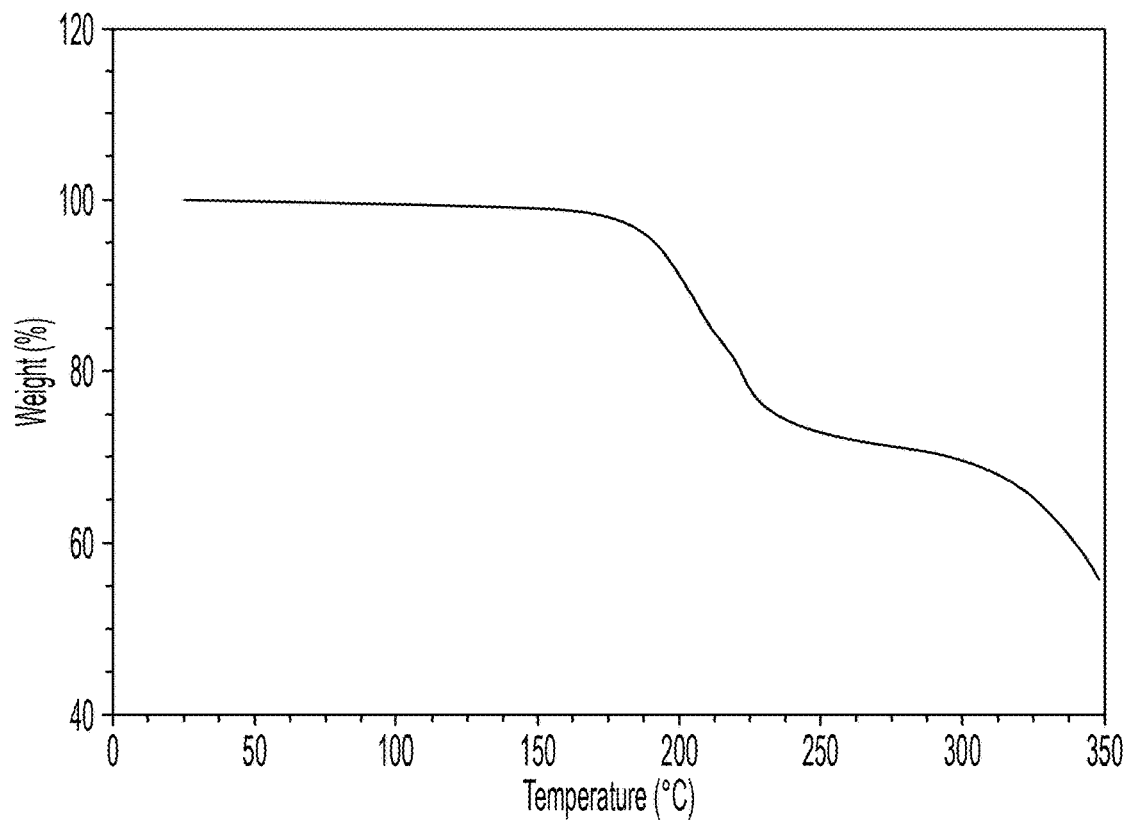
FIG. 49 depicts a TGA thermogram of Form M.

In other aspects, Form M can be characterized by a $^1$H NMR profile substantially as shown in FIG. 47. In other aspects, Form M can be characterized by a DSC thermogram substantially as shown in FIG. 48. In other aspects, Form M can be characterized by a TGA thermogram substantially as shown in FIG. 49.

Figure 50:
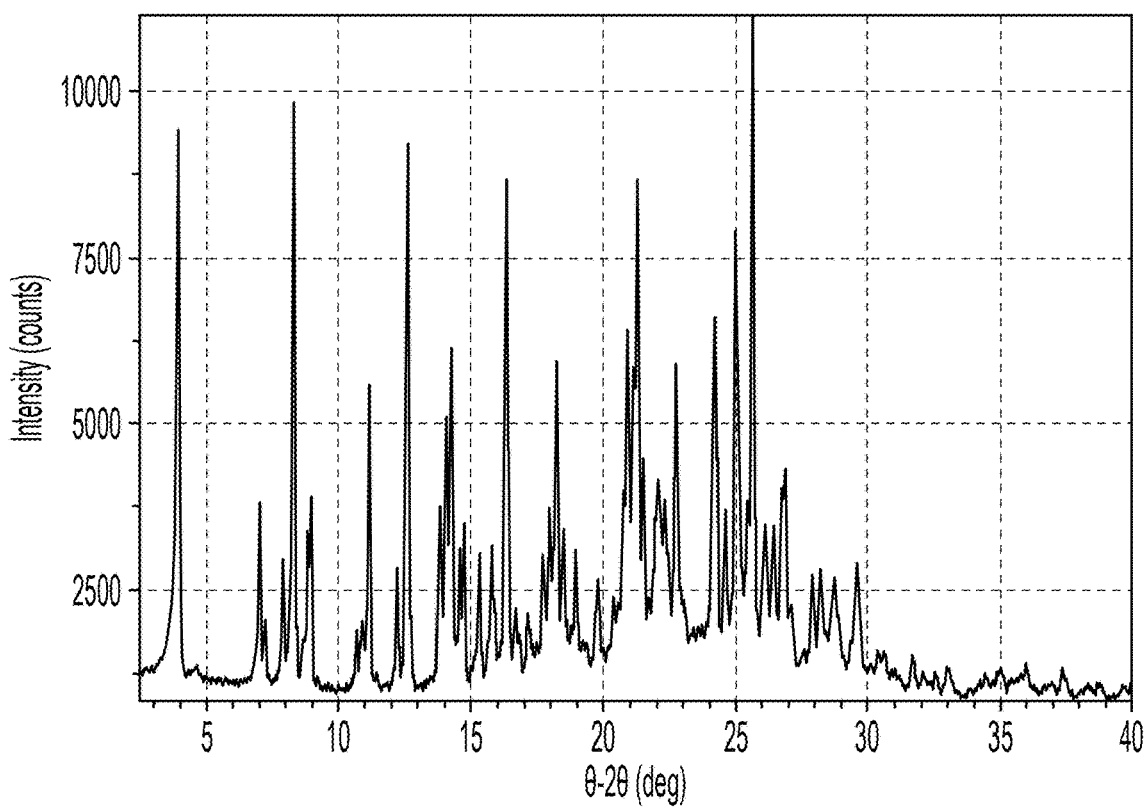
FIG. 50 depicts an X-ray diffraction pattern of a Compound 1 edisylate salt/cocrystal (Form N)

Also provided herein is a Compound 1 edisylate salt/cocrystal, referred to herein as Form N. In some aspects, Form N can be characterized by an X-ray diffraction pattern substantially as shown in FIG. 50. Diffraction peak positions for Form N that were obtained using the equipment and conditions specified in Example 3, infra, are shown below in Table 14 and 14A:

TABLE 14

Observed X-ray Powder Diffraction Peaks for Form N
°2θ

3.9 ± 0.2
4.6 ± 0.2

TABLE 14-continued

Observed X-ray Powder Diffraction Peaks for Form N
°2θ

| |
|---|
| 7.0 ± 0.2 |
| 7.2 ± 0.2 |
| 7.9 ± 0.2 |
| 8.3 ± 0.2 |
| 8.7 ± 0.2 |
| 8.8 ± 0.2 |
| 9.0 ± 0.2 |
| 10.7 ± 0.2 |
| 10.9 ± 0.2 |
| 11.2 ± 0.2 |
| 11.4 ± 0.2 |
| 12.2 ± 0.2 |
| 12.6 ± 0.2 |
| 13.8 ± 0.2 |
| 14.1 ± 0.2 |
| 14.2 ± 0.2 |
| 14.6 ± 0.2 |
| 14.7 ± 0.2 |
| 15.3 ± 0.2 |
| 15.8 ± 0.2 |
| 16.4 ± 0.2 |
| 16.7 ± 0.2 |
| 16.8 ± 0.2 |
| 17.1 ± 0.2 |
| 17.2 ± 0.2 |
| 17.5 ± 0.2 |
| 17.7 ± 0.2 |
| 18.0 ± 0.2 |
| 18.1 ± 0.2 |
| 18.3 ± 0.2 |
| 18.5 ± 0.2 |
| 18.8 ± 0.2 |
| 19.0 ± 0.2 |
| 19.8 ± 0.2 |
| 20.4 ± 0.2 |
| 20.8 ± 0.2 |
| 20.9 ± 0.2 |
| 21.2 ± 0.2 |
| 21.3 ± 0.2 |
| 21.5 ± 0.2 |
| 21.7 ± 0.2 |
| 22.1 ± 0.2 |
| 22.3 + 0.2 |
| 22.8 ± 0.2 |
| 23.1 ± 0.2 |
| 24.2 ± 0.2 |
| 24.6 ± 0.2 |
| 25.0 ± 0.2 |
| 25.5 ± 0.2 |
| 25.7 ± 0.2 |
| 26.1 ± 0.2 |
| 26.5 ± 0.2 |
| 26.8 ± 0.2 |
| 26.9 ± 0.2 |
| 27.1 ± 0.2 |
| 27.9 ± 0.2 |
| 28.2 ± 0.2 |
| 28.7 ± 0.2 |
| 29.6 ± 0.2 |

TABLE 14A

Characteristic X-ray Powder Diffraction Peaks for Form N
°2θ

| |
|---|
| 3.9 ± 0.2 |
| 8.3 ± 0.2 |
| 11.2 ± 0.2 |
| 12.6 ± 0.2 |
| 14.2 ± 0.2 |
| 16.4 ± 0.2 |
| 18.3 ± 0.2 |
| 20.9 ± 0.2 |

TABLE 14A-continued

Characteristic X-ray Powder Diffraction Peaks for Form N
°2θ

| |
|---|
| 21.3 ± 0.2 |
| 22.8 ± 0.2 |
| 24.2 ± 0.2 |
| 25.0 ± 0.2 |
| 25.7 + 0.2 |

Form N can be characterized by an X-ray diffraction pattern having at least one peak selected from Table 14A.

Figure 51:
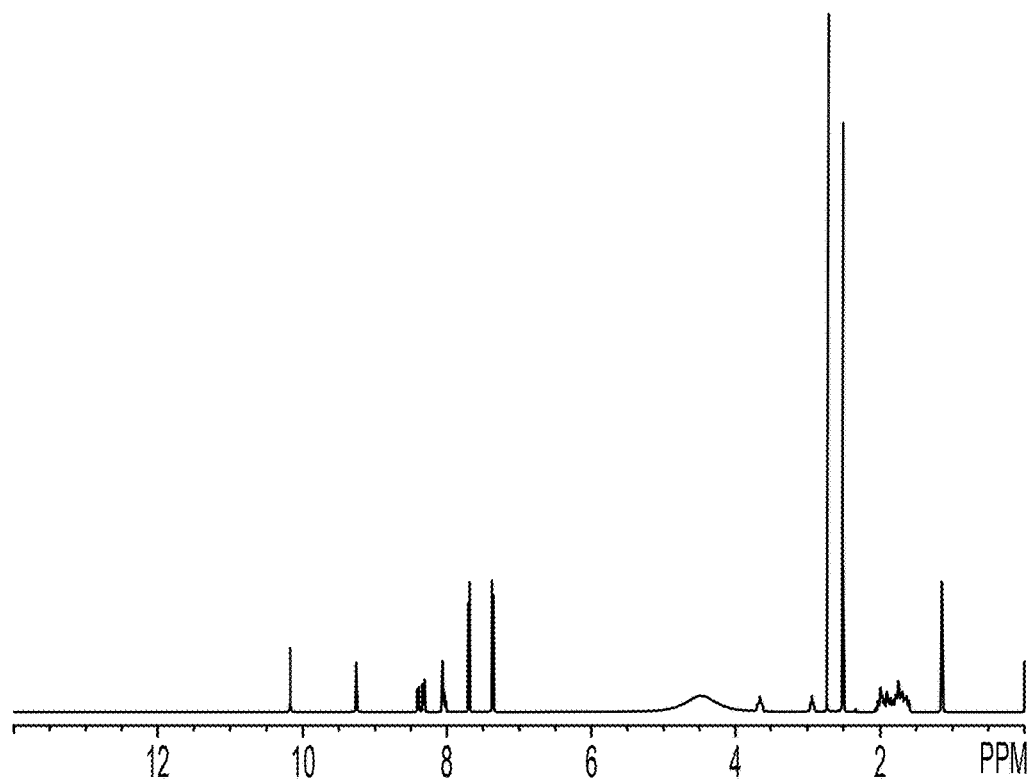
FIG. 51 depicts a $^1$H NMR profile of Form N.
Figure 52:
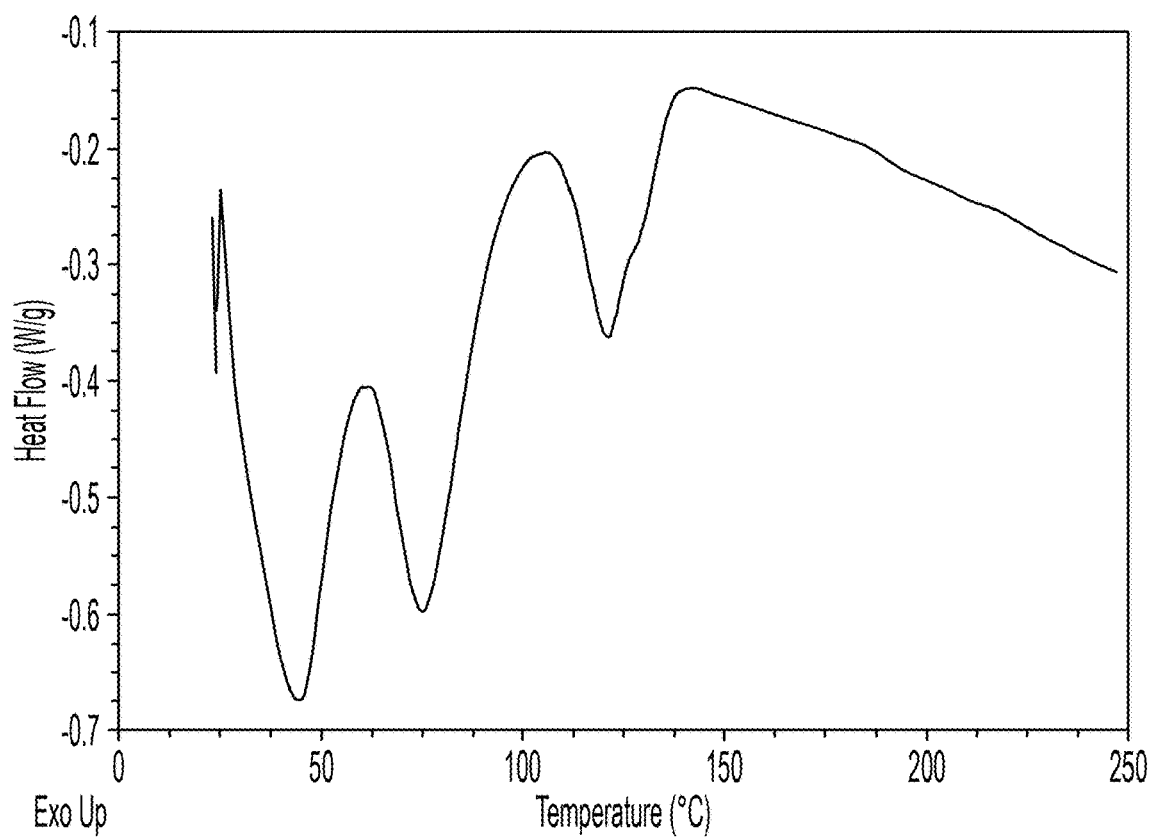
FIG. 52 depicts a DSC thermogram of Form N.
Figure 53:
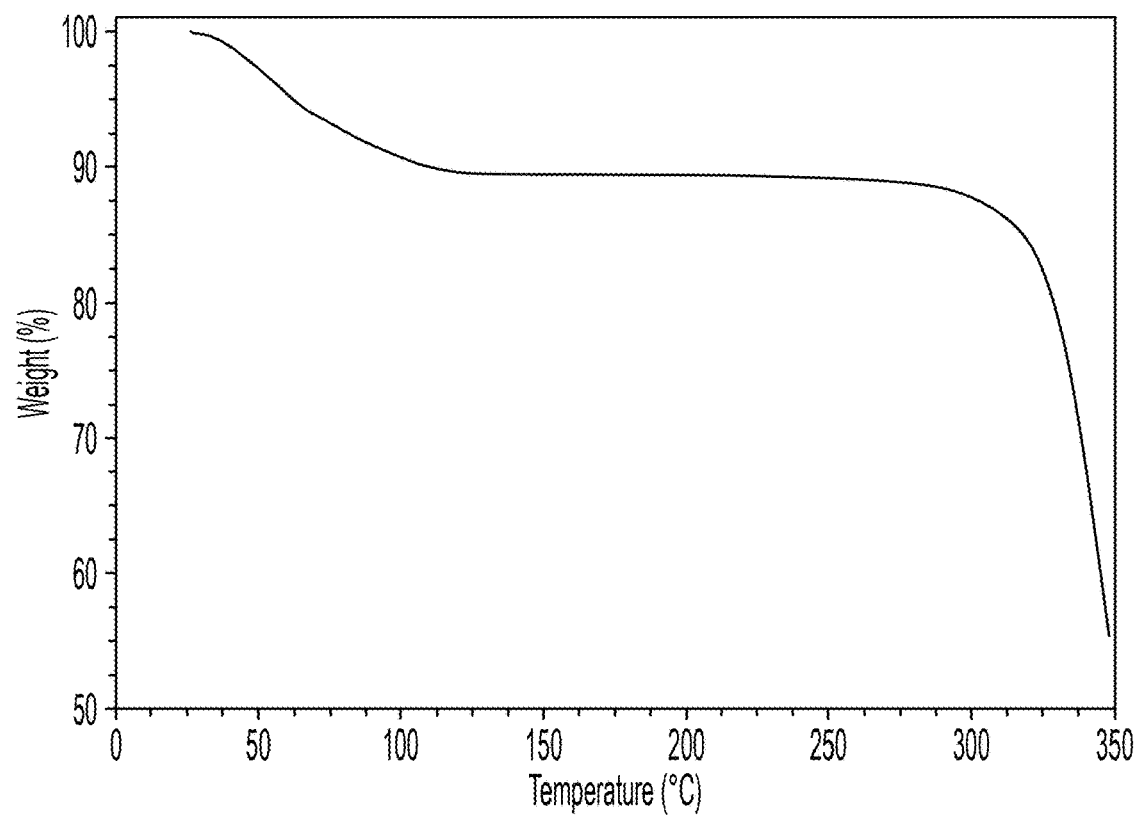
FIG. 53 depicts a TGA thermogram of Form N.

In other aspects, Form N can be characterized by a $^1$H NMR profile substantially as shown in FIG. 51. In other aspects, Form N can be characterized by a DSC thermogram substantially as shown in FIG. 52. In other aspects, Form N can be characterized by a TGA thermogram substantially as shown in FIG. 53.

Figure 54:
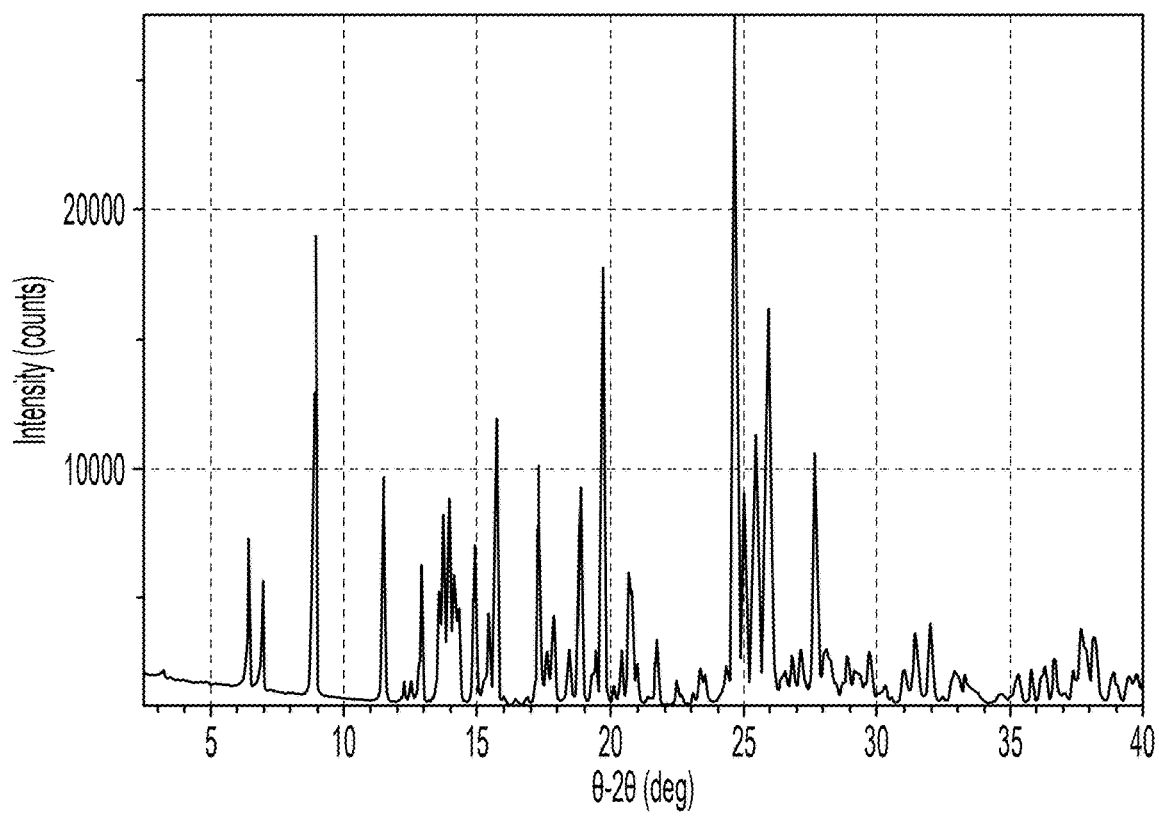
FIG. 54 depicts an X-ray diffraction pattern of a Compound 1 L-tartaric acid salt/cocrystal (Form O).

Also provided herein is a Compound 1 L-tartaric acid salt/cocrystal, referred to herein as Form O. In some aspects, Form O can be characterized by an X-ray diffraction pattern substantially as shown in FIG. 54. Diffraction peak positions for Form O that were obtained using the equipment and conditions specified in Example 3, infra, are shown below in Table 15 and 15A:

TABLE 15

Observed X-ray Powder Diffraction Peaks for Form O
°2θ

| |
|---|
| 3.2 ± 0.2 |
| 6.4 ± 0.2 |
| 7.0 ± 0.2 |
| 8.9 ± 0.2 |
| 11.5 ± 0.2 |
| 12.3 ± 0.2 |
| 12.5 ± 0.2 |
| 12.9 ± 0.2 |
| 13.6 ± 0.2 |
| 13.7 ± 0.2 |
| 14.0 ± 0.2 |
| 14.1 ± 0.2 |
| 14.3 ± 0.2 |
| 14.3 ± 0.2 |
| 14.9 ± 0.2 |
| 15.4 ± 0.2 |
| 15.7 ± 0.2 |
| 16.0 ± 0.2 |
| 16.5 ± 0.2 |
| 16.9 ± 0.2 |
| 17.3 ± 0.2 |
| 17.6 ± 0.2 |
| 17.9 ± 0.2 |
| 18.5 ± 0.2 |
| 18.9 ± 0.2 |
| 19.3 ± 0.2 |
| 19.4 ± 0.2 |
| 19.7 ± 0.2 |
| 20.1 ± 0.2 |
| 20.4 ± 0.2 |
| 20.7 ± 0.2 |
| 20.8 ± 0.2 |
| 21.0 ± 0.2 |
| 21.7 ± 0.2 |
| 22.5 ± 0.2 |
| 22.7 ± 0.2 |
| 23.1 ± 0.2 |
| 23.4 ± 0.2 |
| 23.6 ± 0.2 |
| 24.4 ± 0.2 |
| 24.7 ± 0.2 |
| 25.0 ± 0.2 |
| 25.5 ± 0.2 |
| 26.0 ± 0.2 |
| 26.6 ± 0.2 |

TABLE 15-continued

Observed X-ray Powder Diffraction Peaks for Form O
°2θ

| |
|---|
| 26.8 ± 0.2 |
| 27.2 ± 0.2 |
| 27.7 ± 0.2 |
| 28.1 ± 0.2 |
| 28.3 ± 0.2 |
| 28.9 ± 0.2 |
| 29.2 ± 0.2 |
| 29.3 ± 0.2 |
| 29.4 ± 0.2 |
| 29.8 ± 0.2 |

TABLE 15A

Characteristic X-ray Powder Diffraction Peaks for Form O
°2θ

| |
|---|
| 8.9 ± 0.2 |
| 11.5 ± 0.2 |
| 15.7 ± 0.2 |
| 19.7 ± 0.2 |
| 24.7 ± 0.2 |
| 25.5 ± 0.2 |
| 26.0 ± 0.2 |
| 27.7 ± 0.2 |

Form O can be characterized by an X-ray diffraction pattern having at least one peak selected from Table 15A.

Figure 55:
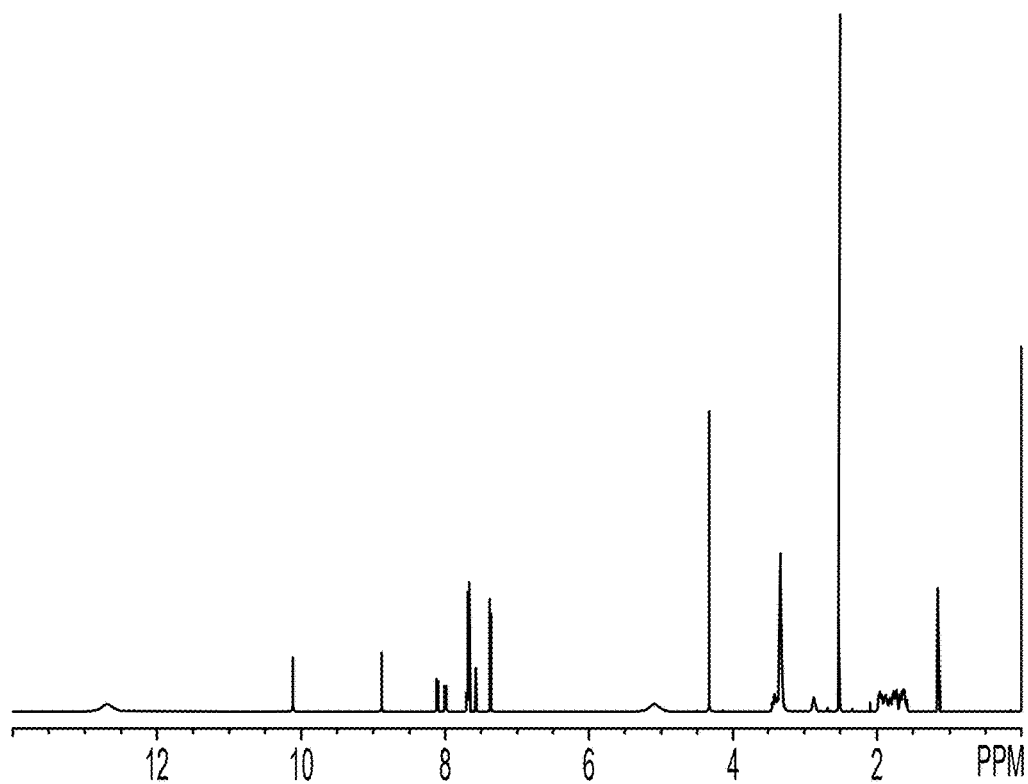
FIG. 55 depicts a $^1$H NMR profile of Form O.
Figure 56:
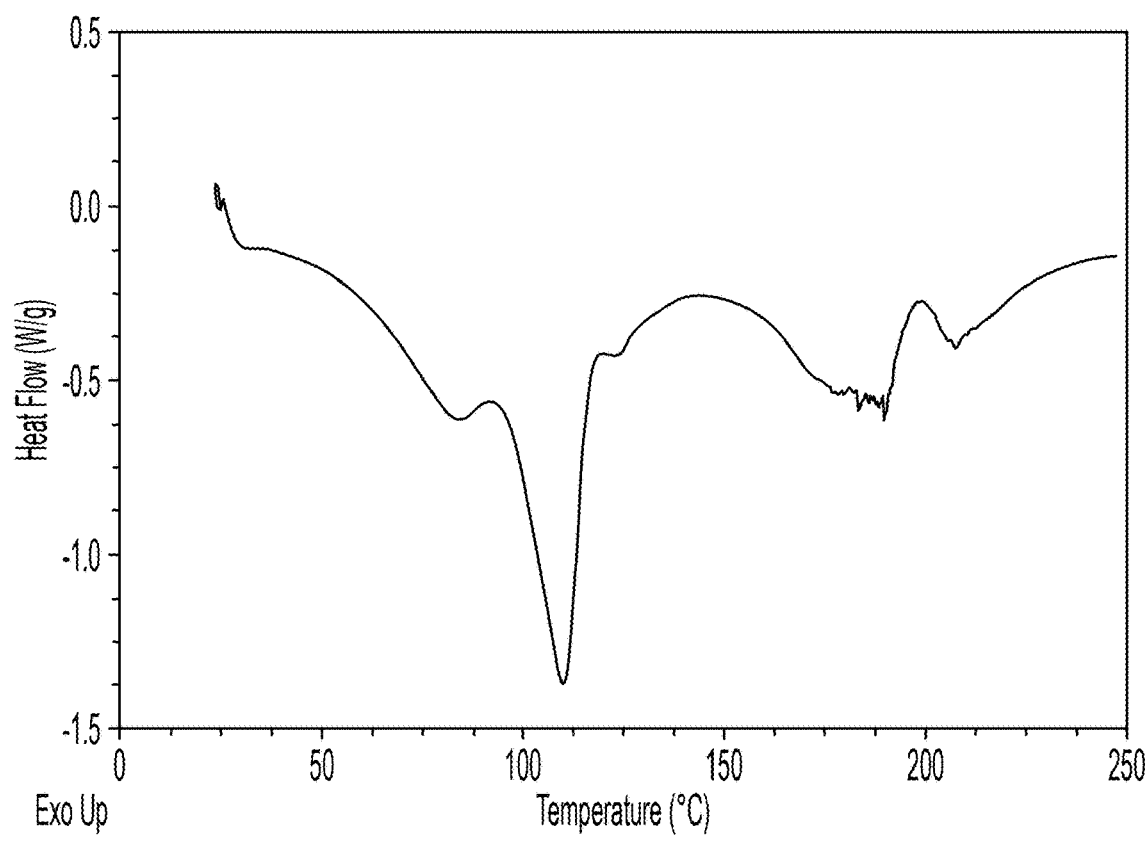
FIG. 56 depicts a DSC thermogram of Form O.
Figure 57:
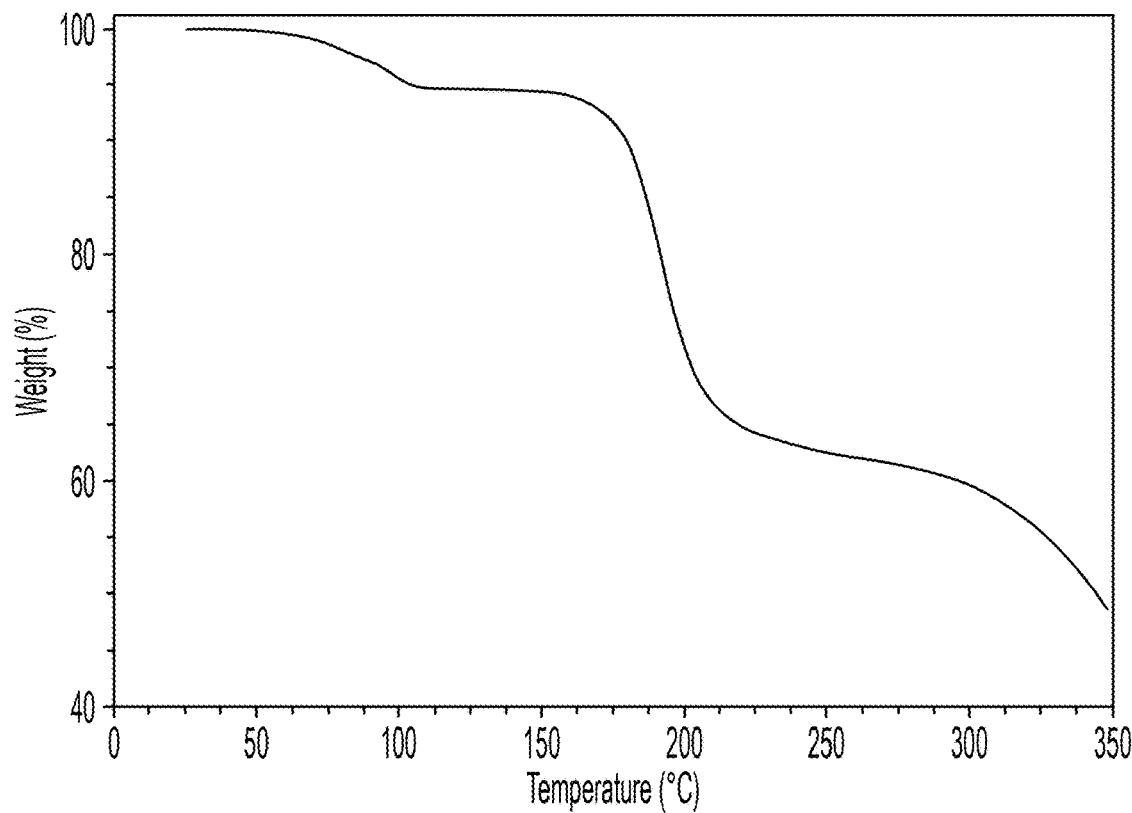
FIG. 57 depicts a TGA thermogram of Form O.

In other aspects, Form O can be characterized by a $^1$H NMR profile substantially as shown in FIG. 55. In other aspects, Form O can be characterized by a DSC thermogram substantially as shown in FIG. 56. In other aspects, Form O can be characterized by a TGA thermogram substantially as shown in FIG. 57.

Figure 58:
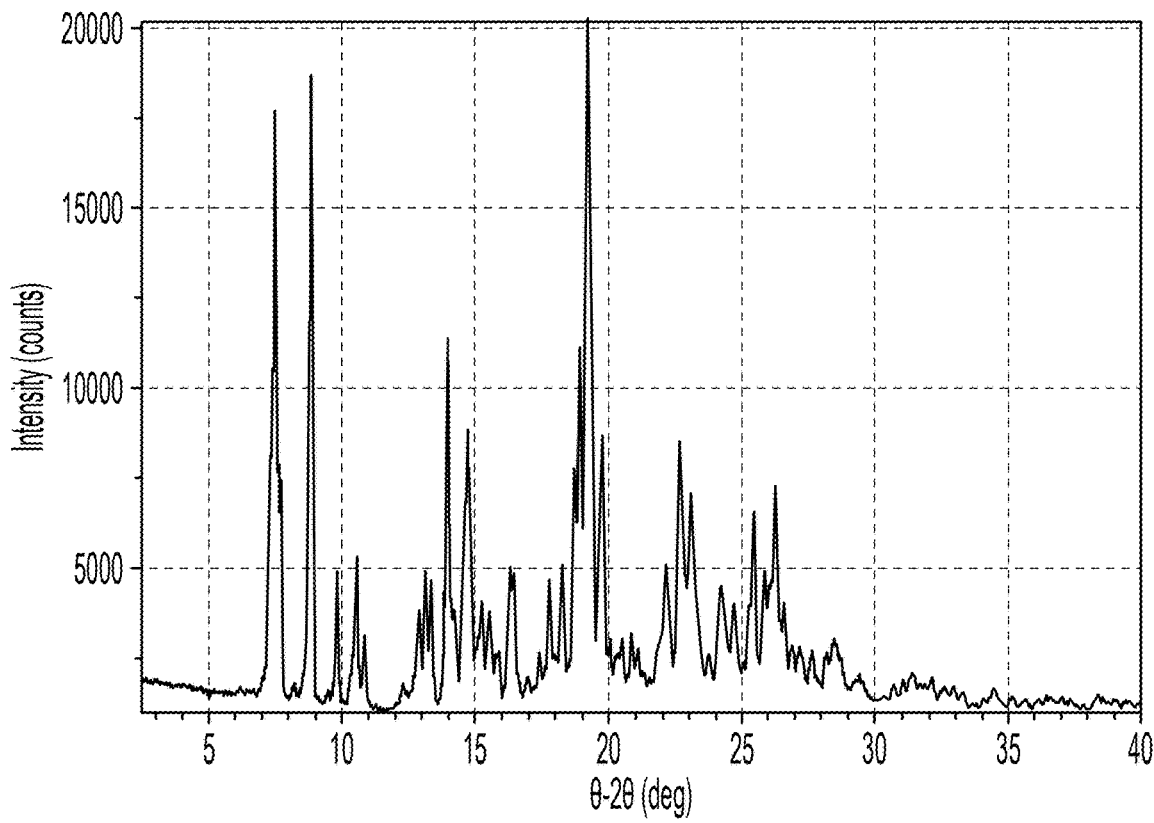
FIG. 58 depicts an X-ray diffraction pattern of a Compound 1 fumaric acid salt/cocrystal (Form P).

Also provided herein is a Compound 1 fumaric acid salt/cocrystal, referred to herein as Form P. In some aspects, Form P can be characterized by an X-ray diffraction pattern substantially as shown in FIG. 58. Diffraction peak positions for Form P that were obtained using the equipment and conditions specified in Example 3, infra, are shown below in Table 16 and 16A:

TABLE 16

Observed X-ray Powder Diffraction Peaks for Form P
°2θ

| |
|---|
| 7.5 ± 0.2 |
| 7.7 ± 0.2 |
| 8.2 ± 0.2 |
| 8.9 ± 0.2 |
| 9.5 ± 0.2 |
| 9.8 ± 0.2 |
| 10.6 ± 0.2 |
| 10.9 ± 0.2 |
| 12.3 ± 0.2 |
| 12.9 ± 0.2 |
| 13.2 ± 0.2 |
| 13.4 ± 0.2 |
| 14.0 ± 0.2 |
| 14.2 ± 0.2 |
| 14.7 ± 0.2 |
| 15.3 ± 0.2 |
| 15.6 ± 0.2 |
| 15.9 ± 0.2 |
| 16.3 ± 0.2 |
| 16.5 ± 0.2 |
| 17.0 ± 0.2 |
| 17.4 ± 0.2 |
| 17.8 ± 0.2 |

TABLE 16-continued

Observed X-ray Powder Diffraction Peaks for Form P
°2θ

| |
|---|
| 18.3 ± 0.2 |
| 18.8 ± 0.2 |
| 18.9 ± 0.2 |
| 19.2 ± 0.2 |
| 19.8 ± 0.2 |
| 20.1 ± 0.2 |
| 20.5 ± 0.2 |
| 20.9 ± 0.2 |
| 21.1 ± 0.2 |
| 22.2 ± 0.2 |
| 22.7 ± 0.2 |
| 23.1 ± 0.2 |
| 23.8 ± 0.2 |
| 24.3 ± 0.2 |
| 24.7 ± 0.2 |
| 25.5 ± 0.2 |
| 25.9 ± 0.2 |
| 26.3 ± 0.2 |
| 26.6 ± 0.2 |
| 26.9 ± 0.2 |
| 27.2 ± 0.2 |
| 27.7 ± 0.2 |
| 28.2 ± 0.2 |
| 28.5 ± 0.2 |

TABLE 16A

Characteristic X-ray Powder Diffraction Peaks for Form P
°2θ

| |
|---|
| 7.5 ± 0.2 |
| 8.9 ± 0.2 |
| 14.0 ± 0.2 |
| 14.7 ± 0.2 |
| 18.8 ± 0.2 |
| 19.2 ± 0.2 |
| 19.8 ± 0.2 |
| 22.7 ± 0.2 |

Form P can be characterized by an X-ray diffraction pattern having at least one peak selected from Table 16A.

Figure 59:
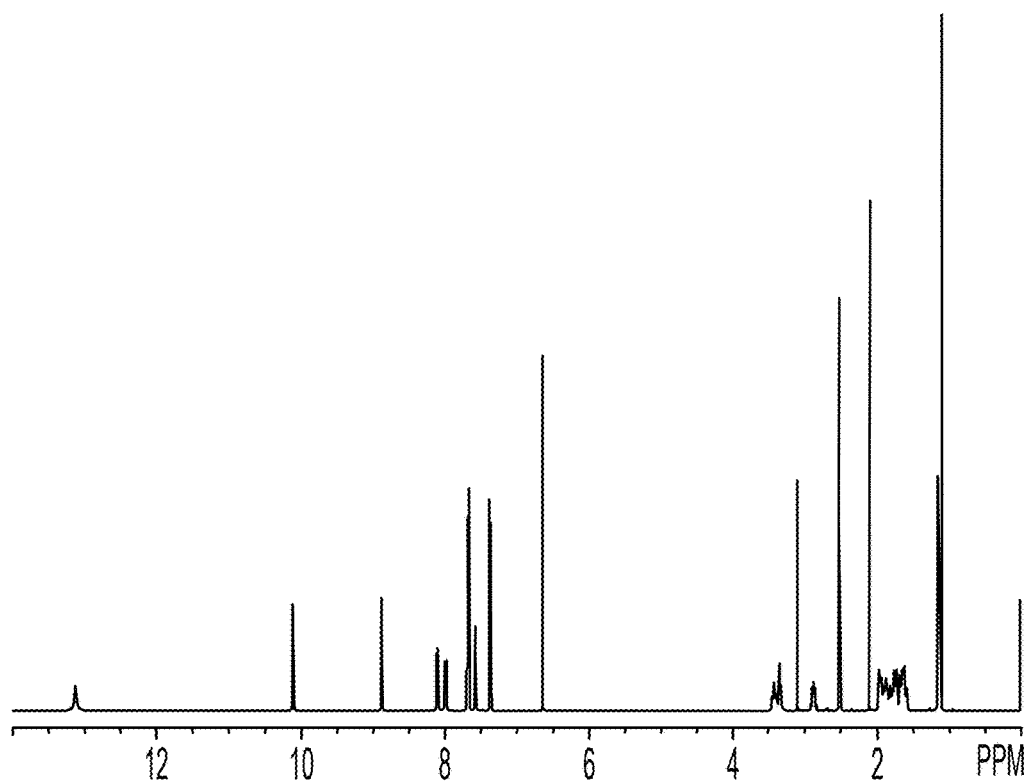
FIG. 59 depicts a $^1$H NMR profile of Form P.
Figure 60:
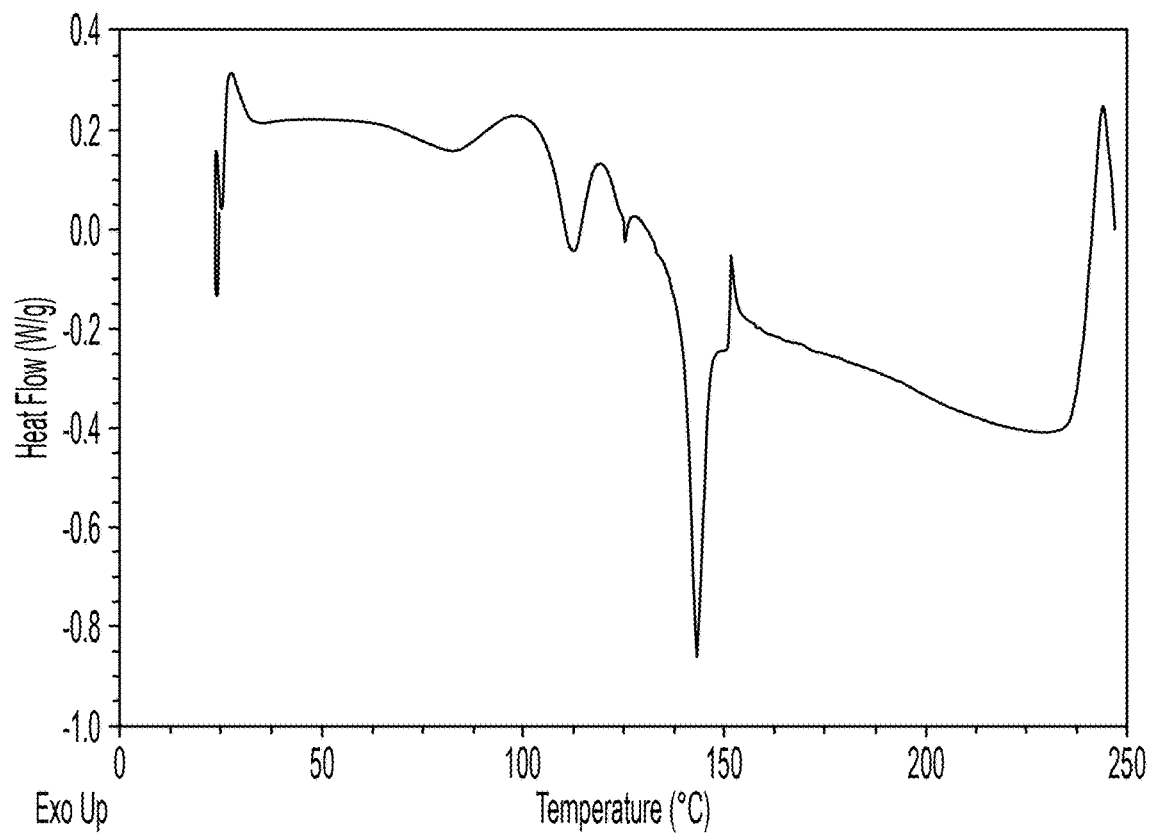
FIG. 60 depicts a DSC thermogram of Form P.
Figure 61:
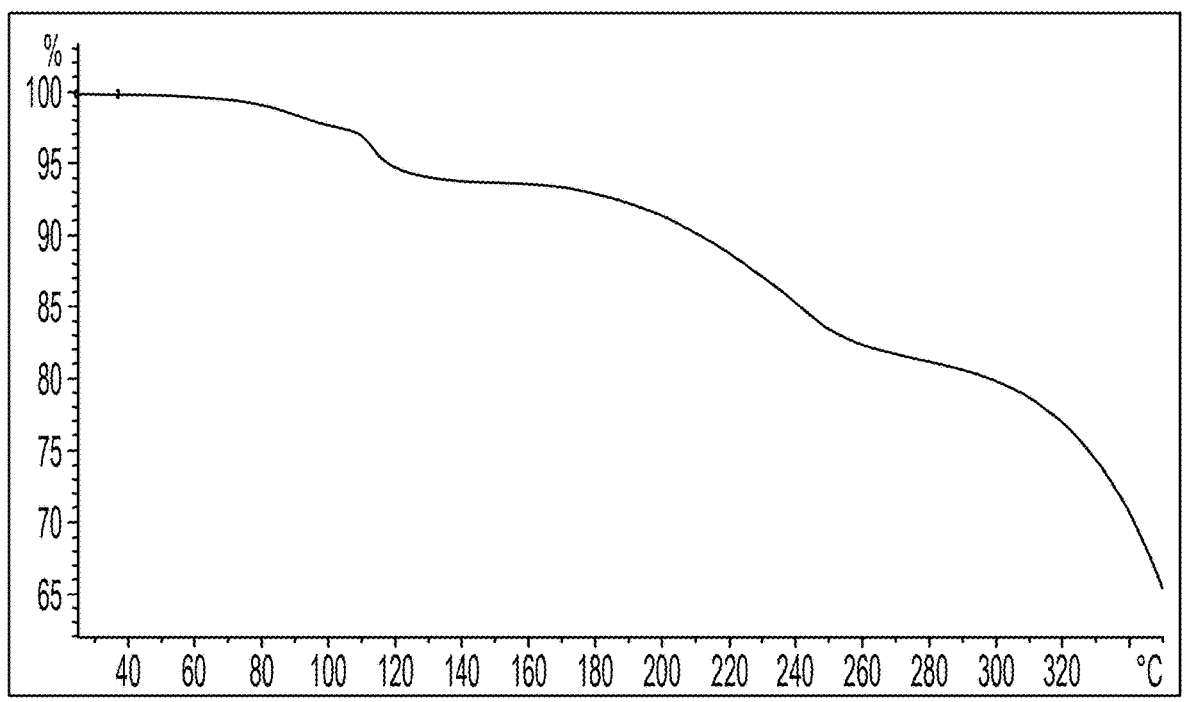
FIG. 61 depicts a TGA thermogram of Form P.

In other aspects, Form P can be characterized by a $^1$H NMR profile substantially as shown in FIG. 59. In other aspects, Form P can be characterized by a DSC thermogram substantially as shown in FIG. 60. In other aspects, Form P can be characterized by a TGA thermogram substantially as shown in FIG. 61.

Figure 62:
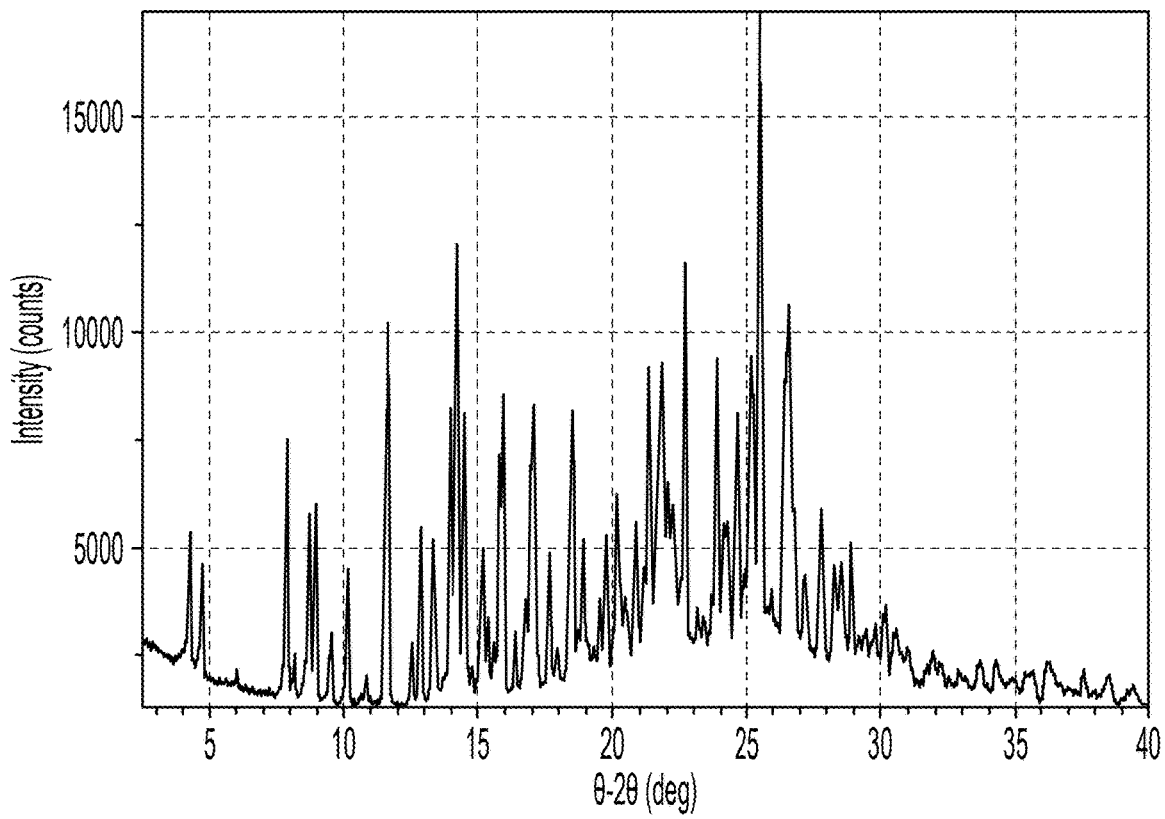
FIG. 62 depicts an X-ray diffraction pattern of a Compound 1 L-malic acid salt/cocrystal (Form Q).

Also provided herein is a Compound 1 malic acid salt/cocrystal, referred to herein as Form Q. In some aspects, Form Q can be characterized by an X-ray diffraction pattern substantially as shown in FIG. 62. Diffraction peak positions for Form Q that were obtained using the equipment and conditions specified in Example 3, infra, are shown below in Table 17 and 17A:

TABLE 17

Observed X-ray Powder Diffraction Peaks for Form Q
°2θ

| |
|---|
| 4.3 ± 0.2 |
| 4.7 ± 0.2 |
| 6.0 ± 0.2 |
| 7.9 ± 0.2 |
| 8.2 ± 0.2 |
| 8.6 ± 0.2 |
| 8.7 ± 0.2 |
| 9.0 ± 0.2 |
| 9.5 ± 0.2 |

TABLE 17-continued

Observed X-ray Powder Diffraction Peaks for Form Q
°2θ

| |
|---|
| 10.2 ± 0.2 |
| 10.8 ± 0.2 |
| 11.6 ± 0.2 |
| 12.5 ± 0.2 |
| 12.9 ± 0.2 |
| 13.3 ± 0.2 |
| 14.0 ± 0.2 |
| 14.2 ± 0.2 |
| 14.5 ± 0.2 |
| 14.8 ± 0.2 |
| 15.1 ± 0.2 |
| 15.2 ± 0.2 |
| 15.4 ± 0.2 |
| 15.6 ± 0.2 |
| 15.8 ± 0.2 |
| 15.9 ± 0.2 |
| 16.4 ± 0.2 |
| 16.8 ± 0.2 |
| 17.0 ± 0.2 |
| 17.1 ± 0.2 |
| 17.7 ± 0.2 |
| 18.0 ± 0.2 |
| 18.5 ± 0.2 |
| 18.7 ± 0.2 |
| 18.9 ± 0.2 |
| 19.3 ± 0.2 |
| 19.6 ± 0.2 |
| 19.8 ± 0.2 |
| 20.2 ± 0.2 |
| 20.5 ± 0.2 |
| 20.9 ± 0.2 |
| 21.2 ± 0.2 |
| 21.4 ± 0.2 |
| 21.9 ± 0.2 |
| 22.1 ± 0.2 |
| 22.2 ± 0.2 |
| 22.7 ± 0.2 |
| 23.2 ± 0.2 |
| 23.4 ± 0.2 |
| 23.7 ± 0.2 |
| 23.9 ± 0.2 |
| 24.2 ± 0.2 |
| 24.3 ± 0.2 |
| 24.7 ± 0.2 |
| 24.9 ± 0.2 |
| 25.2 ± 0.2 |
| 25.5 ± 0.2 |
| 26.0 ± 0.2 |
| 26.5 ± 0.2 |
| 26.6 ± 0.2 |
| 26.8 ± 0.2 |
| 27.2 ± 0.2 |
| 27.8 ± 0.2 |
| 28.3 ± 0.2 |
| 28.6 ± 0.2 |
| 28.9 ± 0.2 |

TABLE 17A

Characteristic X-ray Powder Diffraction Peaks for Form Q
°2θ

| |
|---|
| 7.9 ± 0.2 |
| 11.6 ± 0.2 |
| 14.0 ± 0.2 |
| 14.5 ± 0.2 |
| 15.9 ± 0.2 |
| 17.1 ± 0.2 |
| 18.5 ± 0.2 |
| 21.4 ± 0.2 |
| 21.9 ± 0.2 |
| 22.7 ± 0.2 |
| 23.9 ± 0.2 |
| 24.7 ± 0.2 |

TABLE 17A-continued

Characteristic X-ray Powder Diffraction Peaks for Form Q
°2θ

| |
|---|
| 25.5 ± 0.2 |
| 26.6 ± 0.2 |

Form Q can be characterized by an X-ray diffraction pattern having at least one peak selected from Table 17A.

Figure 63:
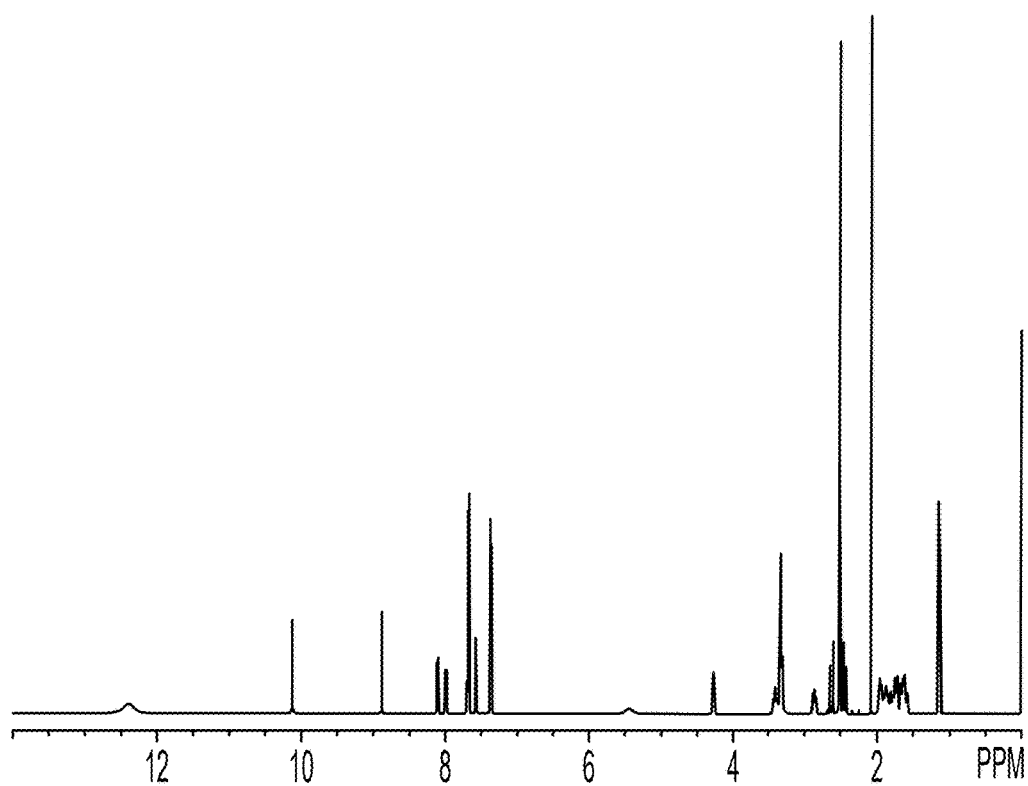
FIG. 63 depicts a $^1$H NMR profile of Form Q.
Figure 64:
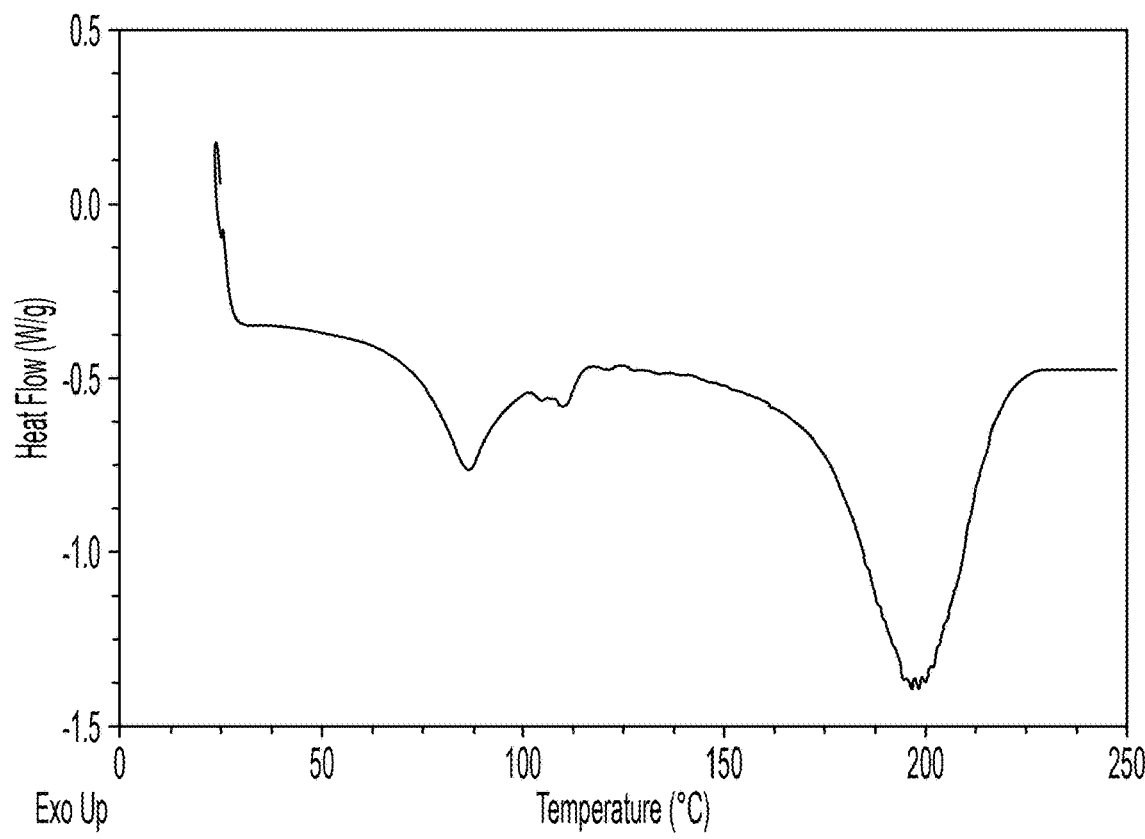
FIG. 64 depicts a DSC thermogram of Form Q.
Figure 65:
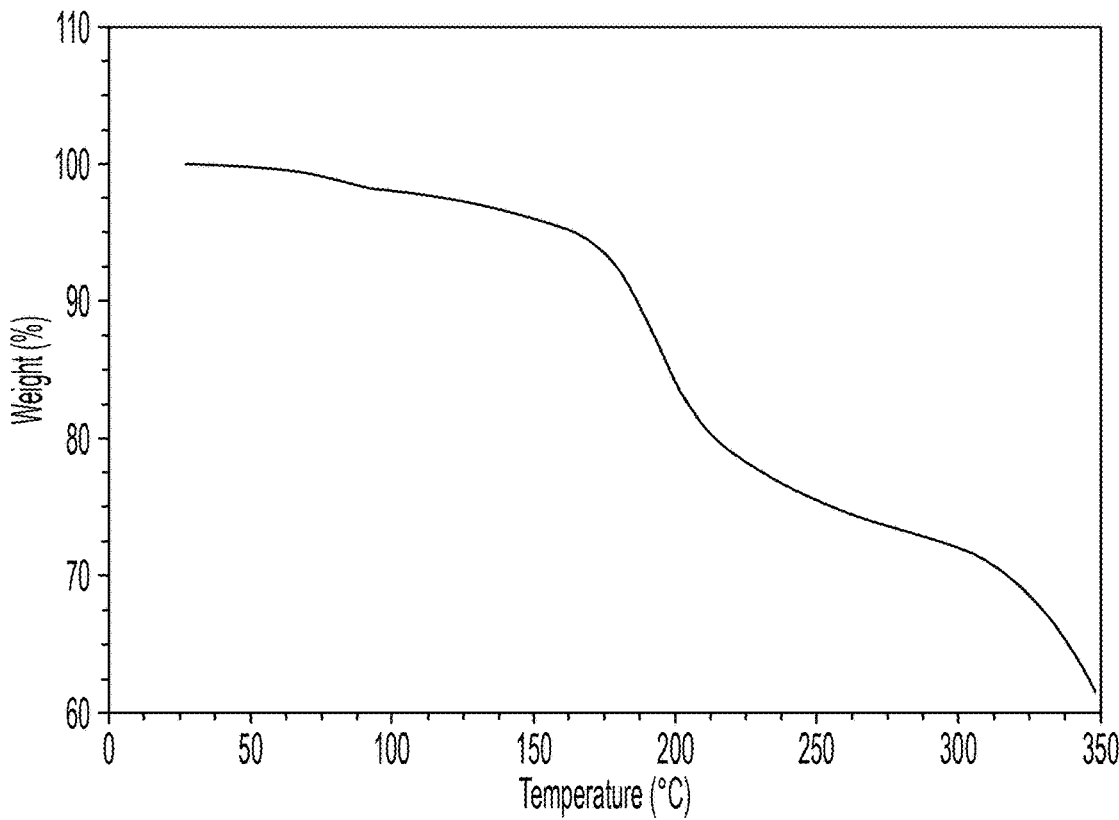
FIG. 65 depicts a TGA thermogram of Form Q.

In other aspects, Form Q can be characterized by a $^1$H NMR profile substantially as shown in FIG. 63. In other aspects, Form Q can be characterized by a DSC thermogram substantially as shown in FIG. 64. In other aspects, Form Q can be characterized by a TGA thermogram substantially as shown in FIG. 65.

Figure 66:
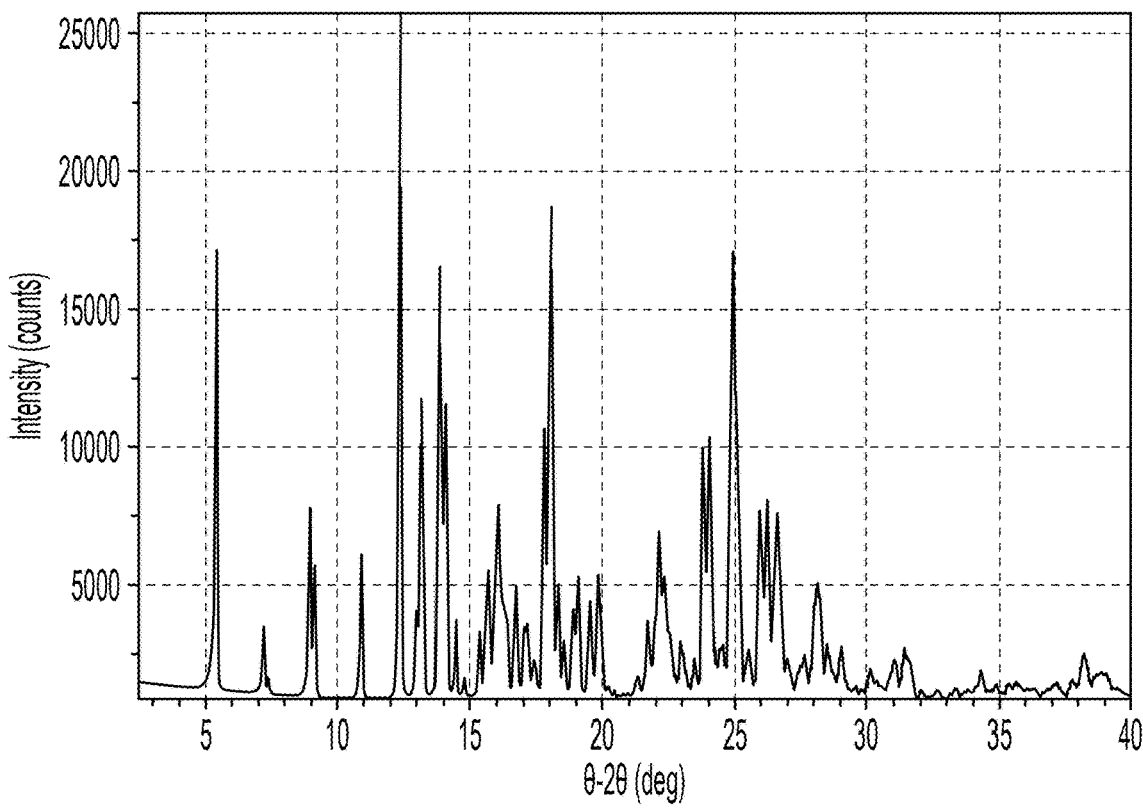
FIG. 66 depicts an X-ray diffraction pattern of Compound 1 napadisylate salt/cocrystal (Form R).

Also provided herein is a Compound 1 napadisylate salt/cocrystal, referred to herein as Form R. In some aspects, Form R can be characterized by an X-ray diffraction pattern substantially as shown in FIG. 66. Diffraction peak positions for Form R that were obtained using the equipment and conditions specified in Example 3, infra, are shown below in Table 18 and 18A:

TABLE 18

Observed X-ray Powder Diffraction Peaks for Form R
°2θ

| |
|---|
| 5.4 ± 0.2 |
| 7.2 ± 0.2 |
| 7.4 ± 0.2 |
| 9.0 ± 0.2 |
| 9.1 ± 0.2 |
| 10.9 ± 0.2 |
| 12.4 ± 0.2 |
| 13.0 ± 0.2 |
| 13.2 ± 0.2 |
| 13.9 ± 0.2 |
| 14.1 ± 0.2 |
| 14.5 ± 0.2 |
| 14.8 ± 0.2 |
| 15.4 ± 0.2 |
| 15.7 ± 0.2 |
| 16.1 ± 0.2 |
| 16.8 ± 0.2 |
| 17.1 ± 0.2 |
| 17.2 ± 0.2 |
| 17.4 ± 0.2 |
| 17.8 ± 0.2 |
| 18.1 ± 0.2 |
| 18.3 ± 0.2 |
| 18.6 ± 0.2 |
| 18.9 ± 0.2 |
| 19.1 ± 0.2 |
| 19.6 ± 0.2 |
| 19.9 ± 0.2 |
| 21.4 ± 0.2 |
| 21.7 ± 0.2 |
| 22.2 ± 0.2 |
| 22.3 ± 0.2 |
| 23.0 ± 0.2 |
| 23.5 ± 0.2 |
| 23.9 ± 0.2 |
| 24.1 ± 0.2 |
| 24.6 ± 0.2 |
| 24.9 ± 0.2 |
| 25.5 ± 0.2 |
| 26.0 ± 0.2 |
| 26.3 ± 0.2 |
| 26.6 ± 0.2 |
| 27.0 ± 0.2 |
| 27.6 ± 0.2 |
| 28.2 ± 0.2 |
| 28.5 ± 0.2 |
| 29.1 ± 0.2 |

TABLE 18A

Characteristic X-ray Powder Diffraction Peaks for Form R
°2θ

| |
|---|
| 5.4 ± 0.2 |
| 12.4 ± 0.2 |
| 13.2 ± 0.2 |
| 13.9 ± 0.2 |
| 17.8 ± 0.2 |
| 18.1 ± 0.2 |
| 24.1 ± 0.2 |
| 24.9 ± 0.2 |

Form R can be characterized by an X-ray diffraction pattern having at least one peak selected from Table 18A.

Figure 67:
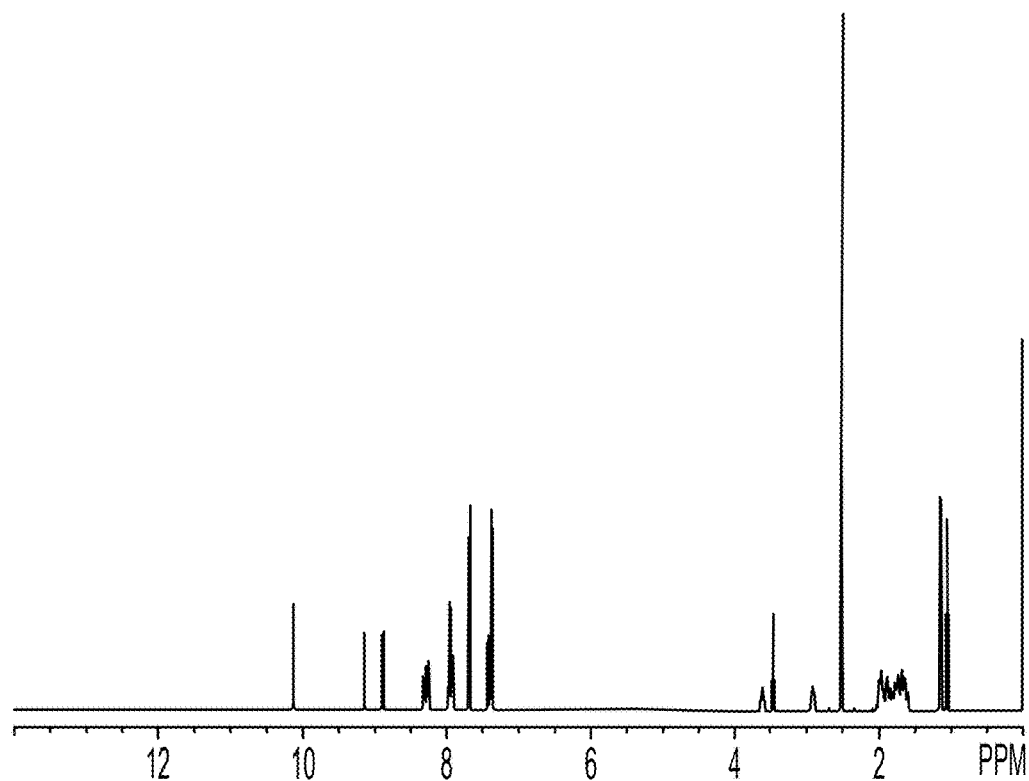
FIG. 67 depicts a $^1$H NMR profile of Form R.
Figure 68:
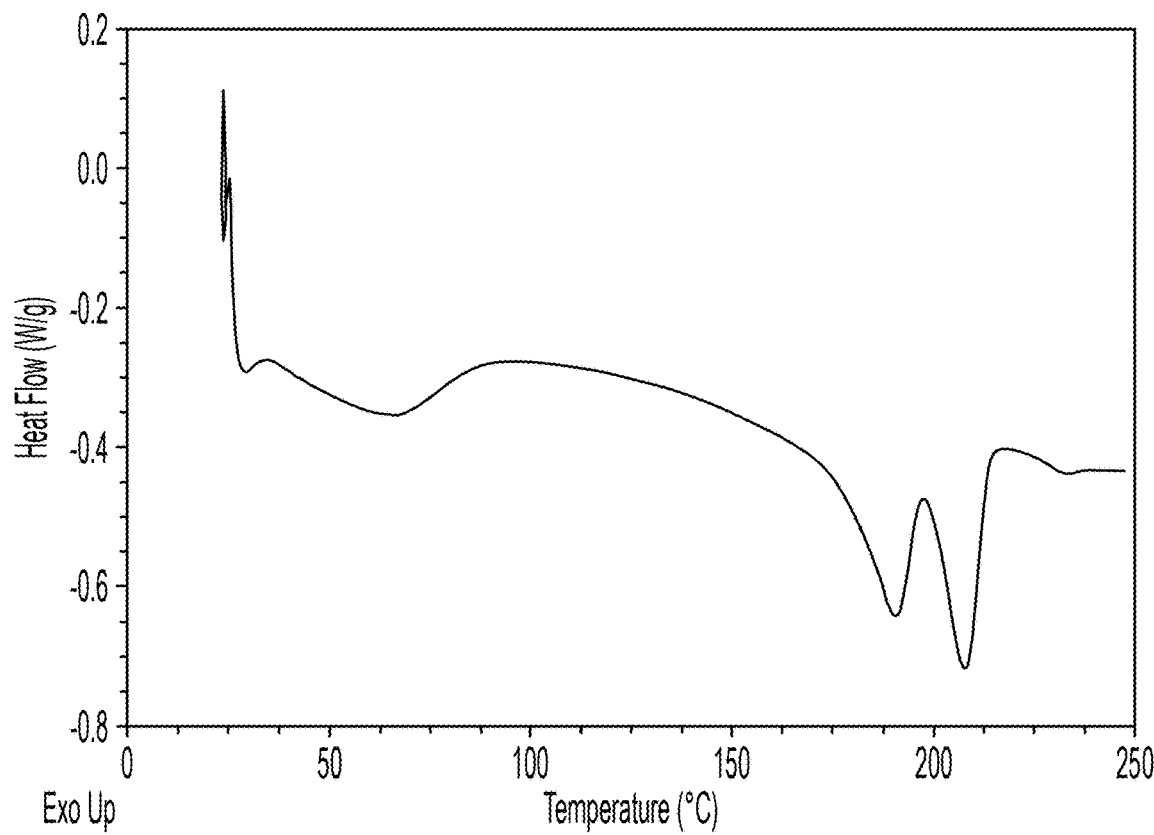
FIG. 68 depicts a DSC thermogram of Form R.
Figure 69:
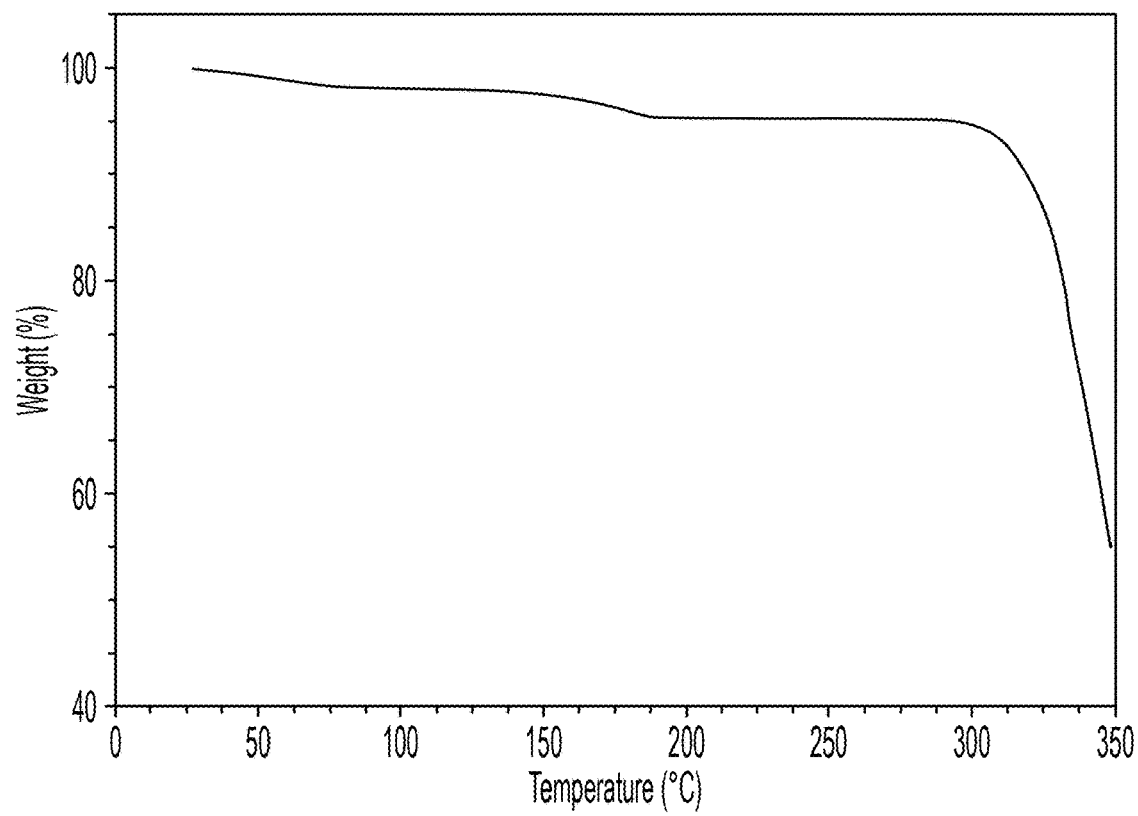
FIG. 69 depicts a TGA thermogram of Form R.

In other aspects, Form R can be characterized by a $^1$H NMR profile substantially as shown in FIG. 67. In other aspects, Form R can be characterized by a DSC thermogram substantially as shown in FIG. 68. In other aspects, Form R can be characterized by a TGA thermogram substantially as shown in FIG. 69.

Figure 70:
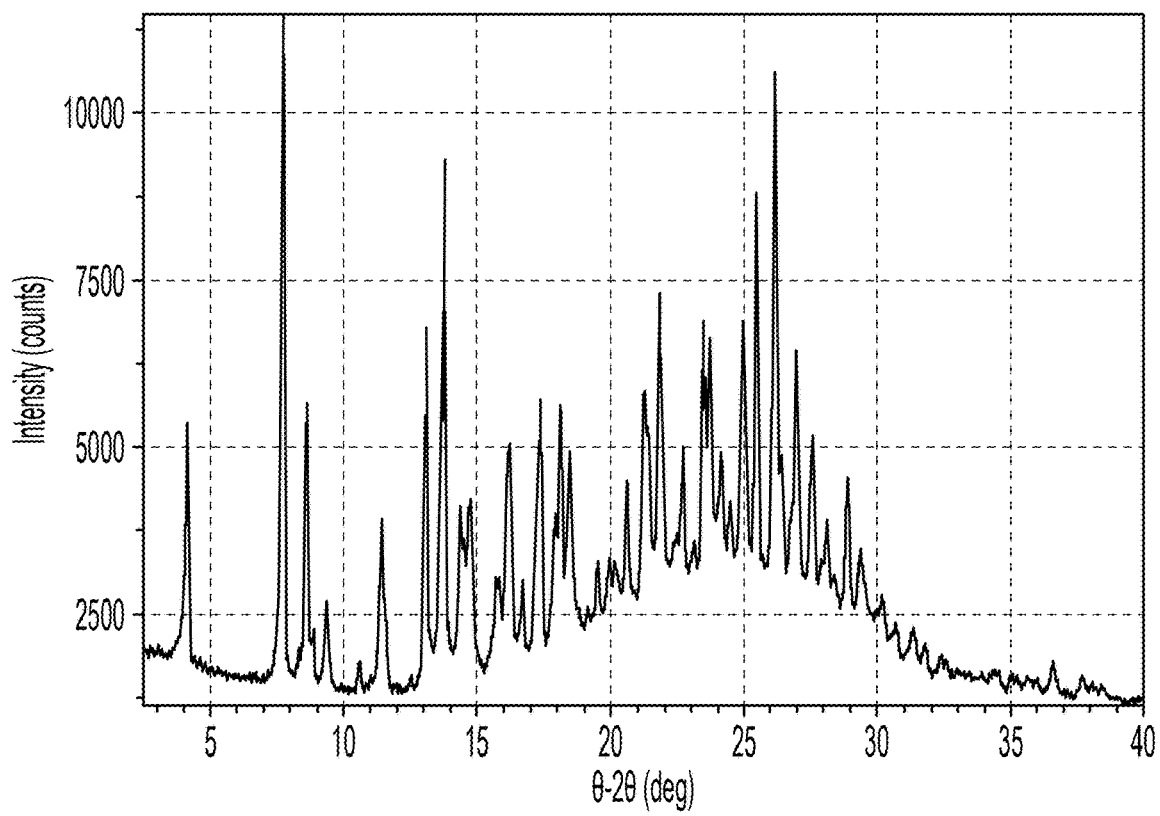
FIG. 70 depicts an X-ray diffraction pattern of Compound 1 phosphate salt/cocrystal (Form S).

Also provided herein is a Compound 1 phosphate salt/cocrystal, referred to herein as Form S. In some aspects, Form S can be characterized by an X-ray diffraction pattern substantially as shown in FIG. 70. Diffraction peak positions for Form S that were obtained using the equipment and conditions specified in Example 3, infra, are shown below in Table 19 and 19A:

TABLE 19

Observed X-ray Powder Diffraction Peaks for Form S
°2θ

| |
|---|
| 4.1 ± 0.2 |
| 7.8 ± 0.2 |
| 8.3 ± 0.2 |
| 8.6 ± 0.2 |
| 8.9 ± 0.2 |
| 9.4 ± 0.2 |
| 10.6 ± 0.2 |
| 11.4 ± 0.2 |
| 12.5 ± 0.2 |
| 13.1 ± 0.2 |
| 13.8 ± 0.2 |
| 14.4 ± 0.2 |
| 14.5 ± 0.2 |
| 14.7 ± 0.2 |
| 15.8 ± 0.2 |
| 15.8 ± 0.2 |
| 16.2 ± 0.2 |
| 16.2 ± 0.2 |
| 16.7 ± 0.2 |
| 17.4 ± 0.2 |
| 18.0 ± 0.2 |
| 18.2 ± 0.2 |
| 18.5 ± 0.2 |
| 19.5 ± 0.2 |
| 20.0 ± 0.2 |
| 20.2 ± 0.2 |
| 20.6 ± 0.2 |
| 21.3 ± 0.2 |
| 21.9 ± 0.2 |
| 22.7 ± 0.2 |
| 23.2 ± 0.2 |
| 23.5 ± 0.2 |
| 23.8 ± 0.2 |
| 24.2 ± 0.2 |
| 24.5 ± 0.2 |
| 25.0 ± 0.2 |
| 25.5 ± 0.2 |
| 26.2 ± 0.2 |
| 26.4 ± 0.2 |
| 27.0 ± 0.2 |
| 27.6 ± 0.2 |

TABLE 19-continued

Observed X-ray Powder Diffraction Peaks for Form S
°2θ

| |
|---|
| 28.2 ± 0.2 |
| 28.9 ± 0.2 |

TABLE 19A

Characteristic X-ray Powder Diffraction Peaks for Form S
°2θ

| |
|---|
| 4.1 ± 0.2 |
| 7.8 ± 0.2 |
| 8.6 ± 0.2 |
| 13.1 ± 0.2 |
| 13.8 ± 0.2 |
| 17.4 ± 0.2 |
| 18.2 ± 0.2 |
| 21.3 ± 0.2 |
| 21.9 ± 0.2 |
| 23.5 ± 0.2 |
| 25.0 ± 0.2 |
| 25.5 ± 0.2 |
| 26.2 ± 0.2 |

Form S can be characterized by an X-ray diffraction pattern having at least one peak selected from Table 19A.

Figure 71:
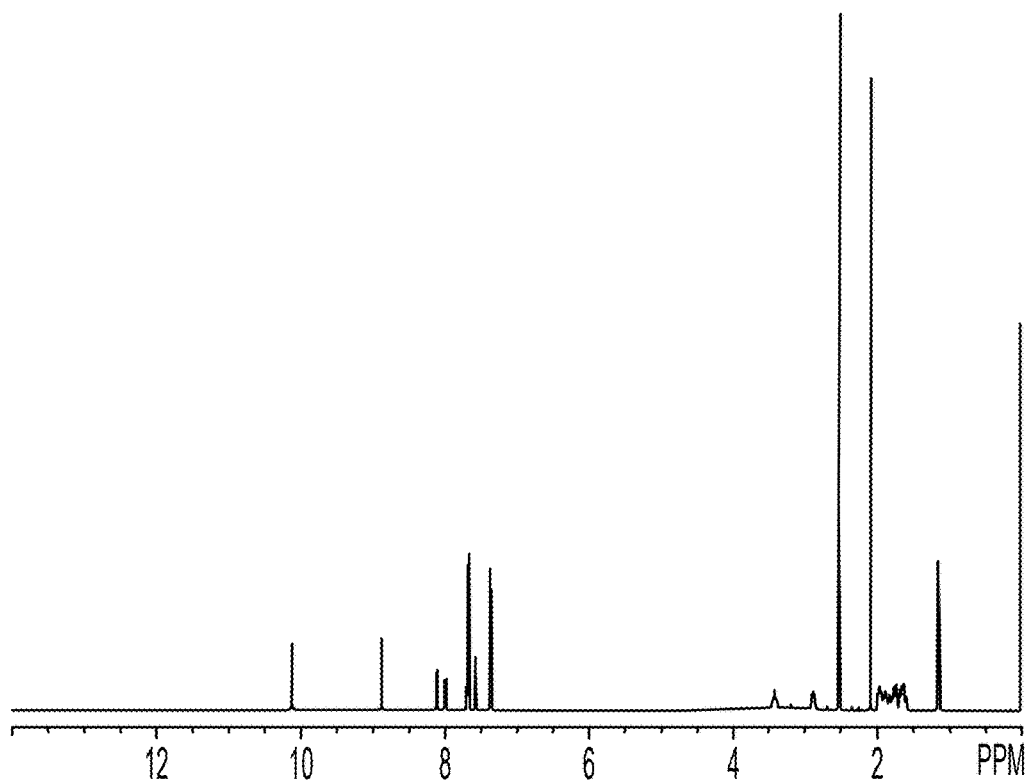
FIG. 71 depicts a $^1$H NMR profile Form S.
Figure 72:
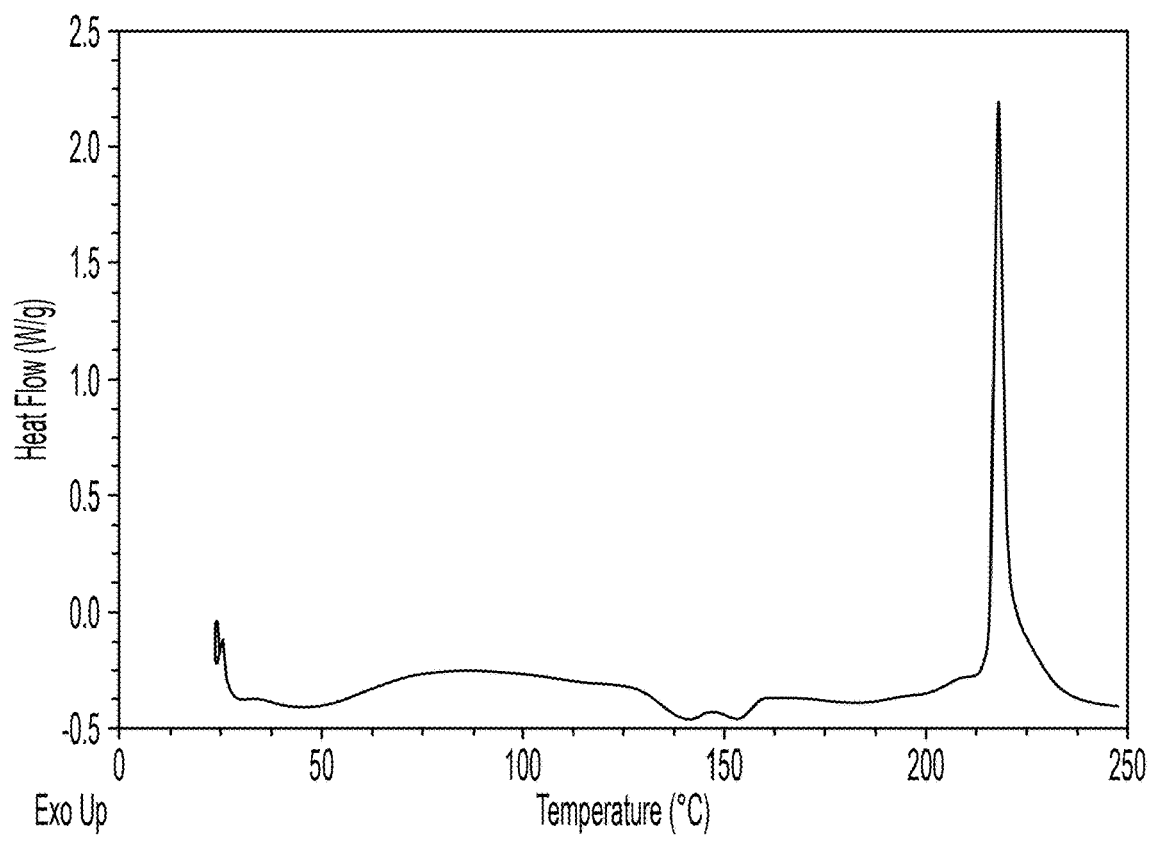
FIG. 72 depicts a DSC thermogram of Form S.
Figure 73:
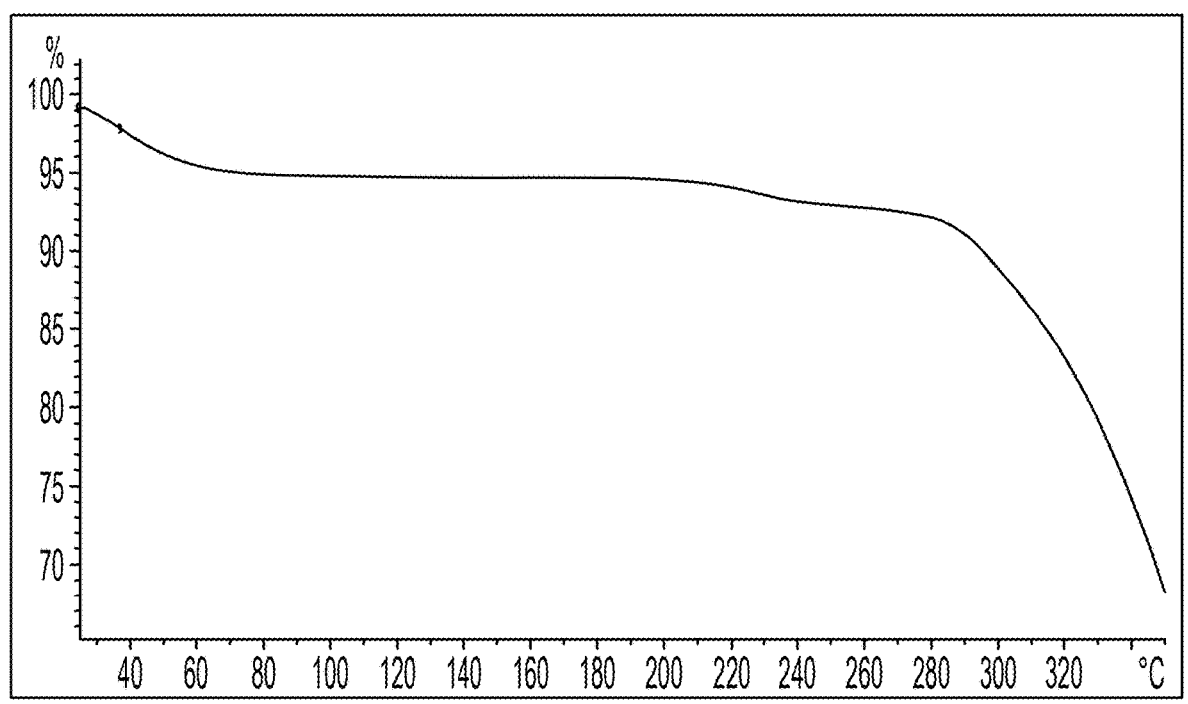
FIG. 73 depicts a TGA thermogram of Form S.

In other aspects, Form S can be characterized by a $^1$H NMR profile substantially as shown in FIG. 71. In other aspects, Form S can be characterized by a DSC thermogram substantially as shown in FIG. 72. In other aspects, Form S can be characterized by a TGA thermogram substantially as shown in FIG. 73.

Figure 74:
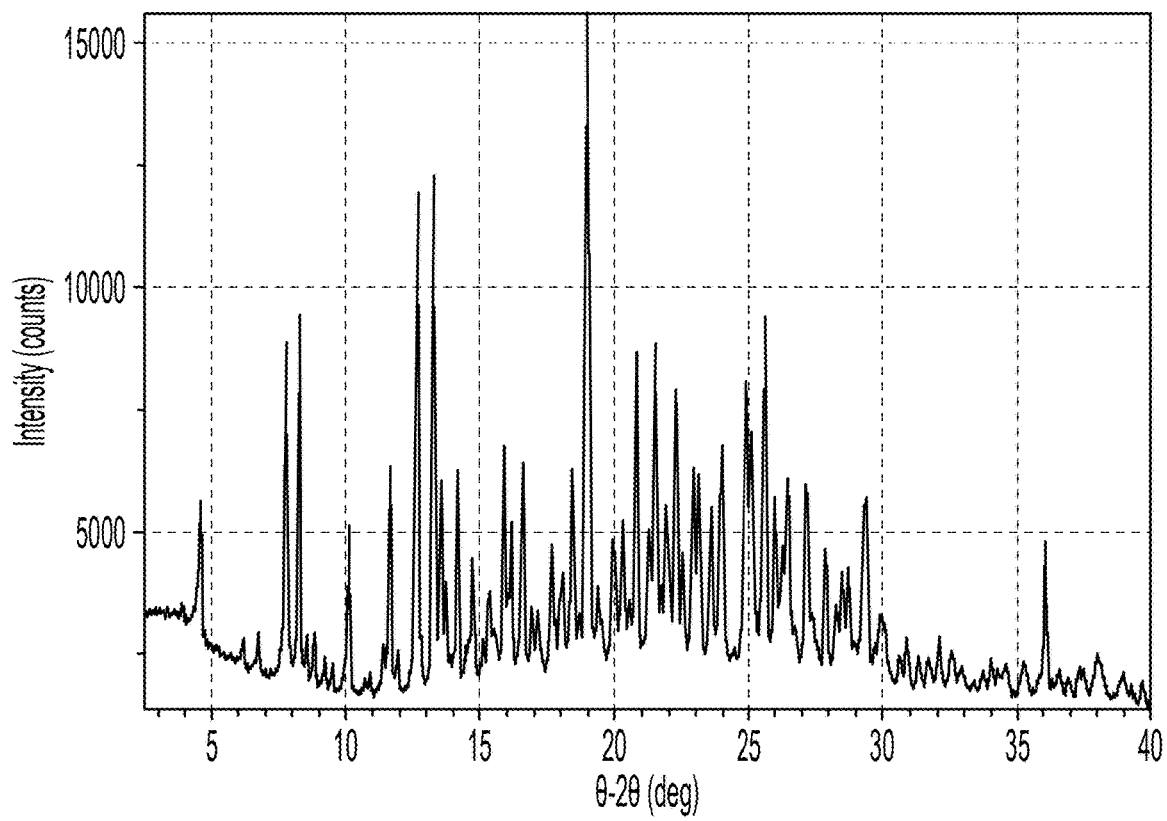
FIG. 74 depicts an X-ray diffraction pattern of a Compound 1 citric acid salt/cocrystal (Form T).

Also provided herein is a Compound 1 citric acid salt/cocrystal, referred to herein as Form T. In some aspects, Form T can be characterized by an X-ray diffraction pattern substantially as shown in FIG. 74. Diffraction peak positions for Form T that were obtained using the equipment and conditions specified in Example 3, infra, are shown below in Table 20 and 20A:

TABLE 20

Observed X-ray Powder Diffraction Peaks for Form T
°2θ

| |
|---|
| 3.9 ± 0.2 |
| 4.6 ± 0.2 |
| 6.2 ± 0.2 |
| 6.7 ± 0.2 |
| 7.8 ± 0.2 |
| 8.3 ± 0.2 |
| 8.5 ± 0.2 |
| 8.8 ± 0.2 |
| 9.2 ± 0.2 |
| 9.5 ± 0.2 |
| 10.1 ± 0.2 |
| 10.7 ± 0.2 |
| 10.9 ± 0.2 |
| 11.4 ± 0.2 |
| 11.6 ± 0.2 |
| 11.9 ± 0.2 |
| 12.7 ± 0.2 |
| 13.3 ± 0.2 |
| 13.5 ± 0.2 |
| 13.7 ± 0.2 |
| 14.2 ± 0.2 |
| 14.5 ± 0.2 |
| 14.7 ± 0.2 |
| 15.1 ± 0.2 |
| 15.4 ± 0.2 |
| 15.9 ± 0.2 |

TABLE 20-continued

Observed X-ray Powder Diffraction Peaks for Form T
°2θ

16.2 ± 0.2
16.6 ± 0.2
16.9 ± 0.2
17.2 ± 0.2
17.7 ± 0.2
18.1 ± 0.2
18.4 ± 0.2
18.7 ± 0.2
19.0 ± 0.2
19.4 ± 0.2
19.5 ± 0.2
19.9 ± 0.2
20.0 ± 0.2
20.3 ± 0.2
20.5 ± 0.2
20.8 ± 0.2
21.3 ± 0.2
21.5 ± 0.2
21.7 ± 0.2
21.9 ± 0.2
22.3 ± 0.2
22.5 ± 0.2
22.9 ± 0.2
23.1 ± 0.2
23.6 ± 0.2
24.0 ± 0.2
24.9 ± 0.2
25.1 ± 0.2
25.6 ± 0.2
26.0 ± 0.2
26.3 ± 0.2
26.5 ± 0.2
26.7 ± 0.2
27.1 ± 0.2
27.4 ± 0.2
27.9 ± 0.2
28.3 ± 0.2
28.5 ± 0.2
28.7 ± 0.2
29.4 ± 0.2

TABLE 20A

Characteristic X-ray Powder Diffraction Peaks for Form T
°2θ

7.8 ± 0.2
8.3 ± 0.2
11.6 ± 0.2
12.7 ± 0.2
13.3 ± 0.2
19.0 ± 0.2
20.8 ± 0.2
21.5 ± 0.2
22.3 ± 0.2
24.9 ± 0.2
25.6 ± 0.2

Form T can be characterized by an X-ray diffraction pattern having at least one peak selected from Table 20A.

Figure 75:
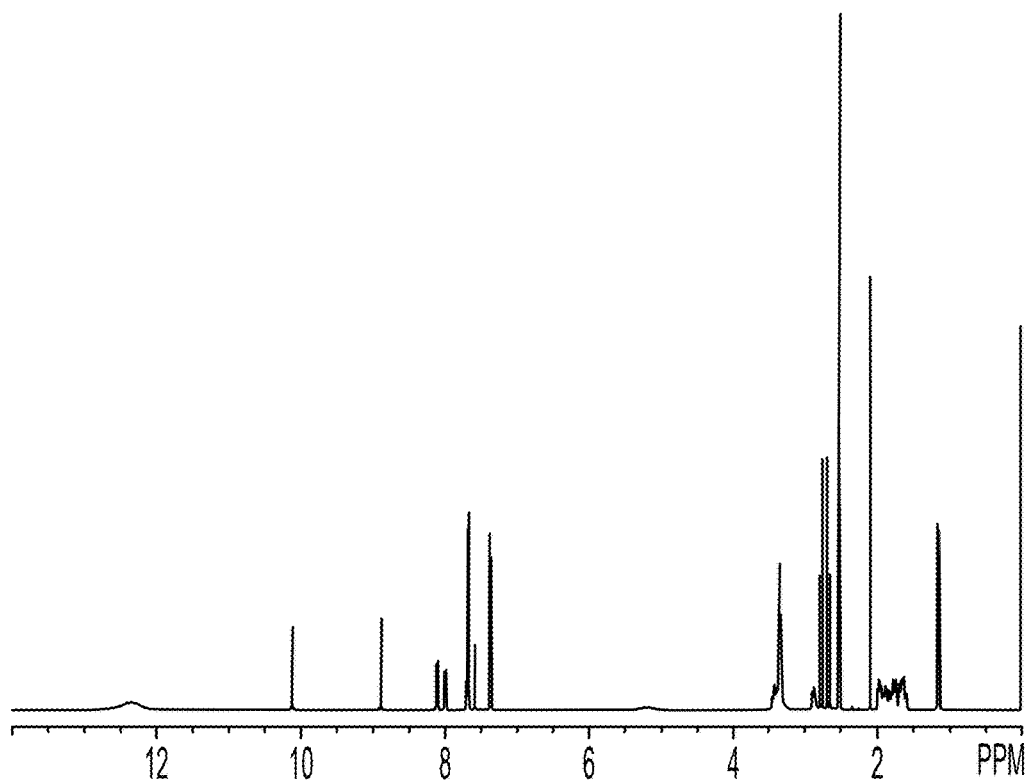
FIG. 75 depicts a $^1$H NMR profile of Form T.
Figure 76:
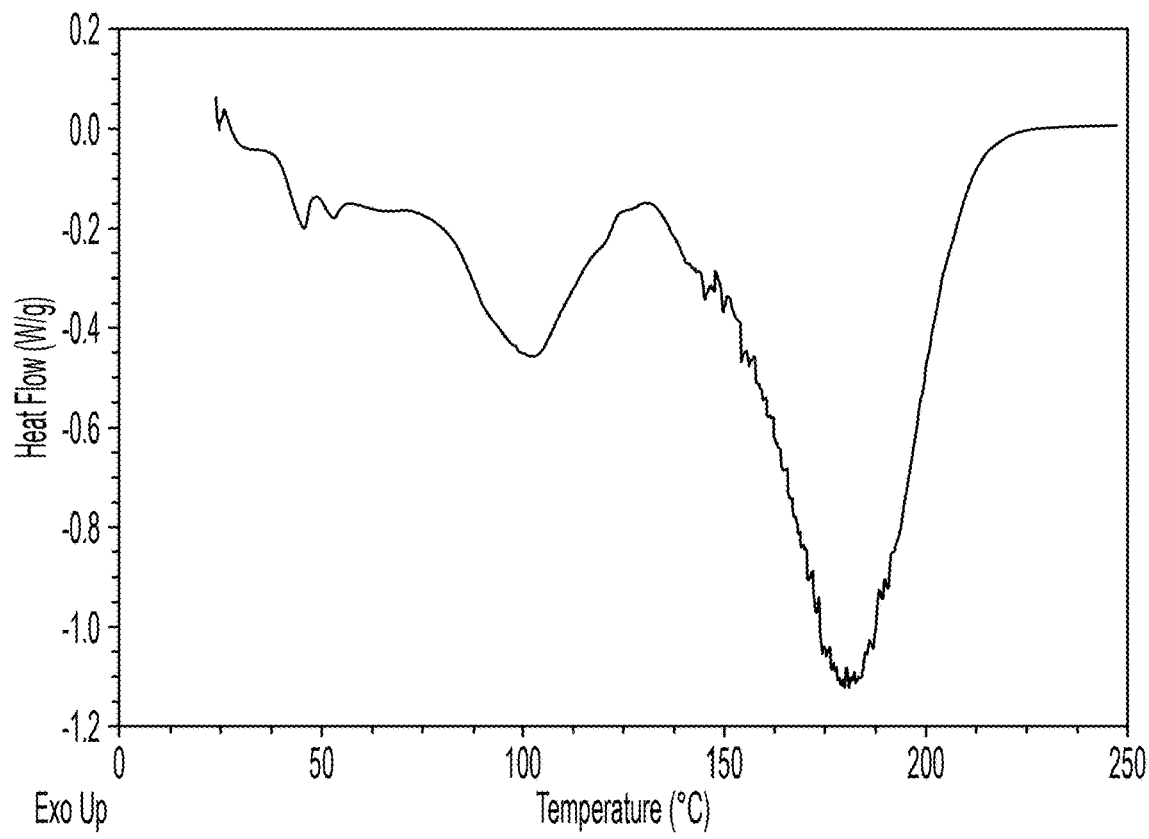
FIG. 76 depicts a DSC thermogram of Form T.
Figure 77:
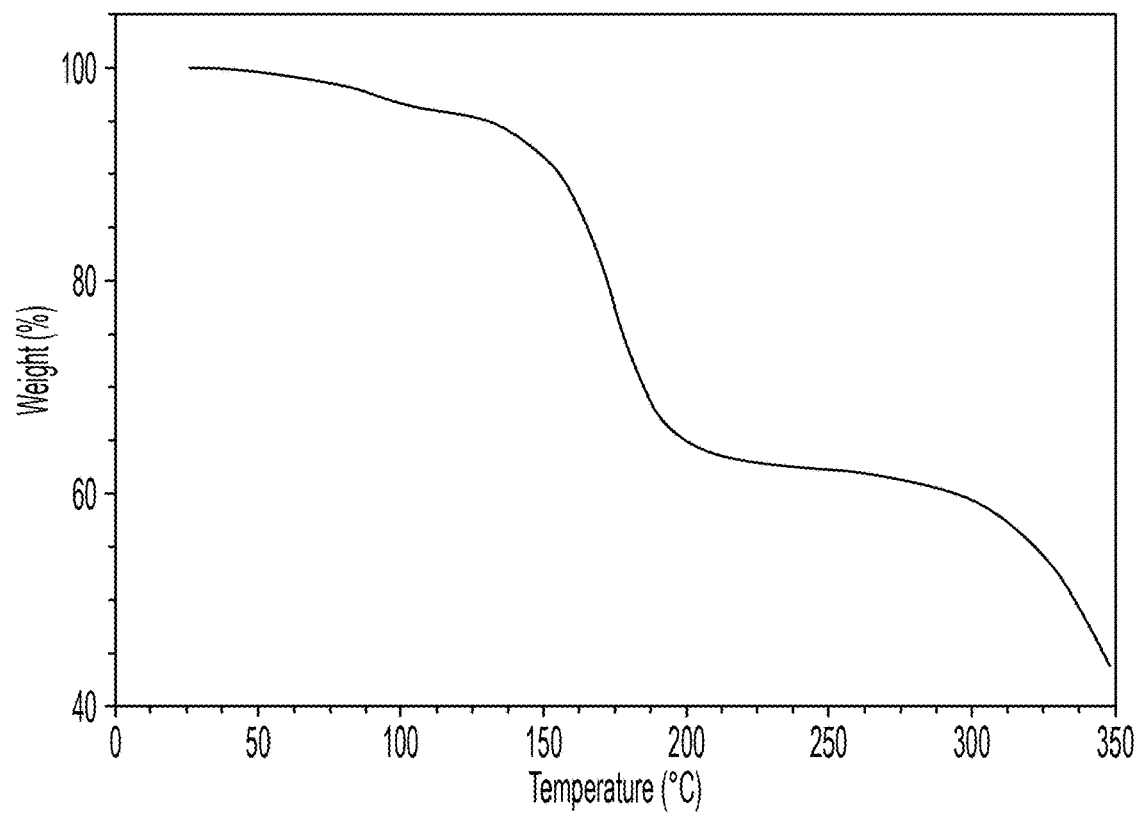
FIG. 77 depicts a TGA thermogram of Form T.

In other aspects, Form T can be characterized by a $^1$H NMR profile substantially as shown in FIG. 75. In other aspects, Form T can be characterized by a DSC thermogram substantially as shown in FIG. 76. In other aspects, Form T can be characterized by a TGA thermogram substantially as shown in FIG. 77.

Figure 78:
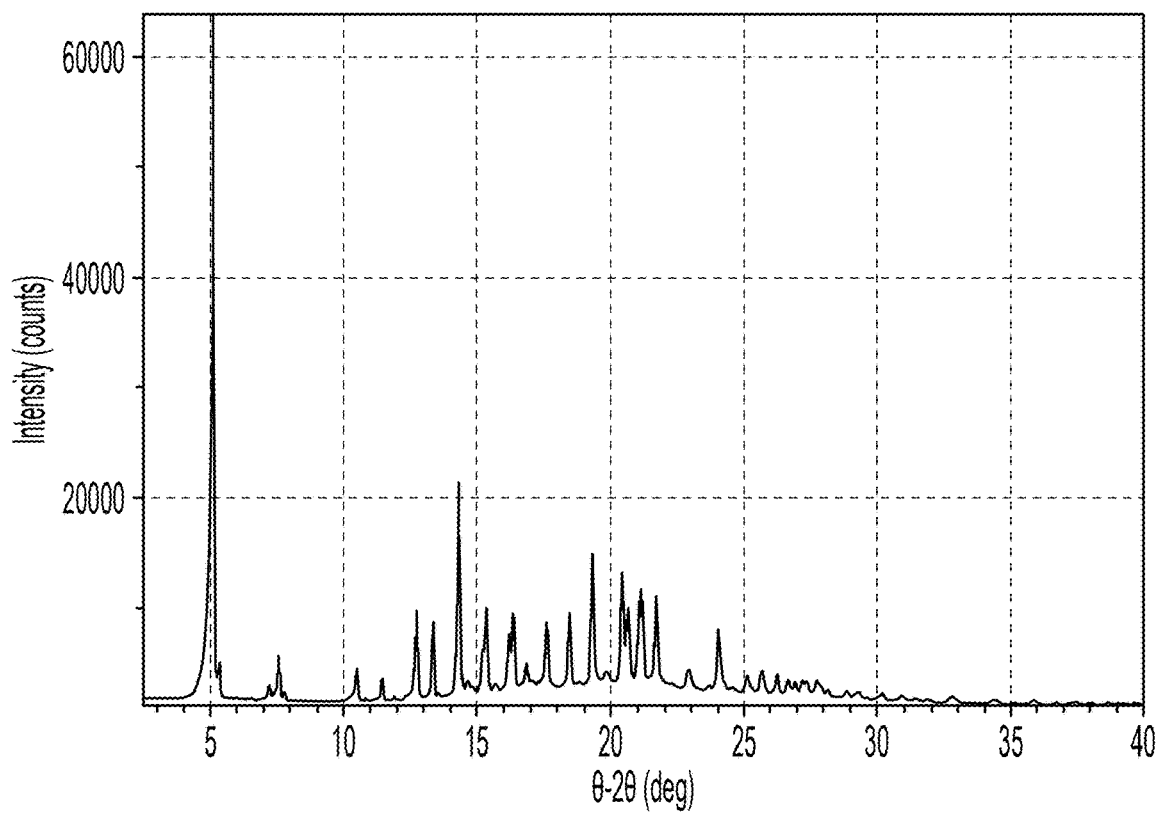
FIG. 78 depicts an X-ray diffraction pattern of a Compound 1 tosylate salt/cocrystal (Form U).

Also provided herein is a Compound 1 tosylate salt/cocrystal, referred to herein as Form U. In some aspects, Form U can be characterized by an X-ray diffraction pattern substantially as shown in FIG. 78. Diffraction peak positions for Form U that were obtained using the equipment and conditions specified in Example 3, infra, are shown below in Table 21 and 21A:

TABLE 21

Observed X-ray Powder Diffraction Peaks for Form U
°2θ

5.1 ± 0.2
5.3 ± 0.2
7.2 ± 0.2
7.6 ± 0.2
7.8 ± 0.2
10.5 ± 0.2
10.8 ± 0.2
11.4 ± 0.2
11.9 ± 0.2
12.3 ± 0.2
12.7 ± 0.2
13.4 ± 0.2
13.5 ± 0.2
14.3 ± 0.2
14.7 ± 0.2
14.8 ± 0.2
15.2 ± 0.2
15.3 ± 0.2
15.7 ± 0.2
16.2 ± 0.2
16.4 ± 0.2
16.9 ± 0.2
17.6 ± 0.2
18.5 ± 0.2
18.8 ± 0.2
19.3 ± 0.2
19.8 ± 0.2
20.4 ± 0.2
20.7 ± 0.2
21.2 ± 0.2
21.7 ± 0.2
22.9 ± 0.2
24.0 ± 0.2
25.1 ± 0.2
25.7 ± 0.2
26.3 ± 0.2
26.7 ± 0.2
26.9 ± 0.2
27.2 ± 0.2
27.4 ± 0.2
27.8 ± 0.2

TABLE 21A

Characteristic X-ray Powder Diffraction Peaks for Form U
°2θ

5.1 ± 0.2
14.3 ± 0.2
19.3 ± 0.2
20.4 ± 0.2
21.2 ± 0.2
21.7 ± 0.2

Form U can be characterized by an X-ray diffraction pattern having at least one peak selected from Table 21A.

Figure 79:
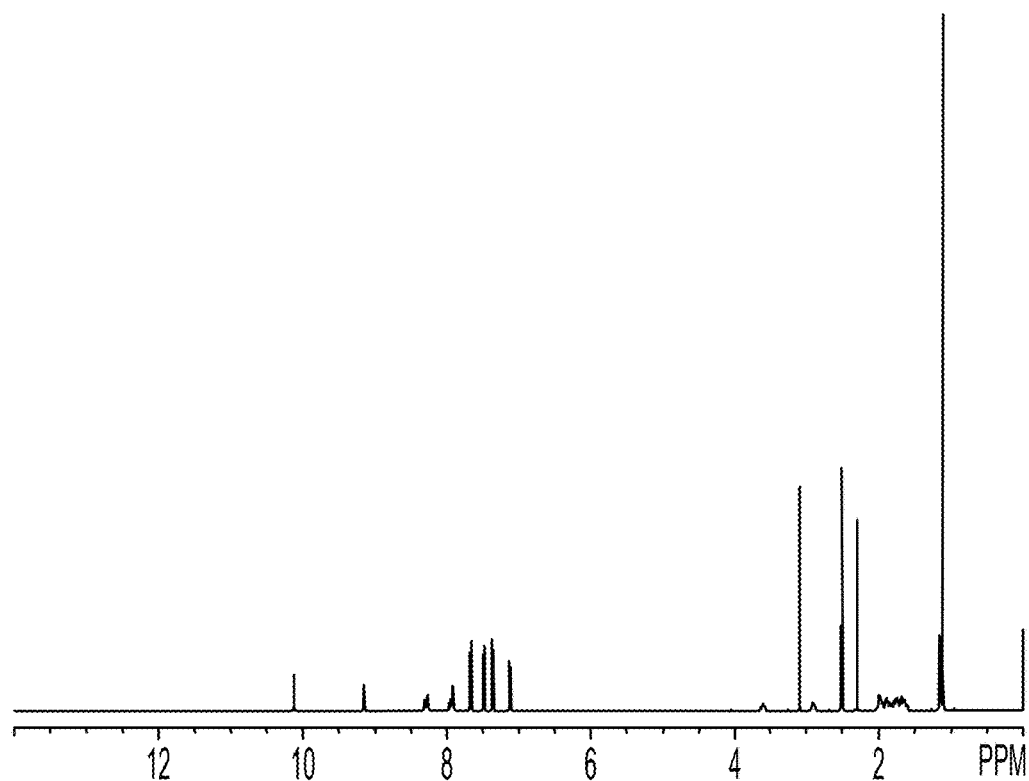
FIG. 79 depicts a $^1$H NMR profile of Form U.
Figure 80:
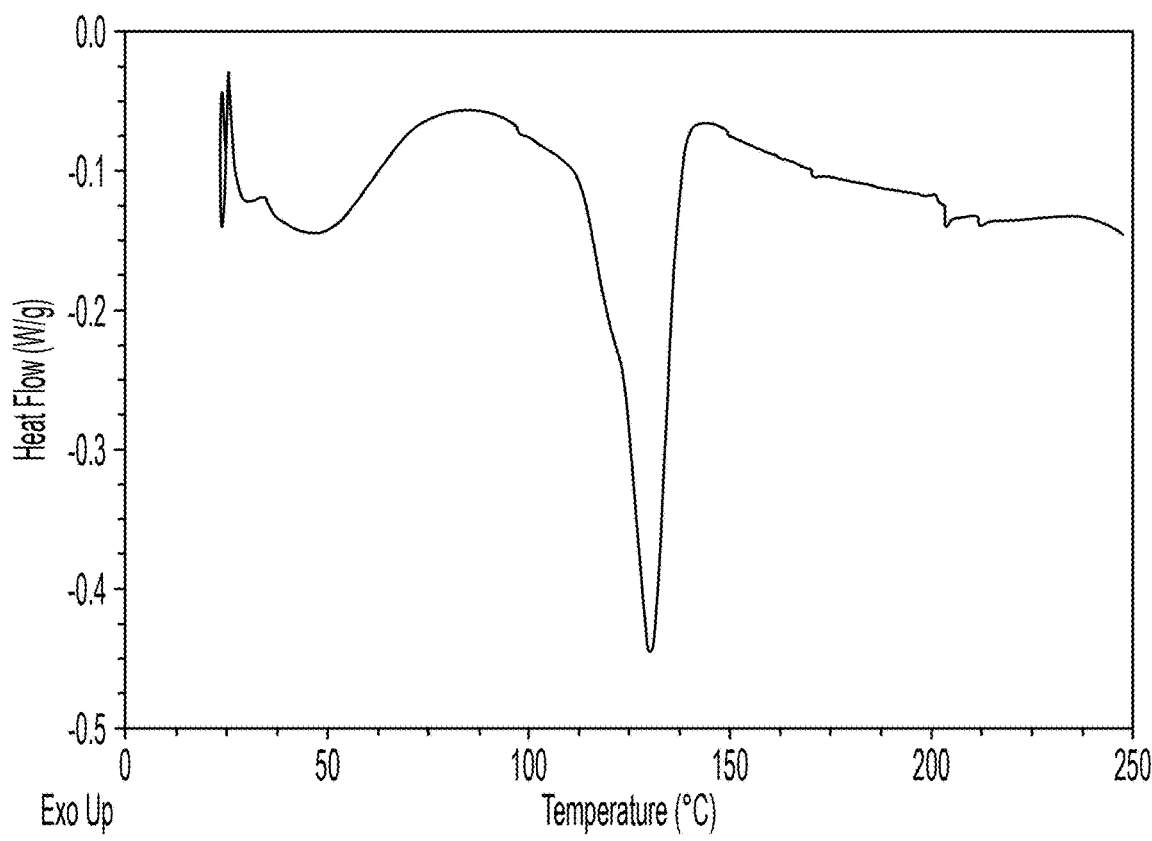
FIG. 80 depicts a DSC thermogram of Form U.
Figure 81:
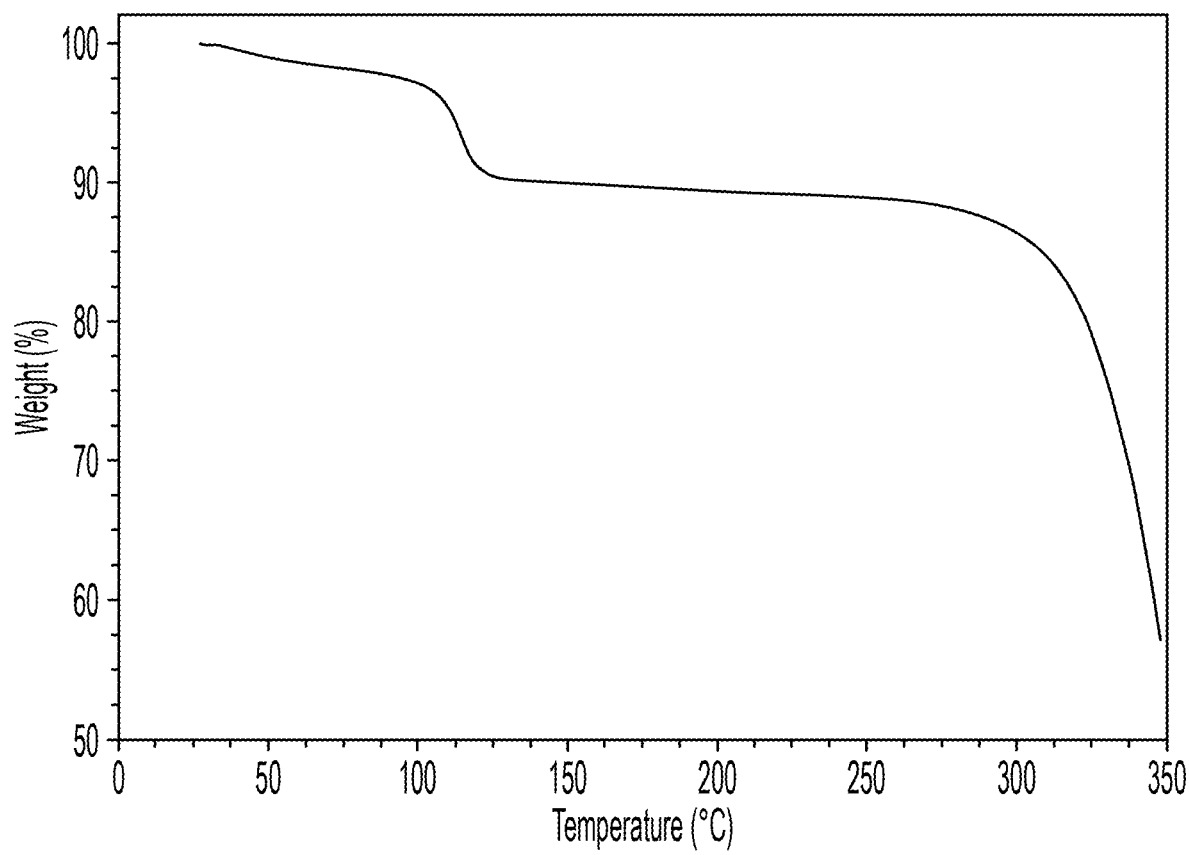
FIG. 81 depicts a TGA thermogram of Form U.

In other aspects, Form U can be characterized by a $^1$H NMR profile substantially as shown in FIG. 79. In other aspects, Form U can be characterized by a DSC thermogram substantially as shown in FIG. 80. In other aspects, Form U can be characterized by a TGA thermogram substantially as shown in FIG. 81.

Samples of the crystalline forms described herein may be provided with substantially pure phase homogeneity, indicating the presence of a dominant amount of a single crystalline form and optionally minor amounts of one or more other crystalline forms. The presence of more than one crystalline form in a sample may be determined by techniques such as powder X-ray diffraction (PXRD) or solid state nuclear magnetic resonance spectroscopy (SSNMR). For example, the presence of extra peaks in the comparison of an experimentally measured PXRD pattern with a simulated PXRD pattern may indicate more than one crystalline form in the sample. The simulated PXRD may be calculated from single crystal X-ray data, see Smith, D. K., A FORTRAN Program for Calculating X-Ray Powder Diffraction Patterns, Lawrence Radiation Laboratory, Livermore, California, UCRL-7196 (April 1963). Preferably, the crystalline form has substantially pure phase homogeneity as indicated by 10% or less, preferably 5% or less, and more preferably 2% or less of the total peak area in the experimentally measured PXRD pattern arising from the extra peaks that are absent from the simulated XRPD pattern. Most preferred is a crystalline form having substantially pure phase homogeneity with 10% or less of the total peak area in the experimentally measured PXRD pattern arising from the extra peaks that are absent from the simulated PXRD pattern.

The various solid forms described herein may be distinguishable from one another through the use of various analytical techniques known to one of ordinary skill in the art. Such techniques include, but are not limited to, solid state nuclear magnetic resonance (SSNMR) spectroscopy, X-ray powder diffraction (PXRD), differential scanning calorimetry (DSC), and/or thermogravimetric analysis (TGA).

One of ordinary skill in the art will appreciate that an X-ray diffraction pattern may be obtained with a measurement error that is dependent upon the measurement conditions employed. In particular, it is generally known that intensities in an X-ray diffraction pattern may fluctuate depending upon measurement conditions employed. It should be further understood that relative intensities may also vary depending upon experimental conditions and, accordingly, the exact order of intensity should not be taken into account. Additionally, a measurement error of diffraction angle for a conventional X-ray diffraction pattern is typically about ±0.2 degrees 2θ, and such degree of measurement error should be taken into account as pertaining to the aforementioned diffraction angles. Consequently, it is to be understood that the crystal forms of the instant invention are not limited to the crystalline forms that provide X-ray diffraction patterns completely identical to the X-ray diffraction patterns depicted in the accompanying Figures disclosed herein. Any crystalline forms that provide X-ray diffraction patterns substantially identical to those disclosed in the accompanying Figures fall within the scope of the present invention. The ability to ascertain substantial identities of X-ray diffraction patterns is within the purview of one of ordinary skill in the art.

The solid forms of Compound 1 (and solid forms of its hydrates and salt forms) described herein may be formulated into pharmaceutical compositions and/or employed in therapeutic and/or prophylactic methods. These methods include, but are not limited to, the administration of solid forms of Compound 1, solid forms of Compound 1 hydrate (including Compound 1 monohydrate), and solid forms of Compound 1 MSA salt, alone or in combination with one or more other pharmaceutically active agents, including agents that may be useful in the treatment of the disorders described herein.

Therapeutic Applications

The compounds and pharmaceutical compositions of the present invention are useful in treating or preventing any disease or conditions that are sensitive to enzymatic activity of IDO. These include viral and other infections (e.g., skin infections, GI infection, urinary tract infections, genitourinary infections, systemic infections), proliferative diseases (e.g., cancer), and autoimmune diseases (e.g., rheumatoid arthritis, lupus). The compounds and pharmaceutical compositions may be administered to animals, preferably mammals (e.g., domesticated animals, cats, dogs, mice, rats), and more preferably humans. Any method of administration may be used to deliver the compound or pharmaceutical composition to the patient. In certain embodiments, the compound or pharmaceutical composition is administered orally. In other embodiments, the compound or pharmaceutical composition is administered parenterally.

Compounds of the invention can modulate activity of the enzyme indoleamine-2,3-dioxygenase (IDO). The term "modulate" is meant to refer to an ability to increase or decrease activity of an enzyme or receptor. Accordingly, compounds of the invention can be used in methods of modulating IDO by contacting the enzyme with any one or more of the compounds or compositions described herein. In some embodiments, compounds of the present invention can act as inhibitors of IDO. In further embodiments, the compounds of the invention can be used to modulate activity of IDO in cell or in an individual in need of modulation of the enzyme by administering a modulating (e.g., inhibiting) amount of a compound of the invention.

Compound 1 can inhibit activity of the enzyme indoleamine-2,3-dioxygenase (IDO). For example, Compound 1 can be used to inhibit activity of IDO in cell or in an individual in need of modulation of the enzyme by administering an inhibiting amount of Compound 1.

The present invention further provides methods of inhibiting the degradation of tryptophan in a system containing cells expressing IDO such as a tissue, living organism, or cell culture. In some embodiments, the present invention provides methods of altering (e.g., increasing) extracellular tryptophan levels in a mammal by administering an effective amount of Compound 1 in a composition provided herein. Methods of measuring tryptophan levels and tryptophan degradation are routine in the art.

The present invention further provides methods of inhibiting immunosuppression such as IDO-mediated immunosuppression in a patient by administering to the patient an effective amount of Compound 1 as recited herein. IDO-mediated immunosuppression has been associated with, for example, cancers, tumor growth, metastasis, viral infection, and viral replication.

The present invention further provides methods of treating diseases associated with activity or expression, including abnormal activity and/or overexpression, of IDO in an individual (e.g., patient) by administering to the individual in need of such treatment a therapeutically effective amount or dose of a solid form of Compound 1 (or a hydrate or salt thereof) of the present invention or a pharmaceutical composition thereof. Example diseases can include any disease, disorder or condition that is directly or indirectly linked to expression or activity of the IDO enzyme, such as over expression or abnormal activity. An IDO-associated disease can also include any disease, disorder or condition that can be prevented, ameliorated, or cured by modulating enzyme activity. Examples of IDO-associated diseases include cancer, viral infection such as HIV infection, HCV infection, depression, neurodegenerative disorders such as Alzheimer's disease and Huntington's disease, trauma, age-related cataracts, organ transplantation (e.g., organ transplant rejection), and autoimmune diseases including asthma, rheumatoid arthritis, multiple sclerosis, allergic inflammation, inflammatory bowel disease, psoriasis and systemic lupus erythematosus.

As used herein, the term "cell" is meant to refer to a cell that is in vitro, ex vivo or in vivo. In some embodiments, an ex vivo cell can be part of a tissue sample excised from an organism such as a mammal. In some embodiments, an in vitro cell can be a cell in a cell culture. In some embodiments, an in vivo cell is a cell living in an organism such as a mammal.

As used herein, the term "contacting" refers to the bringing together of indicated moieties in an in vitro system or an in vivo system. For example, "contacting" the IDO enzyme with a compound of the invention includes the administration of a compound of the present invention to an individual or patient, such as a human, having IDO, as well as, for example, introducing a solid form of Compound 1 of the disclosure into a sample containing a cellular or purified preparation containing the IDO enzyme.

The term "IDO inhibitor" refers to an agent capable of inhibiting the activity of indoleamine 2,3-dioxygenase (IDO) and thereby reversing IDO-mediated immunosuppression. The IDO inhibitor may inhibit IDO1 and/or IDO2 (INDOL1). An IDO inhibitor may be a reversible or irreversible IDO inhibitor. "A reversible IDO inhibitor" is a compound that reversibly inhibits IDO enzyme activity either at the catalytic site or at a non-catalytic site and "an irreversible IDO inhibitor" is a compound that irreversibly destroys IDO enzyme activity.

Types of cancers that may be treated with the solid forms and compositions of this disclosure include, but are not limited to, brain cancers, skin cancers, bladder cancers, ovarian cancers, breast cancers, gastric cancers, pancreatic cancers, prostate cancers, colon cancers, blood cancers, lung cancers and bone cancers. Examples of such cancer types include neuroblastoma, intestine carcinoma such as rectum carcinoma, colon carcinoma, familiar adenomatous polyposis carcinoma and hereditary non-polyposis colorectal cancer, esophageal carcinoma, labial carcinoma, larynx carcinoma, hypopharynx carcinoma, tongue carcinoma, salivary gland carcinoma, gastric carcinoma, adenocarcinoma, medullary thyroid carcinoma, papillary thyroid carcinoma, renal carcinoma, kidney parenchymal carcinoma, ovarian carcinoma, cervix carcinoma, uterine corpus carcinoma, endometrium carcinoma, chorion carcinoma, pancreatic carcinoma, prostate carcinoma, testis carcinoma, breast carcinoma, urinary carcinoma, melanoma, brain tumors such as glioblastoma, astrocytoma, meningioma, medulloblastoma and peripheral neuroectodermal tumors, Hodgkin lymphoma, non-Hodgkin lymphoma, Burkitt lymphoma, acute lymphatic leukemia (ALL), chronic lymphatic leukemia (CLL), acute myeloid leukemia (AML), chronic myeloid leukemia (CML), adult T-cell leukemia lymphoma, diffuse large B-cell lymphoma (DLBCL), hepatocellular carcinoma, gall bladder carcinoma, bronchial carcinoma, small cell lung carcinoma, non-small cell lung carcinoma, multiple myeloma, basalioma, teratoma, retinoblastoma, choroid melanoma, seminoma, rhabdomyosarcoma, craniopharyngioma, osteosarcoma, chondrosarcoma, myosarcoma, liposarcoma, fibrosarcoma, Ewing sarcoma and plasmacytoma.

Thus, according to another embodiment, the invention provides a method of treating an autoimmune disease by providing to a patient in need thereof a solid form of a compound or composition of the present invention. Examples of such autoimmune diseases include, but are not limited to, collagen diseases such as rheumatoid arthritis, systemic lupus erythematosus, Sharp's syndrome, CREST syndrome (calcinosis, Raynaud's syndrome, esophageal dysmotility, telangiectasia), dermatomyositis, vasculitis (Morbus Wegener's) and Sjögren's syndrome, renal diseases such as Goodpasture's syndrome, rapidly-progressing glomerulonephritis and membranoproliferative glomerulonephritis type II, endocrine diseases such as type-I diabetes, autoimmune polyendocrinopathy-candidiasis-ectodermal dystrophy (APECED), autoimmune parathyroidism, pernicious anemia, gonad insufficiency, idiopathic Morbus Addison's, hyperthyreosis, Hashimoto's thyroiditis and primary myxedema, skin diseases such as pemphigus vulgaris, bullous pemphigoid, herpes gestationis, epidermolysis bullosa and erythema multiforme major, liver diseases such as primary biliary cirrhosis, autoimmune cholangitis, autoimmune hepatitis type-1, autoimmune hepatitis type-2, primary sclerosing cholangitis, neuronal diseases such as multiple sclerosis, myasthenia gravis, myasthenic Lambert-Eaton syndrome, acquired neuromyotomy, Guillain-Barre syndrome (Muller-Fischer syndrome), stiff-man syndrome, cerebellar degeneration, ataxia, opsoclonus, sensoric neuropathy and achalasia, blood diseases such as autoimmune hemolytic anemia, idiopathic thrombocytopenic purpura (Morbus Werlhof), infectious diseases with associated autoimmune reactions such as AIDS, malaria and Chagas disease.

One or more additional pharmaceutical agents or treatment methods such as, for example, anti-viral agents, chemotherapeutics or other anticancer agents, immune enhancers, immunosuppressants, radiation, anti-tumor and anti-viral vaccines, cytokine therapy (e.g., IL2 and GM-CSF), and/or tyrosine kinase inhibitors can be optionally used in combination with the compounds of the present invention for treatment of IDO-associated diseases, disorders or conditions. The agents can be combined with the present compounds in a single dosage form, or the agents can be administered simultaneously or sequentially as separate dosage forms.

Suitable chemotherapeutic or other anticancer agents include, for example, alkylating agents (including, without limitation, nitrogen mustards, ethylenimine derivatives, alkyl sulfonates, nitrosoureas and triazenes) such as uracil mustard, chlormethine, cyclophosphamide (CYTOXAN®), ifosfamide, melphalan, chlorambucil, pipobroman, triethylene-melamine, triethylenethiophosphoramine, busulfan, carmustine, lomustine, streptozocin, dacarbazine, and temozolomide.

In the treatment of melanoma, suitable agents for use in combination with the compounds of the present invention include: dacarbazine (DTIC), optionally, along with other chemotherapy drugs such as carmustine (BCNU) and cisplatin; the "Dartmouth regimen", which consists of DTIC, BCNU, cisplatin and tamoxifen; a combination of cisplatin, vinblastine, and DTIC, temozolomide or YERVOY®. Compounds according to the invention may also be combined with immunotherapy drugs, including cytokines such as interferon alpha, interleukin 2, and tumor necrosis factor (TNF) in the treatment of melanoma.

Compounds of the invention may also be used in combination with vaccine therapy in the treatment of melanoma. Anti-melanoma vaccines are, in some ways, similar to the anti-virus vaccines which are used to prevent diseases caused by viruses such as polio, measles, and mumps. Weakened melanoma cells or parts of melanoma cells called antigens may be injected into a patient to stimulate the body's immune system to destroy melanoma cells.

Melanomas that are confined to the arms or legs may also be treated with a combination of agents including one or more compounds of the invention, using a hyperthermic isolated limb perfusion technique. This treatment protocol temporarily separates the circulation of the involved limb from the rest of the body and injects high doses of chemotherapy into the artery feeding the limb, thus providing high doses to the area of the tumor without exposing internal organs to these doses that might otherwise cause severe side effects. Usually the fluid is warmed to 102° to 104° F. Melphalan is the drug most often used in this chemotherapy procedure. This can be given with another agent called tumor necrosis factor (TNF).

Suitable chemotherapeutic or other anticancer agents include, for example, antimetabolites (including, without limitation, folic acid antagonists, pyrimidine analogs, purine analogs and adenosine deaminase inhibitors) such as methotrexate, 5-fluorouracil, floxuridine, cytarabine, 6-mercaptopurine, 6-thioguanine, fludarabine phosphate, pentostatine, and gemcitabine.

Suitable chemotherapeutic or other anticancer agents further include, for example, certain natural products and their derivatives (for example, vinca alkaloids, antitumor antibiotics, enzymes, lymphokines and epipodophyllotoxins) such as vinblastine, vincristine, vindesine, bleomycin, dactinomycin, daunorubicin, doxorubicin, epirubicin, idarubicin, ara-C, paclitaxel (Taxol), mithramycin, deoxycoformycin, mitomycin-C, L-asparaginase, interferons (especially IFN-α), etoposide, and teniposide.

Other cytotoxic agents include navelbene, CPT-11, anastrazole, letrazole, capecitabine, reloxafine, and droloxafine.

Also suitable are cytotoxic agents such as epidophyllotoxin; an antineoplastic enzyme; a topoisomerase inhibitor; procarbazine; mitoxantrone; platinum coordination complexes such as cisplatin and carboplatin; biological response modifiers; growth inhibitors; antihormonal therapeutic agents; leucovorin; tegafur; and haematopoietic growth factors.

Other anticancer agent(s) include antibody therapeutics such as trastuzumab (HERCEPTIN®), antibodies to costimulatory molecules such as CTLA-4, 4-1BB and PD-1, or antibodies to cytokines (IL-1O or TGF-β).

Other anticancer agents also include those that block immune cell migration such as antagonists to chemokine receptors, including CCR2 and CCR4.

Other anticancer agents also include those that augment the immune system such as adjuvants or adoptive T cell transfer.

Anticancer vaccines include dendritic cells, synthetic peptides, DNA vaccines and recombinant viruses.

The pharmaceutical compositions of the disclosure may optionally include at least one signal transduction inhibitor (STI). A "signal transduction inhibitor" is an agent that selectively inhibits one or more vital steps in signaling pathways, in the normal function of cancer cells, thereby leading to apoptosis. Suitable STIs include, but are not limited to: (i) bcr/abl kinase inhibitors such as, for example, STI 571 (GLEEVEC®); (ii) epidermal growth factor (EGF) receptor inhibitors such as, for example, kinase inhibitors (IRESSA®, SSI-774) and antibodies (Imclone: C225 [Goldstein et al., *Clin. Cancer Res.*, 1:1311-1318 (1995)], and Abgenix: ABX-EGF); (iii) her-2/neu receptor inhibitors such as farnesyl transferase inhibitors (FTI) such as, for example, L-744,832 (Kohl et al., *Nat. Med.*, 1(8):792-797 (1995)); (iv) inhibitors of Akt family kinases or the Akt pathway, such as, for example, rapamycin (see, for example, Sekulic et al., *Cancer Res.*, 60:3504-3513 (2000)); (v) cell cycle kinase inhibitors such as, for example, flavopiridol and UCN-01 (see, for example, Sausville, *Curr. Med. Chem. Anti-Canc. Agents*, 3:47-56 (2003)); and (vi) phosphatidyl inositol kinase inhibitors such as, for example, LY294002 (see, for example, Vlahos et al., *J. Biol. Chem.*, 269:5241-5248 (1994)). Alternatively, at least one STI and at least one IDO inhibitor may be in separate pharmaceutical compositions. In a specific embodiment of the present invention, at least one IDO inhibitor (such as Compound 1 or a solid form thereof, or a solid form of a hydrate or salt thereof) and at least one STI may be administered to the patient concurrently or sequentially. In other words, at least one IDO inhibitor may be administered first, at least one STI may be administered first, or at least one IDO inhibitor and at least one STI may be administered at the same time. Additionally, when more than one IDO inhibitor and/or STI is used, the compounds may be administered in any order.

The present invention further provides a pharmaceutical composition for the treatment of a chronic viral infection in a patient comprising at least one IDO inhibitor (such as Compound 1 or a solid form of a hydrate or salt thereof), optionally, at least one chemotherapeutic drug, and, optionally, at least one antiviral agent, in a pharmaceutically acceptable carrier. The pharmaceutical compositions may include at least one IDO inhibitor of the instant invention in addition to at least one established (known) IDO inhibitor. In a specific embodiment, at least one of the IDO inhibitors of the pharmaceutical composition is Compound 1, or a solid form thereof or a solid form of a hydrate or salt thereof).

Also provided is a method for treating a chronic viral infection in a patient by administering an effective amount of the above pharmaceutical composition.

In a specific embodiment of the present invention, at least one IDO inhibitor and at least one chemotherapeutic agent may be administered to the patient concurrently or sequentially. In other words, at least one IDO inhibitor may be administered first, at least one chemotherapeutic agent may be administered first, or at least one IDO inhibitor and the at least one STI may be administered at the same time. Additionally, when more than one IDO inhibitor and/or chemotherapeutic agent is used, the compounds may be administered in any order. Similarly, any antiviral agent or STI may also be administered at any point in comparison to the administration of an IDO inhibitor.

Chronic viral infections that may be treated using the present combinatorial treatment include, but are not limited to, diseases caused by: hepatitis C virus (HCV), human papilloma virus (HPV), cytomegalovirus (CMV), herpes simplex virus (HSV), Epstein-Barr virus (EBV), varicella zoster virus, Coxsackie virus, human immunodeficiency virus (HIV). Notably, parasitic infections (e.g., malaria) may also be treated by the above methods wherein compounds known to treat the parasitic conditions are optionally added in place of the antiviral agents.

In yet another embodiment, the pharmaceutical compositions comprising at least one IDO inhibitor of the instant disclosure may be administered to a patient to prevent arterial restenosis, such as after balloon endoscopy or stent placement. In a particular embodiment, the pharmaceutical composition further comprises at least one taxane (e.g., paclitaxel (Taxol); see, e.g., Scheller et al., *Circulation*, 110:810-814 (2004)).

Suitable antiviral agents contemplated for use in combination with the solid forms of the present invention can comprise nucleoside and nucleotide reverse transcriptase inhibitors (NRTIs), non-nucleoside reverse transcriptase inhibitors (NNRTIs), protease inhibitors and other antiviral drugs.

Examples of suitable NRTIs include zidovudine (AZT); didanosine (ddI); zalcitabine (ddC); stavudine (d4T); lamivudine (3TC); abacavir (1592U89); adefovir dipivoxil [bis(POM)-PMEA]; lobucavir (BMS-180194); BCH-10652; emtricitabine [(−)-FTC]; beta-L-FD4 (also called beta-L-D4C and named beta-L-2',3'-dicleoxy-5-fluoro-cytidene); DAPD, ((−)-beta-D-2,6-diamino-purine dioxolane); and lodenosine (FddA). Typical suitable NNRTIs include nevirapine (BI-RG-587); delaviradine (BHAP, U-90152); efavirenz (DMP-266); PNU-142721; AG-1549; MKC-442 (1-(ethoxy-methyl)-5-(1-methylethyl)-6-(phenylmethyl)-(2,4 (1H,3H)-pyrimidinedione); and (+)-calanolide A (NSC-675451) and B. Typical suitable protease inhibitors include saquinavir (Ro 31-8959); ritonavir (ABT-538); indinavir (MK-639); nelfinavir (AG-1343); amprenavir (141W94); lasinavir (BMS-234475); DMP-450; BMS-232623; ABT-378; and AG-1549. Other antiviral agents include hydroxyurea, ribavirin, IL-2, IL-12, pentafuside and Yissum Project No. 11607.

Combination with an Immuno-Oncology Agent

Further provided herein are methods of treatment wherein a solid form of Compound 1, or a solid form of a hydrate or salt of Compound 1, is administered with one or more immuno-oncology agents. The immuno-oncology agents used herein, also known as cancer immunotherapies, are effective to enhance, stimulate, and/or upregulate immune responses in a subject.

In one aspect, the solid form of Compound 1, or the solid form of the hydrate or salt of Compound 1, is sequentially administered prior to administration of the immuno-oncology agent. In another aspect, the solid form of Compound 1, or the solid form of the hydrate or salt of Compound 1, is administered concurrently with the immunology-oncology agent. In yet another aspect, the Compound 1, or the solid form of the hydrate or salt of Compound 1, is sequentially administered after administration of the immuno-oncology agent.

In another aspect, the solid form of Compound 1, or the solid form of the hydrate or salt of Compound 1, may be co-formulated with an immuno-oncology agent.

Immuno-oncology agents include, for example, a small molecule drug, antibody, or other biologic or small molecule. Examples of biologic immuno-oncology agents include, but are not limited to, cancer vaccines, antibodies, and cytokines. In one aspect, the antibody is a monoclonal antibody. In another aspect, the monoclonal antibody is humanized or human.

In one aspect, the immuno-oncology agent is (i) an agonist of a stimulatory (including a co-stimulatory) receptor or (ii) an antagonist of an inhibitory (including a co-inhibitory) signal on T cells, both of which result in amplifying antigen-specific T cell responses (often referred to as immune checkpoint regulators).

Certain of the stimulatory and inhibitory molecules are members of the immunoglobulin super family (IgSF). One important family of membrane-bound ligands that bind to co-stimulatory or co-inhibitory receptors is the B7 family, which includes B7-1, B7-2, B7-H1 (PD-L1), B7-DC (PD-L2), B7-H2 (ICOS-L), B7-H3, B7-H4, B7-H5 (VISTA), and B7-H6. Another family of membrane bound ligands that bind to co-stimulatory or co-inhibitory receptors is the TNF family of molecules that bind to cognate TNF receptor family members, which includes CD40 and CD40L, OX-40, OX-40L, CD70, CD27L, CD30, CD30L, 4-1BBL, CD137 (4-1BB), TRAIL/Apo2-L, TRAILR1/DR4, TRAILR2/DR5, TRAILR3, TRAILR4, OPG, RANK, RANKL, TWEAKR/Fn14, TWEAK, BAFFR, EDAR, XEDAR, TACI, APRIL, BCMA, LTβR, LIGHT, DcR3, HVEM, VEGI/TL1A, TRAMP/DR3, EDAR, EDA1, XEDAR, EDA2, TNFR1, Lymphotoxin α/TNFβ, TNFR2, TNFα, LTβR, Lymphotoxin α 1β2, FAS, FASL, RELT, DR6, TROY, NGFR.

In another aspect, the immuno-oncology agent is a cytokine that inhibits T cell activation (e.g., IL-6, IL-10, TGF-ß, VEGF, and other immunosuppressive cytokines) or a cytokine that stimulates T cell activation, for stimulating an immune response.

In one aspect, T cell responses can be stimulated by a combination of the solid form of Compound 1, or the solid form of the hydrate or salt of Compound 1, and one or more of (i) an antagonist of a protein that inhibits T cell activation (e.g., immune checkpoint inhibitors) such as CTLA-4, PD-1, PD-L1, PD-L2, LAG-3, TIM-3, Galectin 9, CEACAM-1, BTLA, CD69, Galectin-1, TIGIT, CD113, GPR56, VISTA, 2B4, CD48, GARP, PD1H, LAIRI, TIM-1, and TIM-4, and (ii) an agonist of a protein that stimulates T cell activation such as B7-1, B7-2, CD28, 4-1BB (CD137), 4-1BBL, ICOS, ICOS-L, OX40, OX40L, GITR, GITRL, CD70, CD27, CD40, DR3 and CD28H.

Other agents that can be combined with the solid form of Compound 1, or the solid form of the hydrate, solvate and/or salt of Compound 1, for the treatment of cancer include antagonists of inhibitory receptors on NK cells or agonists of activating receptors on NK cells. For example, the solid form of Compound 1, or the solid form of the hydrate or salt of Compound 1, can be combined with antagonists of KIR, such as lirilumab.

Yet other agents for combination therapies include agents that inhibit or deplete macrophages or monocytes, including but not limited to CSF-1R antagonists such as CSF-1R antagonist antibodies including RG7155 (WO 11/70024, WO 11/107553, WO 11/131407, WO 13/87699, WO 13/119716, WO 13/132044) or FPA-008 (WO 11/140249, WO 13/169264, WO 14/036357).

In another aspect, the solid form of Compound 1, or the solid form of the hydrate, solvate cocrystal and/or salt of Compound 1, can be used with one or more of agonistic agents that ligate positive costimulatory receptors, blocking agents that attenuate signaling through inhibitory receptors, antagonists, and one or more agents that increase systemically the frequency of anti-tumor T cells, agents that overcome distinct immune suppressive pathways within the tumor microenvironment (e.g., block inhibitory receptor engagement (e.g., PD-L1/PD-1 interactions), deplete or inhibit Tregs (e.g., using an anti-CD25 monoclonal antibody (e.g., daclizumab) or by ex vivo anti-CD25 bead depletion), inhibit metabolic enzymes such as IDO, or reverse/prevent T cell anergy or exhaustion) and agents that trigger innate immune activation and/or inflammation at tumor sites.

In one aspect, the immuno-oncology agent is a CTLA-4 antagonist, such as an antagonistic CTLA-4 antibody. Suitable CTLA-4 antibodies include, for example, YERVOY® (ipilimumab) or tremelimumab.

In another aspect, the immuno-oncology agent is a PD-1 antagonist, such as an antagonistic PD-1 antibody. Suitable PD-1 antibodies include, for example, OPDIVO® (nivolumab), KEYTRUDA® (pembrolizumab), or MEDI-0680 (AMP-514; WO 2012/145493). The immuno-oncology agent may also include pidilizumab (CT-011), though its specificity for PD-1 binding has been questioned. Another approach to target the PD-1 receptor is the recombinant protein composed of the extracellular domain of PD-L2 (B7-DC) fused to the Fc portion of IgG1, called AMP-224

In another aspect, the immuno-oncology agent is a PD-L1 antagonist, such as an antagonistic PD-L1 antibody. Suitable PD-L1 antibodies include, for example, MPDL3280A (RG7446; WO 2010/077634), durvalumab (MEDI4736), BMS-936559 (WO 2007/005874), and MSB0010718C (WO 2013/79174).

In another aspect, the immuno-oncology agent is a LAG-3 antagonist, such as an antagonistic LAG-3 antibody. Suitable LAG3 antibodies include, for example, BMS-986016 (WO 10/19570, WO 14/08218), or IMP-731 or IMP-321 (WO 08/132601, WO 09/44273).

In another aspect, the immuno-oncology agent is a CD137 (4-1BB) agonist, such as an agonistic CD137 antibody. Suitable CD137 antibodies include, for example, urelumab and PF-05082566 (WO 12/32433).

In another aspect, the immuno-oncology agent is a GITR agonist, such as an agonistic GITR antibody. Suitable GITR antibodies include, for example, BMS-986153, BMS-986156, TRX-518 (WO 06/105021, WO 09/009116) and MK-4166 (WO 11/028683).

In another aspect, the immuno-oncology agent is an IDO antagonist. Suitable IDO antagonists include, for example, INCB-024360 (WO 2006/122150, WO 07/75598, WO 08/36653, WO 08/36642), indoximod, or NLG-919 (WO 09/73620, WO 09/1156652, WO 11/56652, WO 12/142237).

In another aspect, the immuno-oncology agent is an OX40 agonist, such as an agonistic OX40 antibody. Suitable OX40 antibodies include, for example, MEDI-6383 or MEDI-6469.

In another aspect, the immuno-oncology agent is an OX40L antagonist, such as an antagonistic OX40 antibody. Suitable OX40L antagonists include, for example, RG-7888 (WO 06/029879).

In another aspect, the immuno-oncology agent is a CD40 agonist, such as an agonistic CD40 antibody. In yet another embodiment, the immuno-oncology agent is a CD40 antagonist, such as an antagonistic CD40 antibody. Suitable CD40 antibodies include, for example, lucatumumab or dacetuzumab.

In another aspect, the immuno-oncology agent is a CD27 agonist, such as an agonistic CD27 antibody. Suitable CD27 antibodies include, for example, varlilumab.

In another aspect, the immuno-oncology agent is MGA271 (to B7H3) (WO 11/109400).

The present invention also includes pharmaceutical kits useful, for example, in the treatment or prevention of IDO-associated diseases or disorders, obesity, diabetes and other diseases referred to herein which include one or more containers containing a pharmaceutical composition comprising a therapeutically effective amount of a compound of the invention. Such kits can further include, if desired, one or more of various conventional pharmaceutical kit components, such as, for example, containers with one or more pharmaceutically acceptable carriers, additional containers, as will be readily apparent to those skilled in the art. Instructions, either as inserts or as labels, indicating quantities of the components to be administered, guidelines for administration, and/or guidelines for mixing the components, can also be included in the kit.

The combination therapy is intended to embrace administration of these therapeutic agents in a sequential manner, that is, wherein each therapeutic agent is administered at a different time, as well as administration of these therapeutic agents, or at least two of the therapeutic agents, in a substantially simultaneous manner. Substantially simultaneous administration can be accomplished, for example, by administering to the subject a single dosage form having a fixed ratio of each therapeutic agent or in multiple, single dosage forms for each of the therapeutic agents. Sequential or substantially simultaneous administration of each therapeutic agent can be effected by any appropriate route including, but not limited to, oral routes, intravenous routes, intramuscular routes, and direct absorption through mucous membrane tissues. The therapeutic agents can be administered by the same route or by different routes. For example, a first therapeutic agent of the combination selected may be administered by intravenous injection while the other therapeutic agents of the combination may be administered orally. Alternatively, for example, all therapeutic agents may be administered orally or all therapeutic agents may be administered by intravenous injection. Combination therapy also can embrace the administration of the therapeutic agents as described above in further combination with other biologically active ingredients and non-drug therapies (e.g., surgery or radiation treatment). Where the combination therapy further comprises a non-drug treatment, the non-drug treatment may be conducted at any suitable time so long as a beneficial effect from the co-action of the combination of the therapeutic agents and non-drug treatment is achieved. For example, in appropriate cases, the beneficial effect is still achieved when the non-drug treatment is temporally removed from the administration of the therapeutic agents, perhaps by days or even weeks.

Pharmaceutical Compositions and Dosing

The disclosure also provides pharmaceutically acceptable compositions which comprise a therapeutically effective amount of one or more of the solid forms described herein, formulated together with one or more pharmaceutically acceptable carriers (additives) and/or diluents, and optionally, one or more additional therapeutic agents.

The solid forms of the disclosure can be administered for any of the uses described herein by any suitable means, for example, orally, such as tablets, capsules (each of which includes sustained release or timed release formulations), pills, powders, granules, elixirs, tinctures, suspensions (including nanosuspensions, microsuspensions, spray-dried dispersions), syrups, and emulsions; sublingually; buccally; parenterally, such as by subcutaneous, intravenous, intramuscular, or intrasternal injection, or infusion techniques (e.g., as sterile injectable aqueous or non-aqueous solutions or suspensions); nasally, including administration to the nasal membranes, such as by inhalation spray; topically, such as in the form of a cream or ointment; or rectally such as in the form of suppositories. They can be administered alone, but generally will be administered with a pharmaceutical carrier selected on the basis of the chosen route of administration and standard pharmaceutical practice.

The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The phrase "pharmaceutically acceptable carrier" as used herein means a pharmaceutically acceptable material, composition or vehicle, such as a liquid or solid filler, diluent, excipient, manufacturing aid (e.g., lubricant, talc magnesium, calcium or zinc stearate, or steric acid), or solvent encapsulating material, involved in carrying or transporting the subject compound from one organ, or portion of the body, to another organ, or portion of the body. Each carrier must be "acceptable" in the sense of being compatible with the other ingredients of the formulation and not injurious to the patient.

The term "pharmaceutical composition" means a composition comprising a compound of the invention in combination with at least one additional pharmaceutically acceptable carrier. A "pharmaceutically acceptable carrier" refers to media generally accepted in the art for the delivery of biologically active agents to animals, in particular, mammals, including, i.e., adjuvant, excipient or vehicle, such as diluents, preserving agents, fillers, flow regulating agents, disintegrating agents, wetting agents, emulsifying agents, suspending agents, sweetening agents, flavoring agents, perfuming agents, antibacterial agents, antifungal agents, lubricating agents and dispensing agents, depending on the nature of the mode of administration and dosage forms.

Pharmaceutically acceptable carriers are formulated according to a number of factors well within the purview of those of ordinary skill in the art. These include, without limitation: the type and nature of the active agent being formulated; the subject to which the agent-containing composition is to be administered; the intended route of administration of the composition; and the therapeutic indication being targeted. Pharmaceutically acceptable carriers include both aqueous and non-aqueous liquid media, as well as a variety of solid and semi-solid dosage forms. Such carriers can include a number of different ingredients and additives in addition to the active agent, such additional ingredients being included in the formulation for a variety of reasons, e.g., stabilization of the active agent, binders, etc., well known to those of ordinary skill in the art. Descriptions of suitable pharmaceutically acceptable carriers, and factors involved in their selection, are found in a variety of readily available sources such as, for example, Allen, Jr., L. V. et al., *Remington: The Science and Practice of Pharmacy* (2 Volumes), 22nd Edition, Pharmaceutical Press (2012).

The dosage regimen for solid forms of the present disclosure will, of course, vary depending upon known factors, such as the pharmacodynamic characteristics of the particular agent and its mode and route of administration; the species, age, sex, health, medical condition, and weight of the recipient; the nature and extent of the symptoms; the kind of concurrent treatment; the frequency of treatment; the route of administration, the renal and hepatic function of the patient, and the effect desired.

By way of general guidance, the daily oral dosage of each active ingredient, when used for the indicated effects, will range between about 0.001 to about 5000 mg per day, preferably between about 0.01 to about 1000 mg per day, and most preferably between about 0.1 to about 250 mg per day. Intravenously, the most preferred doses will range from about 0.01 to about 10 mg/kg/minute during a constant rate infusion. Compounds of this invention may be administered in a single daily dose, or the total daily dosage may be administered in divided doses of two, three, or four times daily.

The solid forms of the disclosure are typically administered in admixture with suitable pharmaceutical diluents, excipients, or carriers (collectively referred to herein as pharmaceutical carriers) suitably selected with respect to the intended form of administration, e.g., oral tablets, capsules, elixirs, and syrups, and consistent with conventional pharmaceutical practices.

Dosage forms (pharmaceutical compositions) suitable for administration may contain from about 1 mg to about 2000 mg of active ingredient per dosage unit. In these pharmaceutical compositions the active ingredient will ordinarily be present in an amount of about 0.1-95% by weight based on the total weight of the composition.

A typical capsule for oral administration contains at least one of the compounds of the present invention (250 mg), lactose (75 mg), and magnesium stearate (15 mg). The mixture is passed through a 60 mesh sieve and packed into a No. 1 gelatin capsule.

A typical injectable preparation is produced by aseptically placing at least one of the compounds of the present invention (250 mg) into a vial, aseptically freeze-drying and sealing. For use, the contents of the vial are mixed with 2 mL of physiological saline, to produce an injectable preparation.

The present invention includes within its scope pharmaceutical compositions comprising, as an active ingredient, a therapeutically effective amount of at least one of the compounds of the present invention, alone or in combination with a pharmaceutical carrier. Optionally, solid forms of the present disclosure can be used alone, in combination with other compounds of the invention, or in combination with one or more other therapeutic agent(s), e.g., an anticancer agent or other pharmaceutically active material.

Regardless of the route of administration selected, the solid forms of the present disclosure, are formulated into pharmaceutically acceptable dosage forms by conventional methods known to those of skill in the art.

Actual dosage levels of the active ingredients in the pharmaceutical compositions of this disclosure may be varied so as to obtain an amount of the active ingredient which is effective to achieve the desired therapeutic response for a particular patient, composition, and mode of administration, without being toxic to the patient.

The selected dosage level will depend upon a variety of factors including the activity of the compound of the present disclosure employed, the route of administration, the time of administration, the rate of excretion or metabolism of the compound, the rate and extent of absorption, the duration of the treatment, other drugs, compounds and/or materials used in combination with the compound, the age, sex, weight, condition, general health and prior medical history of the patient being treated, and like factors well known in the medical arts.

A physician or veterinarian having ordinary skill in the art can readily determine and prescribe the effective amount of the pharmaceutical composition required. For example, the physician or veterinarian could start doses of the compounds of the invention employed in the pharmaceutical composition at levels lower than that required in order to achieve the desired therapeutic effect and gradually increase the dosage until the desired effect is achieved.

In general, a suitable daily dose of compound will be that amount of compound which is the lowest dose effective to produce a therapeutic effect. Such an effective dose will generally depend upon the factors described above.

If desired, the effective daily dose of the compound may be administered as two, three, four, five, six or more sub-doses administered separately at appropriate intervals throughout the day, optionally, in unit dosage forms. In certain aspects of the invention, dosing is one administration per day.

While it is possible for a compound of the present disclosure to be administered alone, it is preferable to administer the compound as a pharmaceutical formulation (composition).

Definitions

Some aspects of the disclosure are directed to crystalline forms. Crystalline forms produce an X-ray diffraction pattern with sharp maxima.

As used herein "amorphous" refers to a solid form of a molecule, and/or ions that is not crystalline. An amorphous solid does not display an X-ray diffraction pattern with sharp maxima.

As used herein, "hydrate" refers to a crystalline form of a molecule that further comprises water incorporated into the crystalline structure. The water molecules in the hydrate may be present in a regular arrangement and/or a non-ordered arrangement. The hydrate may comprise either a stoichiometric or nonstoichiometric amount of the water molecules.

The term "solvate" refers to a crystalline form of a molecule that further comprises solvent molecule/s incorporated into the crystalline structure. The solvent molecules in the solvate may be present in a regular arrangement and/or a non-ordered arrangement. The solvate may comprise either a stoichiometric or nonstoichiometric amount of the solvent molecules. Exemplary solvates include, but are not limited to, hydrates, ethanolates, methanolates, and isopropanolates, acetic acid. Methods of solvation are generally known in the art. It is noteworthy that in solvates the species that is bound to the main molecule (e.g., the active pharmaceutical ingredient) is liquid at room temperature, whereas in cocrystals that species is solid at room temperature.

As used herein, "pharmaceutically acceptable salts and cocrystals" refer to derivatives of the disclosed compounds wherein the parent compound is modified by making acid or base salts and cocrystals thereof. Examples of pharmaceutically acceptable salts and cocrystals include, but are not limited to, mineral or organic acid salts of basic groups such as amines; and alkali or organic salts of acidic groups such as carboxylic acids. The pharmaceutically acceptable salts and cocrystal formers include the conventional non-toxic salts or the quaternary ammonium salts of the parent compound formed, for example, from non-toxic inorganic or organic acids. For example, such conventional non-toxic salts include those derived from inorganic acids such as hydrochloric, hydrobromic, sulfuric, sulfamic, phosphoric, and nitric; and the salts and/or cocrystals prepared from organic acids such as acetic, propionic, succinic, glycolic, stearic, lactic, malic, tartaric, citric, ascorbic, pamoic, maleic, hydroxymaleic, phenylacetic, glutamic, benzoic, salicylic, sulfanilic, 2-acetoxybenzoic, fumaric, toluenesulfonic, methanesulfonic, ethane disulfonic, oxalic, and isethionic, and the like. Salts involve a complete proton transfer from an acid to a base and the main components are individual ions, while in cocrystals the proton transfer is absent and the components are non-ionized. See, e.g., G. Patrick Stahly, Crystal Growth & Design 2007 7 (6), 1007-1026. Therefore, as used herein, "salts and/or cocrystals" or "salts/cocrystals" or "salt/cocrystal" refers to the presence and/or absence, respectively, of proton transfer in the manner described above, where the relevant molecule can be present as ions and/or as neutral molecules.

Also included within the scope of the disclosure are cocrystals of the compounds of the disclosure, for example, cocrystals including (R)—N-(4-chlorophenyl)-2-((1S,4S)-4-(6-fluoroquinolin-4-yl)cyclohexyl)propanamide. Exemplary co-crystal formers include amino acids, for example, cocrystals prepared with proline, glycine, alanine, histidine, arginine, lysine, and the like. Other exemplary co-crystal formers include sugars, for example, monosaccharides such as glucose and fructose. Other co-crystal formers include sugar alcohols such as, for example, mannitol and sorbitol. Amides are other suitable co-crystal formers and include, for example, urea, nicotinamide, and isonicotinamide. Amines are also suitable co-crystal formers and include, for example, imidazole and N-meglumine.

The pharmaceutically acceptable salts and cocrystals of the present invention can be synthesized from the parent compound that may contains a basic or acidic moiety by conventional chemical methods. Generally, such salts and cocrystals can be prepared by reacting the free acid or base forms of these compounds with a stoichiometric amount of the appropriate base or acid or co-crystal former in water or in an organic solvent, or in a mixture of the two; generally, nonaqueous media like ether, ethyl acetate, ethanol, isopropanol, or acetonitrile are preferred. See, e.g., Allen, Jr., L. V., ed., *Remington: The Science and Practice of Pharmacy*, 22nd Edition, Pharmaceutical Press, London, UK (2012). The disclosure of which is hereby incorporated by reference.

As used herein, the term "patient" refers to organisms to be treated by the methods of the present invention. Such organisms preferably include, but are not limited to, mammals (e.g., murines, simians, equines, bovines, porcines, canines, felines, and the like), and most preferably refers to humans.

As used herein, the term "effective amount" means that amount of a drug or pharmaceutical agent, i.e., a compound of the invention, that will elicit the biological or medical response of a tissue, system, animal or human that is being sought, for instance, by a researcher or clinician. Furthermore, the term "therapeutically effective amount" means any amount which, as compared to a corresponding subject who has not received such amount, results in improved treatment, healing, prevention, or amelioration of a disease, disorder, or side effect, or a decrease in the rate of advancement of a disease or disorder. An effective amount can be administered in one or more administrations, applications or dosages and is not intended to be limited to a particular formulation or administration route. The term also includes within its scope amounts effective to enhance normal physiological function.

As used herein, "treating" or "treatment" cover the treatment of a disease-state in a mammal, particularly in a human, and include: (a) preventing the disease-state from occurring in a mammal, in particular, when such mammal is predisposed to the disease-state but has not yet been diagnosed as having it; (b) inhibiting the disease-state, i.e., arresting it development; and/or (c) relieving the disease-state, i.e., causing regression of the disease state.

EXAMPLES

The following Examples are put forth so as to provide those of ordinary skill in the art with a complete disclosure and description of how to make and use the present invention, and are not intended to limit the scope of what the inventors regard as their invention, nor are they intended to represent that the experiments below were performed or that they are all of the experiments that may be performed. It is to be understood that exemplary descriptions written in the present tense were not necessarily performed, but rather that the descriptions can be performed to generate data and the like of a nature described therein. Efforts have been made to ensure accuracy with respect to numbers used (e.g., amounts, temperature, etc.), but some experimental errors and deviations should be accounted for.

Example 1—Compound 1 Hydrochloride Salt Monohydrate (Form A)

Single crystal X-ray data were collected using a Bruker X8 Prospector Ultra diffractometer equipped with an APEX II CCD detector and IµS microfocus X-ray source of monochromatic Cu Kα radiation. The single crystals were at room temperature during data collection. Indexing and processing of the measured intensity data were carried out with the APEX2 program suite (Bruker AXS, Inc., 5465 East Cheryl Parkway, Madison, WI 53711 USA).

The final unit cell parameters were determined using the full data set. The structures were solved by direct methods and refined by full-matrix least-squares approach using the SHELXTL software package (G. M. Sheldrick, SHELXTL v6.14, Bruker AXS, Madison, WI USA.). Structure refinements involved minimization of the function defined by $\Sigma w(|Fo|-|Fc|)2$, where w is an appropriate weighting factor based on errors in the observed intensities, Fo is the structure factor based on measured reflections, and Fc is the structure factor based on calculated reflections. Agreement between the refined crystal structure model and the experimental X-ray diffraction data is assessed by using the residual factors $R=\Sigma||Fo|-|Fc||/\Sigma|Fo|$ and $wR=[\Sigma w(|Fo|-|Fc|)2/\Sigma w|Fo|]\frac{1}{2}$. Difference Fourier maps were examined at all stages of refinement. All non-hydrogen atoms were refined with anisotropic thermal displacement parameters. Hydrogen atoms were introduced using idealized geometry with isotropic temperature factors and included in structure factor calculations with fixed parameters. Table 1A, supra, provides the single crystal X-Ray data for Form A.

PXRD data for Form A were obtained using a Bruker C2 GADDS. The radiation was Cu Kα (40 KV, 40 mA). The sample-detector distance was 15 cm. Samples were placed in sealed glass capillaries with diameters of ≤1 mm. The capillary was rotated during data collection. Data were collected for approximately $2\leq 2\theta \leq 32°$ with a sample exposure time of at least 1000 seconds. The resulting two dimensional diffraction arcs were integrated to create a traditional 1-dimensional PXRD pattern with a step size of 0.05 degrees 2θ in the approximate range of 2 to 32 degrees 2θ.

Differential scanning calorimetry (DSC) measurements were performed using a TA Instrument—model Q2000 or Q1000. The sample (about 1-10 mg) was weighed in an aluminum pan and the weight recorded accurately to a hundredth of a milligram before transferring the sample to the DSC. The instrument was purged with nitrogen gas at 50 mL/min. Data were collected between room temperature and 300° C. at a heating rate of 10° C./min. DSC plots were generated such that the endothermic peaks pointed down.

Thermal gravimetric analysis (TGA) measurements were performed using a TA Instrument—model Q5000 or Q500. The sample (about 10-30 mg) was placed in a previously tarred platinum pan. The weight of the sample was measured accurately and recorded to a thousandth of a milligram by the instrument. The furnace was purged with nitrogen gas at 100 mL/min. Data were collected between room temperature and 300° C. at a heating rate of 10° C./min.

Example 2—Anhydrous Compound 1 Hydrochloride Salt (Form B)

PXRD data were obtained using a Bruker C2 GADDS. The radiation was Cu Ku (40 KV, 40 mA). The sample-detector distance was 15 cm. Samples were placed in sealed glass capillaries with diameters of ≤1 mm. The capillary was rotated during data collection. Data were collected for approximately $2\leq 2\theta \leq 32°$ with a sample exposure time of at least 1000 seconds. The resulting two dimensional diffraction arcs were integrated to create a traditional 1-dimensional PXRD pattern with a step size of 0.05 degrees 2θ in the approximate range of 2 to 32 degrees 2θ.

Single crystal X-ray data were collected using a Bruker Kappa diffractometer equipped with an APEX II CCD detector and sealed tube X-ray generator of monochromatic Mo Ku radiation.

Indexing and processing of the measured intensity data were carried out with the APEX2 program suite (Bruker AXS, Inc., 5465 East Cheryl Parkway, Madison, WI 53711 USA).

The final unit cell parameters were determined using the full data set. The structures were solved by direct methods and refined by full-matrix least-squares approach using the SHELXTL software package (G. M. Sheldrick, SHELXTL v6.14, Bruker AXS, Madison, WI USA.). Structure refinements involved minimization of the function defined by $\Sigma w(|Fo|-|Fc|)2$, where w is an appropriate weighting factor based on errors in the observed intensities, Fo is the structure factor based on measured reflections, and Fc is the structure factor based on calculated reflections. Agreement between the refined crystal structure model and the experimental X-ray diffraction data is assessed by using the residual factors $R=\Sigma||Fo|-|Fc||/\Sigma|Fo|$ and $wR=[\Sigma w(|Fo|-|Fc|)2/\Sigma w|Fo|]\frac{1}{2}$. Difference Fourier maps were examined at all stages of refinement. All non-hydrogen atoms were refined with anisotropic thermal displacement parameters. Hydrogen atoms were introduced using idealized geometry with isotropic temperature factors and included in structure factor calculations with fixed parameters.

Procedure for obtaining Form B. The freebase was dissolved in 10 L/kg IPA at room temperature. 1.05 equivalents of 6N aqueous HCl were added. The API remained in solution. The solution was then seeded with ~1 wt % HCl Form A, which induces precipitation. The slurry was not overly thick, and gelling was not observed. Additional water was added (3 L/kg) over ~10 min to ensure complete desaturation. The slurry was then aged overnight, isolated on a Buchner funnel, washed 3× with 3 L/kg IPA, and dried on the funnel at ambient temperature. (This process was scaled up to the 10 g scale by CD.) For characterization purposes, HCl Form B was generated by drying HCl Form A at 50° C. overnight and maintaining RH<150%.

Example 3—Crystalline Compound 1 Esylate Salt (Form C)

PXRD data were obtained using a Bruker C2 GADDS. The radiation was Cu Ku (40 KV, 40 mA). The sample-detector distance was 15 cm. Samples were placed in sealed glass capillaries with diameters of ≤1 mm. The capillary was rotated during data collection. Data were collected for approximately $2\leq 2\theta \leq 32°$ with a sample exposure time of at least 1000 seconds. The resulting two dimensional diffraction arcs were integrated to create a traditional 1-dimensional PXRD pattern with a step size of 0.05 degrees 2θ in the approximate range of 2 to 32 degrees 2θ.

Single crystal X-ray data were collected using a Bruker Kappa diffractometer equipped with an APEX II CCD detector and sealed tube X-ray generator of monochromatic Mo Ku radiation. Data indicated that the sample represented a non-solvated and non-hydrated crystal of the mono-esylate salt. Table 3A, supra, provides the single crystal X-Ray data for Form C.

Differential scanning calorimetry (DSC) measurements were performed using a TA Instrument—model Q2000 or Q1000. The sample (about 1-10 mg) was weighed in an aluminum pan and the weight recorded accurately to a hundredth of a milligram before transferring the sample to the DSC. The instrument was purged with nitrogen gas at 50 mL/min. Data were collected between room temperature and 300° C. at a heating rate of 10° C./min. DSC plots were generated such that the endothermic peaks pointed down.

Thermal gravimetric analysis (TGA) measurements were performed using a TA Instrument—model Q5000 or Q500. The sample (about 10-30 mg) was placed in a previously tarred platinum pan. The weight of the sample was measured accurately and recorded to a thousandth of a milligram by the instrument. The furnace was purged with nitrogen gas at 100 mL/min. Data were collected between room temperature and 300° C. at a heating rate of 10° C./min.

Procedure for obtaining Form C. The freebase was dissolved in acetone at room temperature with one equivalent of ESA. A slurry formed upon aging ~10 min at room temperature. The slurry was temperature cycled from room temperature (~20° C.) to 40° C. and back, at which point the slurry was thicker. The slurry was isolated and dried on a Buchner funnel.

Example 4: Additional Salts/Cocrystals of Compound 1

Preparation and instrumental procedures for 19 salts/cocrystals of Compound 1 as initially described supra are provided below.

Experimental

Differential Scanning Calorimetry (Crimped Pan, −30 to 250° C.). Differential scanning calorimetry was performed using a TA Instruments 2920 differential scanning calorimeter. Temperature calibration was performed using NIST-traceable indium metal. The sample was placed into an aluminum Tzero differential scanning calorimetry pan, covered with a lid, and crimped. The weight of the pan was accurately recorded. A weighed aluminum pan configured as the sample pan was placed on the reference side of the cell. The samples were analyzed from −30° C. to 250° C. at a ramp rate of 10° C./min.

Differential Scanning Calorimetry (Open Pan, −30 to 250° C.). Differential scanning calorimetry was performed using a TA Instruments 2920 differential scanning calorimeter. Temperature calibration was performed using NIST-traceable indium metal. The sample was placed into an aluminum Tzero differential scanning calorimetry pan, and the pan was left open. The weight of the pan was accurately recorded. A weighed aluminum pan configured as the sample pan was placed on the reference side of the cell. The samples were analyzed from −30° C. to 250° C. at a ramp rate of 10° C./min.

Differential Scanning Calorimetry (Open Pan, Ambient to 250° C.). Differential scanning calorimetry was performed using a TA Instruments 2920 differential scanning calorimeter. Temperature calibration was performed using NIST-traceable indium metal. The sample was placed into an aluminum Tzero differential scanning calorimetry pan, and the pan was left open. The weight of the pan was accurately recorded. A weighed aluminum pan configured as the sample pan was placed on the reference side of the cell. The samples were analyzed from ambient temperature to 250° C. at a ramp rate of 10° C./min.

Solution Proton Nuclear Magnetic Resonance Spectroscopy (Methanol-d4). The solution nuclear magnetic resonance spectra were acquired with an Agilent DD2-400 spectrometer. The samples were prepared by dissolving approximately 5-10 mg of sample in methanol-d4 containing trimethylsilane.

Solution Proton Nuclear Magnetic Resonance Spectroscopy (dimethylsulfoxide-d6). The solution nuclear magnetic resonance spectra were acquired with a 400 MHz Agilent DD2-400 spectrometer. The samples were prepared by dissolving approximately 5-10 mg of sample in dimethylsulfoxide-d6.

Thermal Gravimetric Analysis (Hermetically Sealed). Thermogravimetric analyses were performed using a TA Instruments Q5000 IR thermogravimetric analyzer. Temperature calibration was performed using nickel and Alumel™. Each sample was placed in an aluminum pan. The sample was hermetically sealed and the lid was pierced, and was then inserted into the thermogravimetric furnace. The furnace was heated under nitrogen. The samples were analyzed from ambient temperature to 350° C. at a ramp rate of 10° C./min.

Thermal Gravimetric Analysis (Open Pan). Thermogravimetric analyses were performed using a TA Instruments Q5000 IR thermogravimetric analyzer. Temperature calibration was performed using nickel and Alumel™. Each sample was placed in an aluminum pan. The pan was left open and was then inserted into the thermogravimetric furnace. The furnace was heated under nitrogen. The samples were analyzed from ambient temperature to 350° C. at a ramp rate of 10° C./min.

Thermal Gravimetric Analysis (Open Pan). Thermogravimetric analysis was performed using a Mettler Toledo TGA/DSC3+ analyzer. Temperature calibration was performed using phenyl salicylate, indium, tin, and zinc. The sample was placed in an aluminum pan. The open pan was inserted into the TG furnace. The furnace was heated under nitrogen. Each sample was heated from ambient to 350° C. at 10° C./min.

X-Ray Powder Diffraction. X-ray powder diffraction patterns were collected with a PANalytical X'Pert PRO MPD diffractometer using an incident beam of Cu radiation produced using an Optix long, fine-focus source. An elliptically graded multilayer mirror was used to focus Cu Kα X-rays through the specimen and onto the detector. Prior to the analysis, a silicon specimen (NIST SRM 640e) was analyzed to verify the observed position of the Si 111 peak is consistent with the NIST-certified position. A specimen of the sample was sandwiched between 3-μm-thick films and analyzed in transmission geometry. A beam-stop, short anti-scatter extension, and antiscatter knife edge were used to minimize the background generated by air. Soller slits for the incident and diffracted beams were used to minimize broadening from axial divergence. Diffraction patterns were collected using a scanning position-sensitive detector (X'Celerator) located 240 mm from the specimen and Data Collector software v. 2.2b.

X-Ray Powder Diffraction Peak Identification. Under most circumstances, peaks within the range of up to about 30° 2θ were selected. Rounding algorithms were used to round each peak to the nearest 0.1° 2θ. The location of the peaks along the x-axis (° 2θ) in the tables were determined using proprietary software and rounded to one significant figure after the decimal point. Peak position variabilities are given to within ±0.2° 2θ based upon recommendations outlined in the USP discussion of variability in x-ray powder diffraction. Variability associated with d-spacing estimates was calculated from the USP recommendation, at each d-spacing, and provided in the respective data tables.

Per USP guidelines, variable hydrates and solvates may display peak variances greater than 0.2° 2θ and therefore peak variances of 0.2° 2θ are not applicable to these materials.

For samples with only one X-ray powder diffraction pattern and no other means to evaluate whether the sample provides a good approximation of the powder average, peak tables contain data identified only as "Characteristic Peaks". These peaks are a subset of the entire observed peak list. Characteristic peaks are selected from observed peaks by identifying preferably non-overlapping, low-angle peaks, with strong intensity.

Description and Preparation of Additional Salts/Cocrystals

Preparation of Material—Form D. Solids of Compound 1 free base (49.3 mg), were combined with acetic acid/heptane 20:80 (v/v, 1.6 mL), and the resulting slurry was left to stir at ambient temperature for 11 days, affording an opaque white suspension. The slurry was transferred to a 0.45-μm nylon centrifuge tube filter and centrifuged at 5000 rpm for 1 to 3 minutes. The liquid was discarded and the damp solids were recovered and analyzed.

A portion of the above solids (25.6 mg) was placed in a clean vial, which was left open at ambient conditions for 1 day to allow the solids to air dry. Free-flowing white solids were observed and characterized. Resulting solids consisted of Form D.

Preparation of Material—Form E. Solids of Compound 1 free base (49.7 mg), were combined with acetic acid/heptane 20:80 (v/v, 800 μL), and the resulting slurry was left to stir at ambient temperature for 12 days, affording a mixture of clear liquid phase and white solids. The liquid phase was withdrawn and discarded, and the resulting damp solids were analyzed.

A portion of the above solids (26.2 mg) was placed in a clean vial, which was left open at ambient conditions for 1 day to allow the solids to air dry. Free-flowing white solids were observed and characterized. Resulting solids consisted of Form E.

Preparation of Material—Form F. Compound 1 free base (84.6 mg) was dissolved in isopropanol (1 mL) with sonication, resulting in a clear solution. One molar equivalent of 85% phosphoric acid (13.5 μL) was added with stirring, causing precipitation on contact. A cloudy suspension with large aggregates of off-white, non-birefringent solids was observed. The mixture was allowed to stir at ambient temperature for 1 day, affording a thick, opaque white suspension. The resulting solids were collected on a paper filter by vacuum filtration, air dried on the filter under reduced pressure for approximately 2 minutes, and transferred to a clean vial.

Preparation of Material—Form G. A bulk solution of Compound 1 free base was prepared by dissolving 468.2 mg in 5 mL acetonitrile with sonication, resulting in a clear solution. A 1 mL aliquot (which contained approximately 0.218 mmol of Compound 1) was removed and added to a vial containing one molar equivalent of 1,5-naphthalenedisulfonic acid tetrahydrate (85.0 mg), resulting in a clear liquid with translucent solids on the bottom of the vial. The mixture was allowed to stir at ambient temperature for 4 days, affording a mixture of clear liquid with chunks of off-white solids (stir bar was not moving). The resulting solids were collected on a paper filter by vacuum filtration, air dried on the filter under reduced pressure for approximately 2 to 4 minutes, and transferred to a clean vial.

Preparation of Form H from Ethyl Acetate. Compound 1 free base (78.9 mg) was dissolved in ethyl acetate with sonication, resulting in a clear solution. One molar equivalent of 95-98% sulfuric acid (10.3 μL) was added with stirring, causing precipitation on contact. A sticky yellow gel was observed on the bottom and sides of the vial. The mixture was allowed to stir at ambient temperature for 2 days, affording a very thick, opaque white suspension. The resulting solids were collected on a paper filter by vacuum filtration, washed with cold ethyl acetate (800 μL), air dried on the filter under reduced pressure for approximately 2 minutes, and transferred to a clean vial.

Preparation of Form H from Isopropanol. A bulk solution of Compound 1 free base was prepared by dissolving 470.0 mg in 6 mL isopropanol with sonication, resulting in a clear solution. Five 1 mL aliquots were removed for other experiments, leaving approximately 1 mL. One molar equivalent of 95-98% sulfuric acid (10.3 μL) was added with stirring, causing precipitation on contact. The solids were observed to quickly become a large sticky chunk in clear liquid. The mixture was allowed to stir at ambient temperature for 3 days, affording a mixture of clear liquid with solids stuck to the stir bar (opaque white suspension after breaking up solids). The resulting solids were collected on a paper filter by vacuum filtration, air dried on the filter under reduced pressure for approximately 2 to 4 minutes, and transferred to a clean vial.

Preparation of Material—Form I. A bulk solution of Compound 1 free base was prepared by dissolving 470.0 mg in 6 mL of isopropanol. A 1 mL aliquot of the solution (which contained approximately 0.183 mmol of Compound 1) was added to 1 molar equivalent of benzenesulfonic acid (29.7 mg) with stirring, resulting in a clear solution. The solution was allowed to stir at ambient temperature for 3 days, affording an opaque white suspension. The resulting solids were collected on a paper filter by vacuum filtration, air dried on the filter under reduced pressure for approximately 2-4 minutes, and transferred to a clean vial.

Preparation of Material—Form J. A bulk solution of Compound 1 free base was prepared by dissolving 329.9 mg in 4 mL of ethanol. A 1 mL aliquot of the solution (which contained approximately 0.192 mmol of Compound 1) was added to 1 molar equivalent of citric acid (38.2 mg) with stirring, resulting in a clear solution. The solution was allowed to stir at ambient temperature for 8 days and remained clear. Aliquots of heptane were added (3×1 mL), and the resulting clear solution was allowed to stir at ambient temperature for 1 day. The solution remained clear and was placed in the freezer for 6 days. The resulting clear solution was uncapped and covered with perforated aluminum foil for partial slow evaporation at ambient conditions. Upon observation of a mixture of clear liquid and off-white solids, the liquid phase was decanted and discarded, and the solids were briefly dried under nitrogen gas.

Preparation of Material—Form K. A bulk solution of Compound 1 free base was prepared by dissolving 451.3 mg in 6 mL of ethanol. A 1 mL aliquot of the solution (which contained approximately 0.175 mmol of Compound 1) was added to 1 molar equivalent of L-(−)-malic acid (23.2 mg) with stirring, resulting in a clear solution. The solution was allowed to stir at ambient temperature for 6 days and remained clear. Aliquots of heptane were added (3×1 mL), and the resulting clear solution was allowed to stir at ambient temperature for 1 day. The solution remained clear and was placed in the freezer for 6 days. The resulting clear solution was uncapped and covered with perforated aluminum foil for partial slow evaporation at ambient conditions. Upon observation of a mixture of clear liquid and light yellow solids, the liquid phase was decanted and discarded, and the solids were briefly dried under nitrogen gas.

Preparation of Material—Form L. A bulk solution of Compound 1 free base was prepared by dissolving 451.3 mg in 6 mL of ethanol. A 1 mL aliquot of the solution (which contained approximately 0.175 mmol of Compound 1) was added to 1 molar equivalent of L-(+)-tartaric acid (28.7 mg) with stirring, resulting in a clear solution. The solution was allowed to stir at ambient temperature for 6 days and remained clear. Aliquots of tert-butyl methyl ether were added (4×1 mL), and the resulting clear solution was allowed to stir at ambient temperature for 1 day. The solution remained clear and was placed in the freezer for 6 days. The resulting clear solution was uncapped and covered with perforated aluminum foil for partial slow evaporation at ambient conditions. Upon observation of a mixture of clear liquid and white solids, the solids were collected on a 0.2 µm nylon filter by positive-pressure filtration (pressing the slurry through a syringe and Swinnex filter holder assembly). A 20 mL syringe of air was blown through the filter several times, and the resulting solids were transferred to a clean vial.

Preparation of Material—Form M. A bulk solution of Compound 1 free base was prepared by dissolving 660.9 mg in 7 mL of acetonitrile. A 1 mL aliquot of the solution was added to 1 molar equivalent of fumaric acid (26.0 mg) with stirring, resulting in a cloudy solution. The mixture was allowed to stir at ambient temperature for 5 days, affording a white slurry. The resulting solids were collected on a 0.2-µm nylon filter by positive-pressure filtration (pressing the slurry through a syringe and Swinnex filter holder assembly). A 20 mL syringe of air was blown through the filter 3 times, and the resulting solids were transferred to a clean vial.

Preparation of Material—Form N. Compound 1 free base (86.0 mg) was dissolved in acetonitrile (1 mL) with sonication, resulting in a clear solution. The Compound 1 solution was added to 1 molar equivalent of 1,2-ethanedisulfonic acid hydrate (58.4 mg) with stirring, resulting in a cloudy suspension with a sticky yellow gel on the bottom of the vial. The mixture was allowed to stir at ambient temperature for 3 days, affording a clear liquid with off-white solids. The resulting solids were collected on a 0.2-µm nylon filter by positive-pressure filtration (pressing the slurry through a syringe and Swinnex filter holder assembly). A 20 mL syringe of air was blown through the filter several times, and the resulting solids were dried briefly under nitrogen gas and transferred to a clean vial.

Preparation of Material—Form O. Compound 1 free base (76.0 mg) was weighed into a clean vial. Ten molar equivalents of L-tartaric acid (258.6 mg) were weighed into a separate vial and dissolved in water (1 mL) with sonication. The entire L-tartaric acid solution was added to the Compound 1 solids with stirring, and acetone (100 µL) was added to the mixture. Undissolved solids were observed. The resulting mixture was allowed to stir at ambient temperature for 10 days, affording a small amount of clear liquid with a large amount of white solids. The resulting solids were collected on a paper filter by vacuum filtration, air dried on the filter under reduced pressure for approximately 5 minutes, and transferred to a clean vial. The solids were confirmed to consist of Form O by x-ray powder diffraction analysis, and were observed to be damp with solvent. A portion (39.0 mg) of the damp solids was left in an open vial to air dry at ambient conditions for 1 day. No change in form was observed by x-ray powder diffraction of the dried solids.

Preparation of Material—Form P. Compound 1 free base (77.8 mg) was weighed into a clean vial. One half molar equivalent of fumaric acid (12.3 mg) was added to the Compound 1 solids, and acetone (1 mL) was added to the mixture with stirring, resulting in a clear solution with some undissolved solids. Aliquots of tert-butyl methyl ether (2×1 mL) were added with stirring, and the solution was uncapped and covered with perforated aluminum foil for slow evaporation at ambient conditions. Upon evaporation to dryness, off-white solids were observed.

Preparation of Material—Form Q. A bulk solution of Compound 1 free base was prepared by dissolving 660.9 mg in 7 mL of acetonitrile. Six 1 mL aliquots were removed for other experiments, leaving approximately 1 mL. One molar equivalent of L-malic acid (32.3 mg) was added with stirring, resulting in an off-white slurry. The mixture was allowed to stir at ambient temperature for 5 days, affording a white slurry. The resulting solids were collected on a 0.2-µm nylon filter by positive-pressure filtration (pressing the slurry through a syringe and Swinnex filter holder assembly). A 20 mL syringe of air was blown through the filter 3 times, and the resulting solids were transferred to a clean vial.

Preparation of Material—Form R. Compound 1 free base (84.2 mg) was dissolved in EtOH (1 mL) with sonication, resulting in a clear, yellow solution. One molar equivalent of 1,5-naphthalenedisulfonic acid tetrahydrate (75.5 mg) was added to the Compound 1 solution with stirring. The sample was allowed to stir at ambient temperature for 5 days, affording an off-white slurry. The resulting solids were collected on a 0.2-µm nylon filter by positive-pressure filtration (pressing the slurry through a syringe and Swinnex filter holder assembly). A 20 mL syringe of air was blown through the filter three times, and the resulting solids were transferred to a clean vial.

Preparation of Material—Form S. A bulk solution of Compound 1 free base was prepared by dissolving 277.8 mg in 3 mL of acetonitrile. A 1 mL aliquot of the solution was transferred to a clean vial, and 1 molar equivalent of 85% phosphoric acid (14.5 µL) was added with stirring, resulting in a white slurry. The mixture was allowed to stir at ambient temperature for 4 days, affording a white slurry. The resulting solids were collected on a 0.2-µm nylon filter by positive-pressure filtration (pressing the slurry through a syringe and Swinnex filter holder assembly). A 20 mL syringe of air was blown through the filter three times, and the resulting solids were transferred to a clean vial.

Preparation of Material—Form T. A bulk solution of Compound 1 free base was prepared by dissolving 660.9 mg in 7 mL of acetonitrile. A 1 mL aliquot of the solution was added to 1 molar equivalent of citric acid (42.6 mg) with stirring, resulting in a mixture of clear liquid and undissolved solids. The mixture was allowed to stir at ambient temperature for 5 days, affording a mixture of clear liquid with white and off-white solids on the sides of the vial. The resulting solids were scraped from the vial and collected on a 0.2-µm nylon filter by positive-pressure filtration (pressing the slurry through a syringe and Swinnex filter holder assembly). The solids were transferred to a clean vial.

Preparation of Material—Form U. A bulk solution of Compound 1 free base was prepared by dissolving 254.9 mg in 3 mL of ethyl acetate. Two 1 mL aliquots were removed for other experiments, leaving approximately 1 mL. One molar equivalent of p-toluenesulfonic acid monohydrate (40.6 mg) was added with stirring, resulting in a clear solution. The mixture was allowed to stir at ambient temperature for 6 days, and the solution remained clear. Aliquots of tert-butyl methyl ether (12×500 µL) were added with stirring, affording a hazy solution. After stirring approximately 5 minutes, a white slurry was observed. The resulting solids were collected on a 0.45 μm polytetrafluoroethylene filter by positive-pressure filtration (pressing the slurry through a syringe and Swinnex filter holder assembly). A 20 mL syringe of air was blown through the filter three times, and the resulting solids were transferred to a clean vial.

What is claimed:

1. Crystalline (R)—N-(4-chlorophenyl)-2-((1S,4S)-4-(6-fluoroquinolin-4-yl)cyclohexyl)propanamide hydrochloride salt monohydrate Form A, having one or more peaks in its XRPD selected from those at about 14.7, about 16.5, about 17.6, about 23.5 and about 24.3 degrees 2-theta.

2. The crystalline (R)—N-(4-chlorophenyl)-2-((1S,4S)-4-(6-fluoroquinolin-4-yl)cyclohexyl)propanamide hydrochloride salt monohydrate Form A according to claim 1, having two or more peaks in its XRPD selected from those at about 14.7, about 16.5, about 17.6, about 23.5 and about 24.3 degrees 2-theta.

3. The crystalline (R)—N-(4-chlorophenyl)-2-((1S,4S)-4-(6-fluoroquinolin-4-yl)cyclohexyl)propanamide hydrochloride salt monohydrate Form A according to claim 1, having three or more peaks in its XRPD selected from those at about 14.7, about 16.5, about 17.6, about 23.5 and about 24.3 degrees 2-theta.

4. A method of treating cancer in a patient in need of such treatment comprising administering to the patient a therapeutically effective amount of a compound according to claim 1.

5. The method of claim 4, wherein the cancer is a cancer of the prostate, colon, rectum, pancreas, cervix, stomach, endometrium, brain, liver, bladder, ovary, testis, head, neck, skin, mesothelial lining, white blood cell, esophagus, breast, muscle, connective tissue, lung, adrenal gland, thyroid, kidney, or bone; or is glioblastoma, mesothelioma, renal cell carcinoma, gastric carcinoma, sarcoma, choriocarcinoma, cutaneous basocellular carcinoma, or testicular seminoma.

6. The method of claim 5, wherein the skin cancer comprises melanoma and basal carcinoma; the white blood cell cancer comprises lymphoma and leukemia; the lung cancer comprises small-cell lung carcinoma and non-small-cell carcinoma; and the sarcoma comprises Kaposi's sarcoma.

7. The method of claim 4, further comprising administration of an immune checkpoint inhibitor.

8. The method of claim 7, wherein the immune checkpoint inhibitor is ipilimumab, nivolumab, pembroluzimab or a combination thereof.

9. A method of modulating the activity of indoleamine 2,3-dioxygenase comprising contacting the indoleamine 2,3-dioxygenase with a compound according to claim 1.

10. Crystalline (R)—N-(4-chlorophenyl)-2-((1S,4S)-4-(6-fluoroquinolin-4-yl)cyclohexyl)propanamide anhydrous hydrochloride salt Form B.

11. The crystalline (R)—N-(4-chlorophenyl)-2-((1S,4S)-4-(6-fluoroquinolin-4-yl)cyclohexyl)propanamide-anhydrous hydrochloride salt Form B according to claim 10, having one or more peaks in its XRPD selected from those at about 13.0, about 14.2, about 16.3, about 18.5, about 21.0, about 23.9 and about 24.7 degrees 2-theta.

12. The crystalline (R)—N-(4-chlorophenyl)-2-((1S,4S)-4-(6-fluoroquinolin-4-yl)cyclohexyl)propanamide anhydrous hydrochloride salt Form B according to claim 11, having two or more peaks in its XRPD selected from those at about 13.0, about 14.2, about 16.3, about 18.5, about 21.0, about 23.9 and about 24.7 degrees 2-theta.

13. The crystalline (R)—N-(4-chlorophenyl)-2-((1S,4S)-4-(6-fluoroquinolin-4-yl)cyclohexyl)propanamide anhydrous hydrochloride salt Form B according to claim 11, having three or more peaks in its XRPD selected from those at about 13.0, about 14.2, about 16.3, about 18.5, about 21.0, about 23.9 and about 24.7 degrees 2-theta.

14. A method of treating cancer in a patient in need of such treatment comprising administering to the patient a therapeutically effective amount of a compound according to claim 10.

15. The method of claim 14, wherein the cancer is a cancer of the prostate, colon, rectum, pancreas, cervix, stomach, endometrium, brain, liver, bladder, ovary, testis, head, neck, skin, mesothelial lining, white blood cell, esophagus, breast, muscle, connective tissue, lung, adrenal gland, thyroid, kidney, or bone; or is glioblastoma, mesothelioma, renal cell carcinoma, gastric carcinoma, sarcoma, choriocarcinoma, cutaneous basocellular carcinoma, or testicular seminoma.

16. The method of claim 15, wherein the skin cancer comprises melanoma and basal carcinoma; the white blood cell cancer comprises lymphoma and leukemia; the lung cancer comprises small-cell lung carcinoma and non-small-cell carcinoma; and the sarcoma comprises Kaposi's sarcoma.

17. The method of claim 14, further comprising administration of an immune checkpoint inhibitor.

18. The method of claim 17, wherein the immune checkpoint inhibitor is ipilimumab, nivolumab, pembroluzimab or a combination thereof.

19. A method of modulating the activity of indoleamine 2,3-dioxygenase comprising contacting the indoleamine 2,3-dioxygenase with a compound according to claim 10.

* * * * *